(12) United States Patent
Ahmed et al.

(10) Patent No.: US 11,256,782 B2
(45) Date of Patent: *Feb. 22, 2022

(54) METHOD AND APPARATUS FOR TRANSMITTING, ACTIVATING, PURCHASING AND ACCESSING PROTECTED CONTENT AND SERVICES FROM CONNECTED DEVICES

(71) Applicant: HERE Global B.V., Eindhoven (NL)

(72) Inventors: Zahid Ahmed, Westborough, MA (US); Jarno Malmstrom, Berlin (DE); Alexandru Paul Pasca, Berlin (DE); Andreas Bogk, Chicago, IL (US); James Hesby, Chicago, IL (US); Donald Perrier, Paris (FR)

(73) Assignee: HERE Global B.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 16/685,687

(22) Filed: Nov. 15, 2019

(65) Prior Publication Data

US 2020/0082057 A1 Mar. 12, 2020

Related U.S. Application Data

(63) Continuation of application No. 15/323,319, filed as application No. PCT/EP2015/064784 on Jun. 30, 2015, now Pat. No. 10,521,565.
(Continued)

(51) Int. Cl.
*H04L 29/06* (2006.01)
*G06F 21/10* (2013.01)

(52) U.S. Cl.
CPC .......... *G06F 21/10* (2013.01); *H04L 63/0815* (2013.01); *H04L 2463/101* (2013.01)

(58) Field of Classification Search
CPC ................. G06F 21/10; H04L 63/0815; H04L 2463/101
See application file for complete search history.

(56) References Cited

U.S. PATENT DOCUMENTS

| 7,627,406 B2 | 12/2009 | Wang et al. |
| 8,244,179 B2 | 8/2012 | Dua |

(Continued)

FOREIGN PATENT DOCUMENTS

| WO | 2009097002 A1 | 8/2009 |
| WO | 2014093958 A2 | 6/2014 |

OTHER PUBLICATIONS

Tamura, Toshiya, and Isao Masuda. "Device connectivity technologies using short-distance wireless communications." Fujitsu Sci. Tech. J 49.2 (2013): 213-219. (Year: 2013).*

(Continued)

*Primary Examiner* — Shawnchoy Rahman
(74) *Attorney, Agent, or Firm* — Ditthavong, Steiner & Mlotkowski

(57) ABSTRACT

An approach is provided for providing digital rights management within a connected service and content ecosystem. The approach involves receiving a request for content for use at at least one device, wherein the request originates from at least one companion device. The approach also involves causing at least in part, a packaging of the content according to at least one digital rights management format based, at least in part, on identification information associated with at least one of: the at least one device; the at least one companion device; at least one user associated with the at least one device, the at least one companion device, or a combination thereof; and the content. The approach further involves causing, at least in part, a transmission of the packaged content, at least one link to the packaged content, or a combination thereof to the at least one device, the at least one companion device, or a combination thereof. The (Continued)

approach also involves causing, at least in part, an activation of the packaged content for use at the at least one device.

20 Claims, 45 Drawing Sheets

Related U.S. Application Data

(60) Provisional application No. 62/023,229, filed on Jul. 11, 2014.

(56) References Cited

U.S. PATENT DOCUMENTS

| | | | |
|---|---|---|---|
| 8,321,534 B1 | 11/2012 | Roskind et al. | |
| 9,032,547 B1* | 5/2015 | Hohler | G06Q 30/0607 |
| | | | 726/29 |
| 9,317,612 B1 | 4/2016 | Camplejohn et al. | |
| 2003/0001896 A1 | 1/2003 | Johnson et al. | |
| 2005/0198376 A1 | 9/2005 | Kotzin | |
| 2005/0210145 A1* | 9/2005 | Kim | H04N 21/4882 |
| | | | 709/231 |
| 2005/0278787 A1 | 12/2005 | Naslund et al. | |
| 2006/0167808 A1 | 7/2006 | Greene et al. | |
| 2007/0100959 A1 | 5/2007 | Eichstaedt et al. | |
| 2007/0179895 A1 | 8/2007 | Bishop et al. | |
| 2007/0299780 A1 | 12/2007 | Vanska et al. | |
| 2008/0134043 A1 | 6/2008 | Georgis et al. | |
| 2008/0155109 A1 | 6/2008 | Khedouri et al. | |
| 2008/0279373 A1 | 11/2008 | Erhart et al. | |
| 2009/0022120 A1* | 1/2009 | Buer | G09G 5/005 |
| | | | 370/338 |
| 2009/0049119 A1* | 2/2009 | Marcinkiewicz | H04L 67/06 |
| | | | 709/203 |
| 2009/0083541 A1 | 3/2009 | Levine | |
| 2009/0175442 A1* | 7/2009 | Feng | H04L 9/0833 |
| | | | 380/28 |
| 2010/0030734 A1 | 2/2010 | Chunilal | |
| 2012/0046808 A1 | 2/2012 | Furuta | |
| 2014/0040361 A1 | 2/2014 | Harris et al. | |
| 2014/0047073 A1 | 2/2014 | Beme | |
| 2014/0098671 A1 | 4/2014 | Raleigh et al. | |
| 2014/0114793 A1 | 4/2014 | Silver | |
| 2014/0133672 A1 | 5/2014 | Lakkundi et al. | |
| 2014/0156734 A1 | 6/2014 | Stankoulov | |
| 2014/0200743 A1 | 7/2014 | Kwon et al. | |
| 2014/0310243 A1* | 10/2014 | McGee | G06F 16/27 |
| | | | 707/639 |

OTHER PUBLICATIONS

European Office Action for related European Patent Application No. 15732694.3-1218 dated Apr. 14, 2020, 4 pages.
Office Action for related European Patent Application No. 15 732 694.3-1218, dated Sep. 19, 2018, 4 pages.
International Search Report for International Application No. PCT/EP2015/064784, dated Sep. 4, 2015, 3 pages.
European Office Action for related European Patent Application No. 15732694.3-1218 dated Jan. 21, 2021, 4 pages.

* cited by examiner

FIG. 27 http://www.website.com — 2701

My Account details:

About you: — 2703

Title [Mr. ▼]

First Name [ ]
Last Name [ ]

Billing Address:

Address line 1 [ ]
Address line 2 [ ]
City [ ]

Country [ ]

Accounts Detail:

Email [ ]
Confirm Email [ ]

Password [ ]
Confirm Password [ ]

FIG. 28 http://www.website.com — 2801

My Account:

My opt-In Preferences:

Preferences:

From time to time we would like to contact you to tell you about products and promotions that may be of interest to you. Please tell us how would you like us to get in touch — 2803

☑ Please send me map deals and others to enhance my navigation

Best way to receive my information by:

☐ Post   ☑ Email   ☐ SMS   ☐ Phone
                              2805

☑ I agree to receive information from trusted third parties

Best way to receive my information by:

☐ Post   ☑ Email   ☑ SMS   ☐ Phone

Are you sure that you want to unsubscribe completely? Why not just take a break?

Please let us know how long you'd like us to not send you any communication, then we'll start sending them to you again one the time has elapsed Please don't send anything for: [    ]   [Save change]

☐ I have read and agree to the terms of use

FIG. 31

3101 http://www.website.com

My Account:

Manage my Products:

1. Select a vehicle  >  2. Confirm vehicle  >  3. Download

Important Note:

You have 28 days before this link expires and this product is valid for 12 months from the date of installation and cannot be downloaded no more that 'x' times Also I want to add next years 12 months subscription early   [Add to cart]
3103

Associate your product to a vehicle:

For better tracking of this product and if you want the ability to be notified of further updates associate vehicle to this product. Please note that the vehicles which are greyed out are not compatible with this product Select the vehicle you wish to associate your product with:

Or add a new car  3105

Please provide us with details about another vehicle other than the ones in the list above. Your vehicle will then be added to the list of vehicle in the "manage my vehicle page".

Short name for the vehicle

Enter your VIN     [How to find your VIN]

Vehicle Model

Vehicle Year

Vehicle Navigation Systems

Set this vehicle as primary vehicle    [YES]  [NO]

METHOD AND APPARATUS FOR TRANSMITTING, ACTIVATING, PURCHASING AND ACCESSING PROTECTED CONTENT AND SERVICES FROM CONNECTED DEVICES

CROSS-REFERENCES TO RELATED APPLICATIONS

This application is a continuation of U.S. patent application Ser. No. 15/323,319, filed Dec. 30, 2016, which claims priority from PCT Application Serial No. PCT/EP2015/064784, filed Jun. 30, 2015, which claims priority from U.S. Provisional Patent Application Ser. No. 62/023,229, filed Jul. 11, 2014, the contents of which are hereby incorporated herein in their entirety by reference.

BACKGROUND

Service providers and device manufacturers (e.g., navigation systems, in-car entertainment systems, navigation applications, wireless, cellular, etc., including both embedded and standalone systems) are continually challenged to deliver value and convenience to consumers by, for example, providing compelling network services. One area of development has been in expanding network services to connected cars, navigation systems, and other non-traditional devices. For example, services directed at smart cars and in-car navigation systems may offer map and navigation content, parking services, content services (e.g., entertainment and media services), and the like that allow users to buy, subscribe, and/or try such content and services for free or a paid-for basis. As an added level of complication, such services and/or content may or may not be branded with value added capabilities for ecosystems maintained by providers (e.g., original equipment manufacturers (OEM) such as car manufacturers) that are different from the service providers and/or content providers themselves. In addition, content and services may be accessed and/or relayed to such connected devices from traditional connected devices (e.g., smartphones, tablets, computers, etc.). Within this potentially complex content and service delivery architecture, content owners and service providers nonetheless desire to have the content and service protected from authorized distribution or use. Accordingly, service providers and device manufacturers face significant technical challenges to enabling digital rights management for content and/or services within a connected architecture that includes connected traditional (e.g., smartphones, tablets, computers, etc.) and non-traditional devices (e.g., smart cars, navigation systems, navigation applications, etc.) while providing seamless user experience.

SOME EXAMPLE EMBODIMENTS

Therefore, there is a need for an approach for providing digital rights management within a connected environment to enable access, distribution, and/or use of content and/or services, particularly with respect to connected smart car and/or navigation system ecosystems (e.g., OEM branded ecosystems) wherein one device (e.g., a smart car, navigation system, navigation applications, etc.) acts to acquire services and/or content for a companion device or client (e.g., a smartphone, tablet, computer, etc.).

According to one embodiment, a method comprises receiving a request for content for use at at least one device, wherein the request originates from at least one companion device. The method also comprises causing at least in part, a packaging of the content according to at least one digital rights management format based, at least in part, on identification information associated with at least one of: the at least one device; the at least one companion device; at least one user associated with the at least one device, the at least one companion device, or a combination thereof; and the content. The method further comprises causing, at least in part, a transmission of the packaged content, at least one link to the packaged content, or a combination thereof to the at least one device, the at least one companion device, or a combination thereof. The method also comprises causing, at least in part, an activation of the packaged content for use at the at least one device.

According to another embodiment, an apparatus comprises at least one processor, and at least one memory including computer program code for one or more computer programs, the at least one memory and the computer program code configured to, with the at least one processor, cause, at least in part, the apparatus to receive a request for content for use at at least one device, wherein the request originates from at least one companion device. The apparatus is also caused to cause at least in part, a packaging of the content according to at least one digital rights management format based, at least in part, on identification information associated with at least one of: the at least one device; the at least one companion device; at least one user associated with the at least one device, the at least one companion device, or a combination thereof; and the content. The apparatus is further caused to cause, at least in part, a transmission of the packaged content, at least one link to the packaged content, or a combination thereof to the at least one device, the at least one companion device, or a combination thereof. The apparatus is also caused to cause, at least in part, an activation of the packaged content for use at the at least one device.

According to another embodiment, a computer-readable storage medium carries one or more sequences of one or more instructions which, when executed by one or more processors, cause, at least in part, an apparatus to receive a request for content for use at at least one device, wherein the request originates from at least one companion device. The apparatus is also caused to cause at least in part, a packaging of the content according to at least one digital rights management format based, at least in part, on identification information associated with at least one of: the at least one device; the at least one companion device; at least one user associated with the at least one device, the at least one companion device, or a combination thereof; and the content. The apparatus is further caused to cause, at least in part, a transmission of the packaged content, at least one link to the packaged content, or a combination thereof to the at least one device, the at least one companion device, or a combination thereof. The apparatus is also caused to cause, at least in part, an activation of the packaged content for use at the at least one device.

According to another embodiment, an apparatus comprises means for receiving a request for content for use at at least one device, wherein the request originates from at least one companion device. The apparatus also comprises means for causing at least in part, a packaging of the content according to at least one digital rights management format based, at least in part, on identification information associated with at least one of: the at least one device; the at least one companion device; at least one user associated with the at least one device, the at least one companion device, or a combination thereof; and the content. The apparatus further comprises means for causing, at least in part, a transmission of the packaged content, at least one link to the packaged content, or a combination thereof to the at least one device, the at least one companion device, or a combination thereof. The apparatus also comprises means for causing, at least in part, an activation of the packaged content for use at the at least one device.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 27 is a user interface diagram that represents account information page for at least one user, according to one example embodiment;

FIG. 28 is a user interface diagram that represents an opt-in preference page for a user to manage his account, according to one example embodiment;

FIG. 31 is a user interface diagram that represents a page for subscription download for managing one or more purchased products, according to one example embodiment;

DESCRIPTION OF SOME EMBODIMENTS

Examples of a method, apparatus, and computer program for providing digital rights management within a connected environment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. In addition, although the various embodiments are discussed with respect to a content and service delivery environment including smart cars and navigation systems, it is contemplated that the approaches described herein are applicable to an environment including any type of connected device capable of supporting DRM for content and services.

Figure 1:
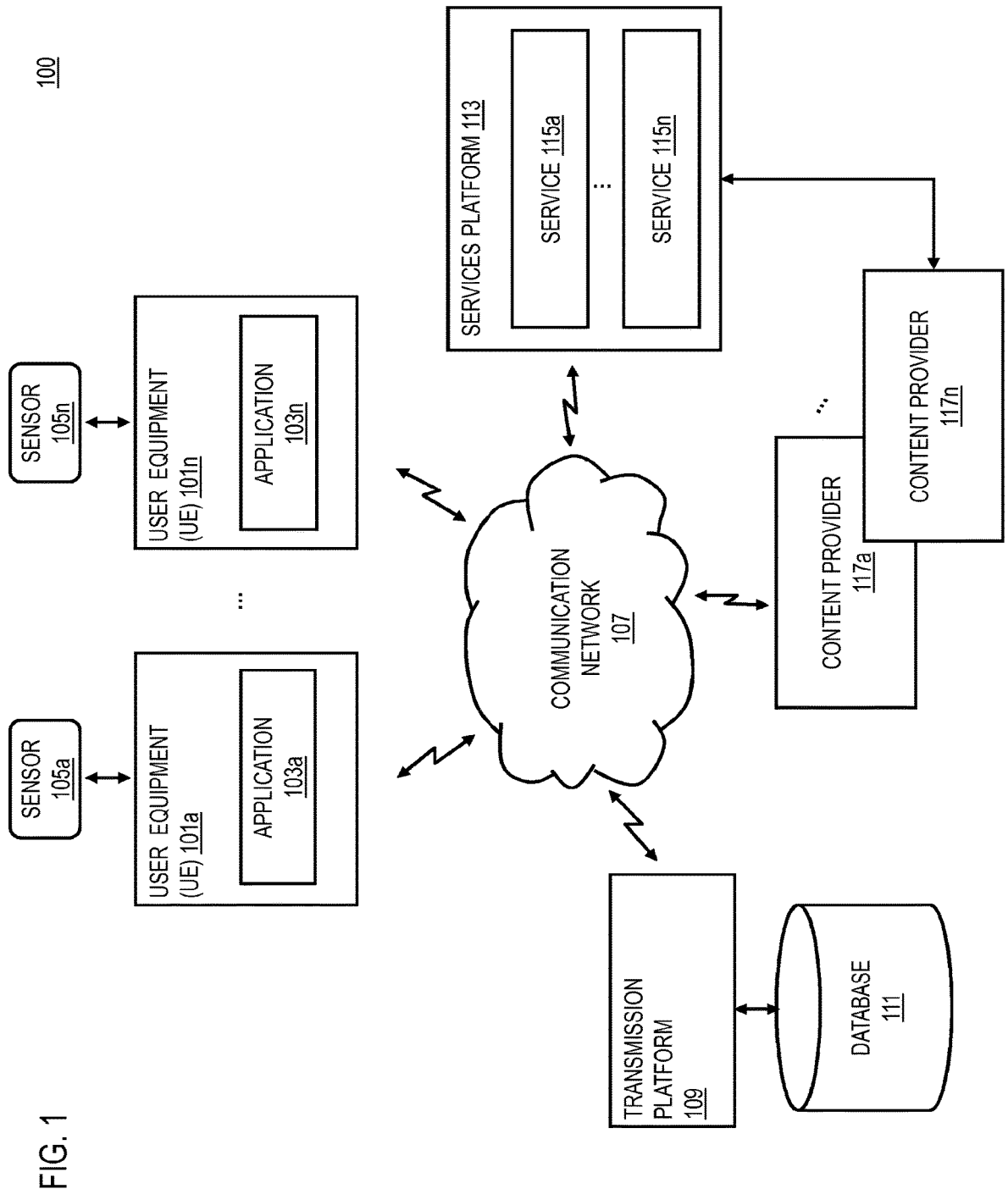
FIG. 1 is a diagram of a system capable of providing digital rights management within a connected service and content environment, according to one embodiment.

FIG. 1 is a diagram of a system capable of providing digital rights management within a connected service and content environment, according to one embodiment. As noted above, connected or "smart" devices of all types are becoming increasingly common for accessing content and/or services that were generally available only to traditional devices or clients (e.g., smartphones, tablets, computers, etc.). As a result, more diverse device environments are making it more challenging for content providers and service providers to provide protected content without burdening end users (e.g., both OEMs who maintain branded ecosystems as well as consumers) with overly complicated or restrictive DRM procedures. One example of such a connected environment is an automotive cloud service.

In one embodiment, an automotive cloud service may include a connected car service marketplace for creating automotive original equipment manufacturer (OEM) centric vertical marketplaces, such that the location cloud platform service provider has revenue sharing with OEM based on service subscription and commerce transactions. By way of example, these marketplaces may offer automotive and location platform centric content and services to multiple devices (e.g., mobile, desktop, tablet) connected to a vehicle (e.g., a smart car with embedded systems or containing multiple connected devices or application clients) of the user. However, coordinating and integrating such online services to user devices and/or clients without network connection (or with intermittent connection) is a challenge. In one scenario, numerous users may have multiple user devices which can be contained/embedded in a car or vehicle as well as devices that can be used outside of the car to transmit, activate, purchase, access, and/or subscribe to content and/or services. Accordingly, a user may want to transfer online services from his/her personal user device (e.g., a smartphone, tablet, computer) used outside of the car to devices (e.g., a navigation system, entertainment system, navigation application, head unit, etc.) contained in, installed in, or otherwise associated with a vehicle. It can be inconvenient for a user if there are significant burdens or restrictions (e.g., DRM restrictions) for using content or services activated on one user device on another one of the user's devices (e.g., smart car, navigation systems, etc.). As one example, a user may activate mapping data on a home computer and want that mapping data installed on a navigation head unit of the user's vehicle which may have intermittent or no network connectivity. In this scenario, transferring such activated content and/or services from one device to another can be problematic when the receiving device has no or limited network connectivity to acquire digital rights associated with protected content and/or services.

To address this problem, a system 100 of FIG. 1 introduces the capability to provide digital rights management within a connected environment. For example, within the context of an automotive cloud service, the system 100 enables connected services linked to devices or clients (e.g., a navigation system, navigation application, etc.) in a car via a web-based companion portal that connects the experience of the car to the experience and/or context of a user outside the car (e.g., a user's desktop, laptop, and/or other handheld device). This connection, for instance, enables access from the outside to content and services subscribed or other used in the car via, for instance, a web portal. Because these content and services are accessible via any companion mobile device or application, the ecosystem is expandable to many different form factors and/or connected devices that can access and publish content in any networked environment where there is data connection and/or disconnected devices that periodically have access to networks.

More specifically, in one embodiment, the system 100 provides the capability to package content and/or services into a DRM format for transmission to at least one device, at least one companion device, or a combination thereof. In one scenario, the content may comprise the content itself plus metadata. The content may be any textual content, audio content, video content, etc. in any known format. The content metadata may be any data or information associated with the content that is used for handling of the content. The transfer of the content may be based, at least in part, on a wide-area network connection, a near field network connection, or a combination thereof. In one scenario, the system 100 ensures DRM protected activation of content and services in automotive cloud-centric multi device platform. In another scenario, the system 100 allows purchasing of content and/or services in a cloud via a web companion device and may deliver the purchased content in a DRM manner to an embedded car head-unit even though the car head-unit is not connected to a network at the time of purchase. Such inaccessibility to a network connection for at least one user device may be temporary.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, augmented reality glasses, virtual reality glasses or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or WiFi connection either through the inbuilt communication equipment or from the UE 101 associated with the vehicles for connecting clients to the connected device ecosystem. In one embodiment, the UEs 101 may connected clients that include software and/or hardware components to operate within a connected environment. The connected clients then provide for secure interoperability of content and/or services as discussed with respect to the various embodiments described herein.

By way of example, the applications 103 may be any type of application that is executable at the UE 101, such as electronic mapping applications, navigation applications, content provisioning services, camera/imaging applications, media player applications, social networking applications, location-based service applications, calendar applications, and the like. In one embodiment, one of the applications 103 at the UE 101 may act as a client for the transmission platform 109 and may perform one or more functions associated with the functions of the transmission platform 109 by interacting with the transmission platform 109 over the communication network 107.

By way of example, the sensors 105 may be any type of sensor. In certain embodiments, the sensors 105 may include, for example, a network detection sensor for detecting wireless signals or receivers for different short-range communications (e.g., Bluetooth, WiFi, Li-Fi, near field communication etc.), a global positioning sensor for gathering location data (e.g., GPS), a camera/imaging sensor for gathering image data, an audio recorder for gathering audio data, and the like.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the transmission platform 109 may be a platform with multiple interconnected components that operate with a secure environment (e.g., DRM protected environment). By way of example, the transmission platform 109 may include multiple servers, intelligent networking devices, computing devices, components and corresponding software for activating DRM protection to content and/or services for transmission to at least one device, at least one companion device, or a combination thereof.

In one embodiment, the transmission platform 109 may cause, at least in part, an uploading of content and/or services. Then, the transmission platform 109 may determine, at least in part, one or more DRM formats for one or more content items and/or services. Next, the transmission platform 109 may cause, at least in part, an application of a DRM process to encrypt, to repackage, to re-sign, or a combination thereof of one or more content items and/or services. Subsequently, the transmission platform 109 may cause a transmission of the one or more repackaged content and/or services to one or more devices, one or more companion devices, or a combination thereof. In one scenario, the transmission platform 109 may employ a secure channel that is transparently tunneled through one or more host devices to one or more companion devices. In another embodiment, the transmission platform 109 may determine connectivity status information to cause a routing of the transmission of the packaged content between at least one device and/or at least one companion device.

In one embodiment, the transmission platform 109 may cause, at least in part, a selection of content and/or services for purchase, wherein a purchase is activated via interaction with a no-trial download, a time-trial download, a usage count-trial download, or a combination thereof. In one scenario, a purchase is triggered based, at least in part, on user identification, device identification, content identification, or a combination thereof. In another embodiment, the transmission platform 109 may cause, at least in part, an updating of purchase records upon determination that a purchase transaction is a success. Then, the transmission platform 109 may cause, at least in part, a transmission of content download uniform resource locator at at least one user device based, at least in part, on completion of a purchase transaction, wherein content download uniform resource locator is over-the-air synchronized with at least one registered user device.

In one embodiment, the transmission platform 109 may cause, at least in part, an activation of content download process via uniform resource locator in at least one user device. Then, the transmission platform 109 may determine, at least in part, a completion of content download process to trigger acquisition rights for downloaded content and/or services. In another embodiment, the transmission platform 109 may cause, at least in part, a presentation of one or more links for purchasable content and/or services in at least one user device based, at least in part, on user verification process, wherein user verification process is based, at least in part, on predefined values, a preset username and password, user identification, device identification, other authentication mechanisms, or a combination thereof.

In one embodiment, the transmission platform 109 may cause, at least in part, a re-validation of one or more users based, at least in part, user selection, user interaction, or a combination thereof.

In a further embodiment, the transmission platform 109 may cause, at least in part, a notification of availability of newly purchased content and/or services, wherein a notification include a pull mechanism to check availability of new entitlements, an asynchronous callback mechanism, or a combination thereof.

In one embodiment, the transmission platform 109 may create the database 111 to store user profile information, device registration information, or a combination thereof. In another embodiment, the database 111 may store service information, product information, new content information, or a combination thereof. The information may be any multiple types of information that can provide means for aiding in the content provisioning and sharing process.

The services platform 113 may include any type of service. By way of example, the services platform 113 may include content (e.g., audio, video, images, etc.) provisioning services, social networking services, application services, storage services, contextual information determination services, information based services, location based services, etc. In one embodiment, the services platform 113 may interact with the UE 101, the transmission platform 109 and the content providers 117 to supplement or aid in the processing of the content information to cause activation of DRM protection to content and/or services for transmission.

By way of example, the services 115 may be an online service that reflects interests and/or activities of users. In one scenario, the services 115 provide representations of each user (e.g., a profile), his/her social links, and a variety of additional information. The services 115 allow users to share content information, media information, location information, activities information, contextual information, historical user information and interests within their individual networks, and provides for data portability. The services 115 may additionally assist in providing the transmission platform 109 with relevant content information to cause activation of DRM protection.

The content providers 117 may provide content to the UE 101, the transmission platform 109, and the services 115 of the services platform 113. The content provided may be any type of content, such as image content, video content, textual content, etc. In one embodiment, the content providers 117 may provide content that may supplement content of the applications 103, the sensors 105, or a combination thereof. By way of example, the content providers 117 may provide content secured with DRM protection for transmission. In one embodiment, the content providers 117 may also store content associated with the UE 101, the transmission platform 109, and the services 115 of the services platform 113. In another embodiment, the content providers 117 may manage access to a central repository of data, and offer a consistent, standard interface to data.

By way of example, the UE 101, the transmission platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
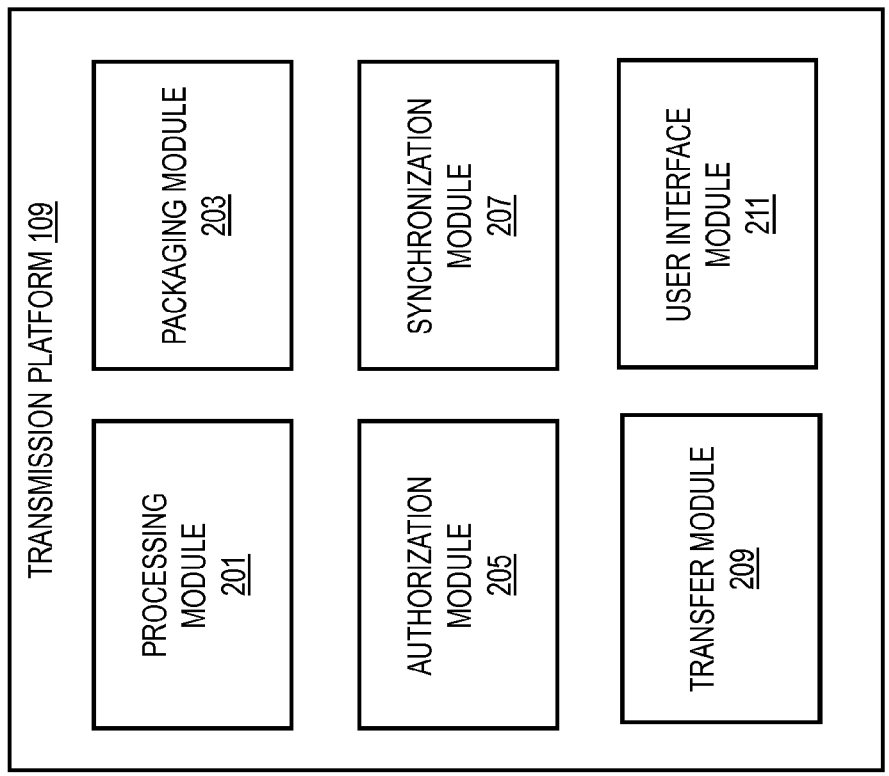
FIG. 2 is a diagram of the components of the transmission platform, according to one embodiment.

FIG. 2 is a diagram of the components of the transmission platform 109, according to one embodiment. By way of example, the transmission platform 109 includes one or more components for activating DRM protection for content and/or services for transmission to at least one device, at least one companion device, or a combination thereof. It is contemplated that the functions of these components may be combined in one or more components or performed by other components of equivalent functionality. In this embodiment, the transmission platform 109 includes a processing module 201, a packaging module 203, an authorization module 205, a synchronization module 207, a transfer module 209 and a user interface module 211.

In one embodiment, the processing module 201 may process one or more uploaded content and/or services to determine associated DRM formats to initiate DRM encryption. In another embodiment, the processing module 201 may process information associated with at least one device, at least one companion device, at least one user associated with at least one device, at least one user associated with at least one companion device, or a combination thereof to determine identification information. In a further embodiment, the processing module 201 may process at least one device and/or at least one companion device to determine connectivity status information.

In one embodiment, the packaging module 203 may receive DRM formats information, identification information, or a combination thereof from the processing module 201. Subsequently, the packaging module 203 causes a re-packaging, a re-signing, an encrypting or a combination thereof of content and/or services according to their DRM formats based on the identification information. In another embodiment, DRM protection for content and/or services includes time trial protection, usage count-trial protection, or a combination thereof.

In one embodiment, the authorization module 205 may initiate a verification process for at least one user, wherein the verification process is based, at least in part, on predefined values, a preset username and password, user identification, other authentication mechanisms, or a combination thereof. In another embodiment, the authorization module 205 may cause an authentication of at least one device, at least one companion device, or a combination thereof based, at least in part, on device identification, content identification, other identification mechanisms, or a combination thereof. In one scenario, the authentication process for at least one device, at least one companion device, or a combination thereof may involve single sign-on (SSO) session wherein a user may enter single username and password in order to access multiple content, services, and/or applications to avoid potentially duplicative or otherwise unnecessary authentication requests. In another scenario, the authentication process for at least one device, at least one companion device, or a combination thereof may involve a federated credentials session wherein an arrangement may be made to let a user use the same identification data to obtain access to the networks of other or all enterprises in a group.

In one embodiment, the synchronization module 207 may cause over-the-air synchronization of at least one registered device with the content download uniform resource locator (URL). The synchronization module 207 may cause an activation of content download process via the content download URL in at least one device. Then, the synchronization module 207 may determine completion of content download process to trigger acquisition rights for downloaded content and/or services. In another embodiment, the synchronization module 207 may cause synchronization of one or more packaged content and/or services between at least one device, at least one companion device, or a combination thereof based, at least in part, on connectivity status information received from the processing module 201.

In one embodiment, the transfer module 209 may cause a transmission of the packaged content to at least one device, at least one companion device, or a combination thereof based, at least in part, on user and/or device authentication. In another embodiment, the transfer module 209 may cause a transmission of at least one content download URL to at least one user device, at least one companion device, or a combination thereof based, at least in part, on completion of a purchase transaction. In a further embodiment, the transfer module 209 may cause a routing of transmission for content and/or services, content download URLs, or a combination thereof based, at least in part, on connectivity status information received from the processing module 201.

In one embodiment, the user interface module 211 employs various application programming interfaces (APIs) or other function calls corresponding to the applications 103 of the UE 101, thus enabling the display of graphics primitives such as menus, data entry fields, etc., for generating the user interface elements. By way of example, the user interface module 211 generates the interface in response to APIs or other function calls corresponding to the browser application of the UE 101, thus enabling the display of graphics primitives. In another embodiment, the user interface module 211 causes a presentation of one or more links for purchasable content and/or services in at least one user device based, at least in part, on user verification process. In another embodiment, the user interface module 211 may cause a notification of the availability of the newly purchased content and/or services, such notification may include a pull mechanism to check for availability of new entitlements, an asynchronous callback mechanism, or a combination thereof. In a further embodiment, the user interface module 211 may assist the authorization module 205 to cause a re-validation of one or more users based, at least in part, on user selection and/or user interaction of one or more user interface elements.

The above presented modules and components of the transmission platform 109 can be implemented in hardware, firmware, software, or a combination thereof. Though depicted as a separate entity in FIG. 1, it is contemplated that the transmission platform 109 may be implemented for direct operation by respective UE 101. As such, the transmission platform 109 may generate direct signal inputs by way of the operating system of the UE 101 for interacting with the applications 103. In another embodiment, one or more of the modules 201-211 may be implemented for operation by respective UEs, as a transmission platform 109. Still further, the transmission platform 109 may be integrated for direct operation with the services 115, such as in the form of a widget or applet, in accordance with an information and/or subscriber sharing arrangement. The various executions presented herein contemplate any and all arrangements and models.

Figure 3:
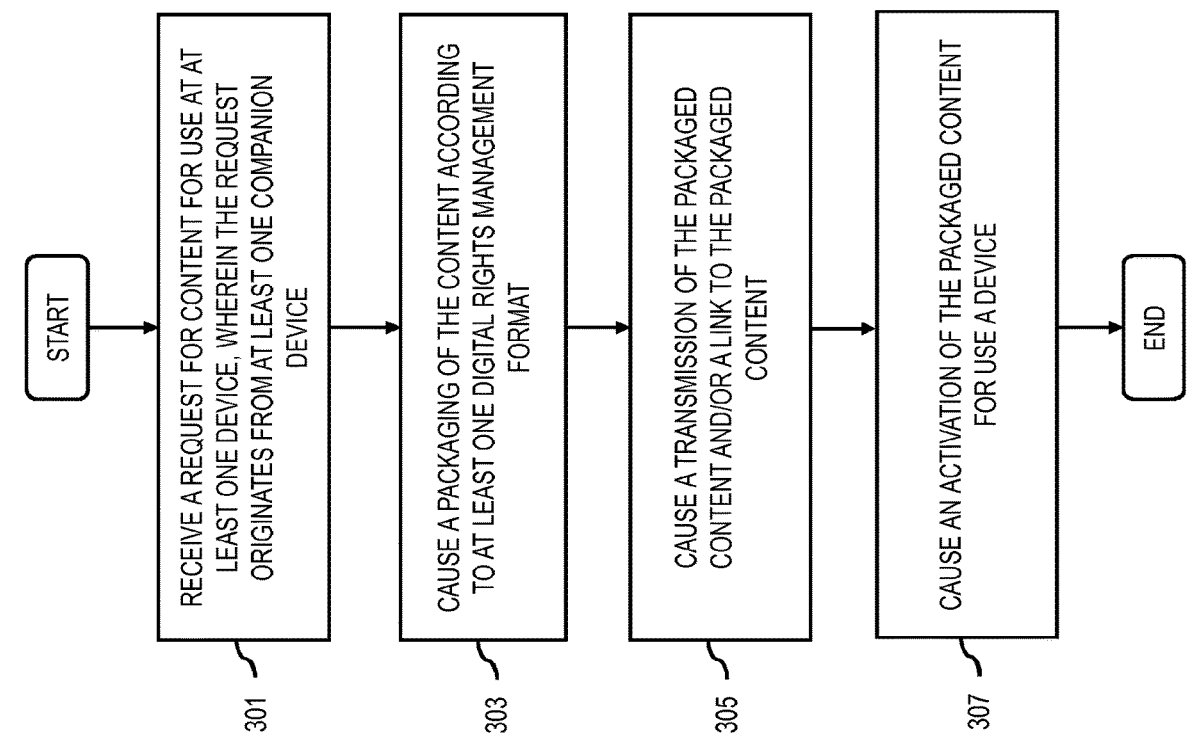
FIG. 3 is a flowchart of a process for providing digital rights management within a connected service and content environment, according to one embodiment.
Figure 21:
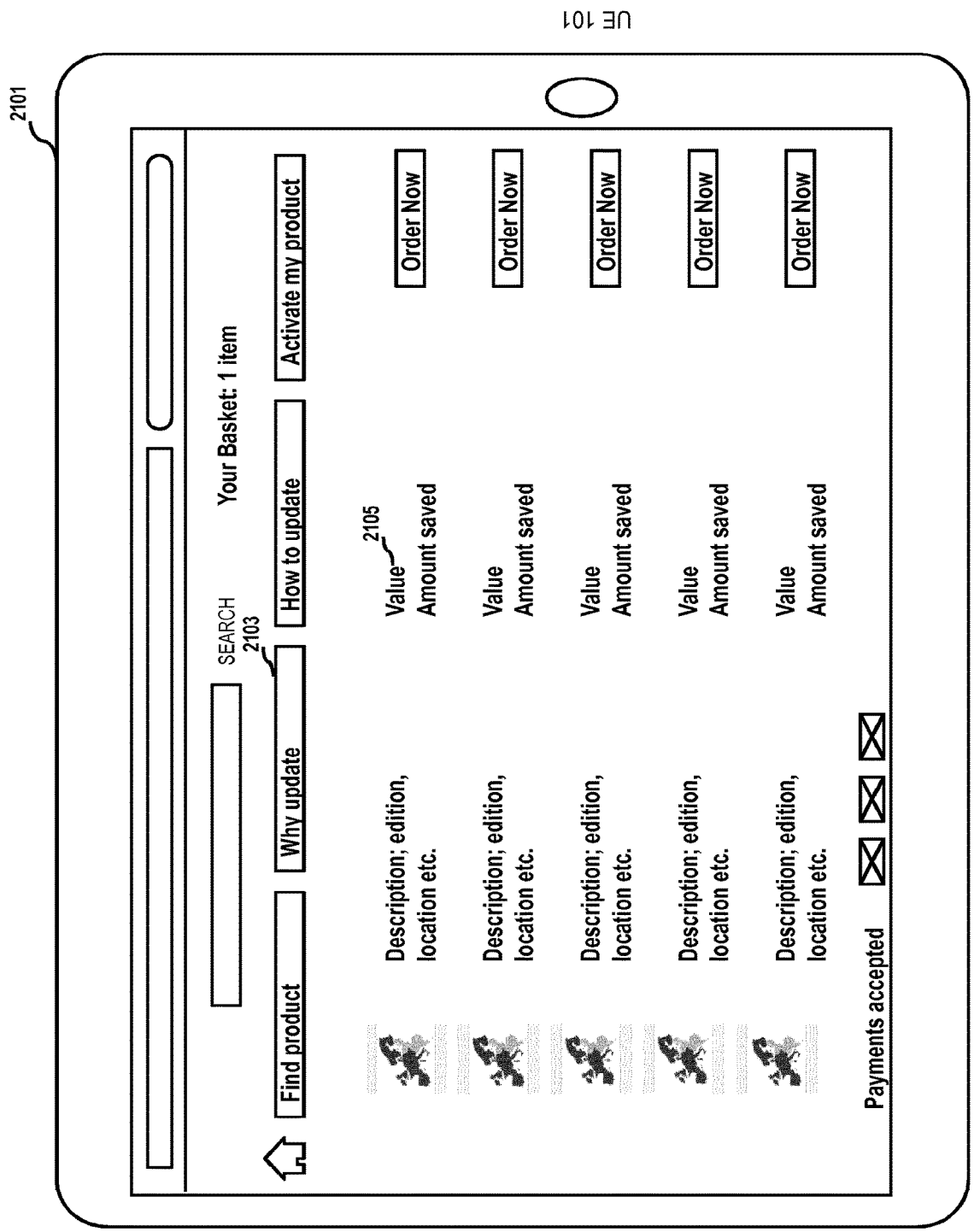
FIG. 21 is a user interface diagram that lists all the products and services available for the at least one selected vehicle, according to one example embodiment.

FIG. 3 is a flowchart of a process for providing digital rights management within a connected service and content environment, according to one embodiment. In one embodiment, the transmission platform 109 performs the process 300 and is implemented in, for instance, a chip set including a processor and a memory as shown in FIG. 21.

In step 301, the transmission platform 109 may receive a request for content for use at at least one device, wherein the request originates from at least one companion device. In one scenario, the transmission platform 109 may receive a request from a UE 101 for content for use at head-unit of a vehicle.

In step 303, the transmission platform 109 may cause at least in part, a packaging of the content according to at least one digital rights management format based, at least in part, on identification information associated with at least one of: the at least one device; the at least one companion device; at least one user associated with the at least one device, the at least one companion device, or a combination thereof and the content.

In step 305, the transmission platform 109 may cause, at least in part, a transmission of the packaged content, at least one link to the packaged content, or a combination thereof to the at least one device, the at least one companion device, or a combination thereof. In one scenario, the transmission platform 109 may cause transmission of the packaged content and/or at least one link to the packaged content based, at least in part, on completion of a purchase transaction.

In step 307, the transmission platform 109 may cause, at least in part, an activation of the packaged content for use at the at least one device.

Figure 4:
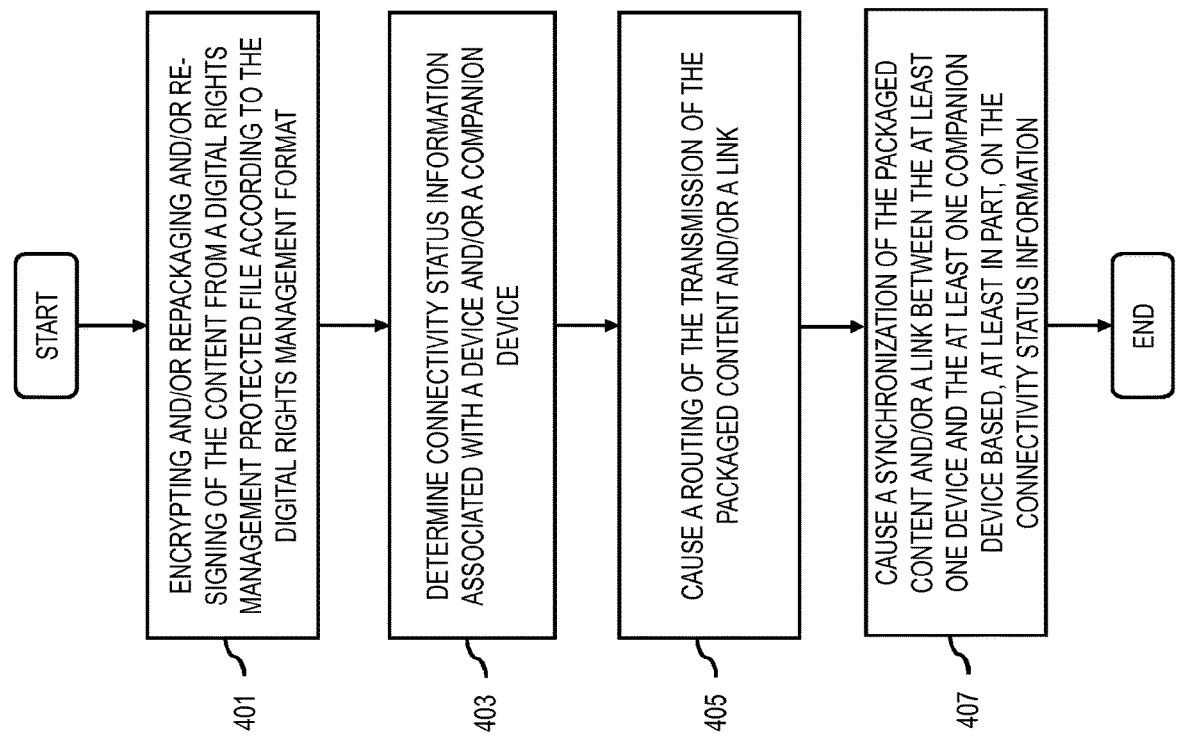
FIG. 4 is a flowchart of a process for routing DRM packaged content and/or services within a connected service and content environment, according to one embodiment.

FIG. 4 is a flowchart of a process for routing DRM packaged content and/or services within a connected service and content environment, according to one embodiment. In one embodiment, the transmission platform 109 performs the process 400 and is implemented in, for instance, a chip set including a processor and a memory as shown in FIG. 21.

In step 401, the transmission platform 109 may cause encrypting, repackaging, re-signing, or a combination thereof of the content from the at least one digital rights management protected file according to the at least one digital rights management format. In one scenario, the transmission platform 109 may use the DRM encryption system to encrypt a content file and may repackage and/or re-sign the content for storage, transmission, or a combination thereof.

In step 403, the transmission platform 109 may determine connectivity status information associated with the at least one device, the at least one companion device, or a combination thereof. In one scenario, the transmission platform 109 may determine that the at least one device (e.g. a head-unit) associated with at least one vehicle is not connected to a network. Then, the transmission platform 109 may cause transmission of notification and/or services to a device (e.g. a head-unit) associated with a vehicle via NFC (e.g. Bluetooth etc.).

In step 405, the transmission platform 109 may cause, at least in part, a routing of the transmission of the packaged content, the at least one link, or a combination thereof to the at least one device, the at least one companion device, or a combination thereof based on the connectivity status information. In one scenario, the transmission platform 109 determines that a car head-unit does not have cellular data connection. Then, the transmission platform 109 may detect network connection for a UE 101 associated with the driver of the vehicle. Subsequently, the transmission platform 109 causes the UE 101 to pro-actively communicate with the car head-unit, wherein the car head-unit may synchronize the new content download URL with the UE 101 via Bluetooth. Later, the car head-unit may access the required content using the download URL upon making a Wi-Fi connection.

In step 407, the transmission platform 109 may cause, at least in part, a synchronization of the packaged content, the at least one link, or a combination thereof between the at least one device and the at least one companion device based, at least in part, on the connectivity status information. In one embodiment, the connectivity status information includes, at least in part, a wide-area network connectivity status, a short-range connectivity status, or a combination thereof. In one example embodiment, a wide-area network connectivity may be a cellular connection. In another example embodiment, a short-range connectivity may be Wi-Fi, Bluetooth, NFC, etc.

Figure 5:
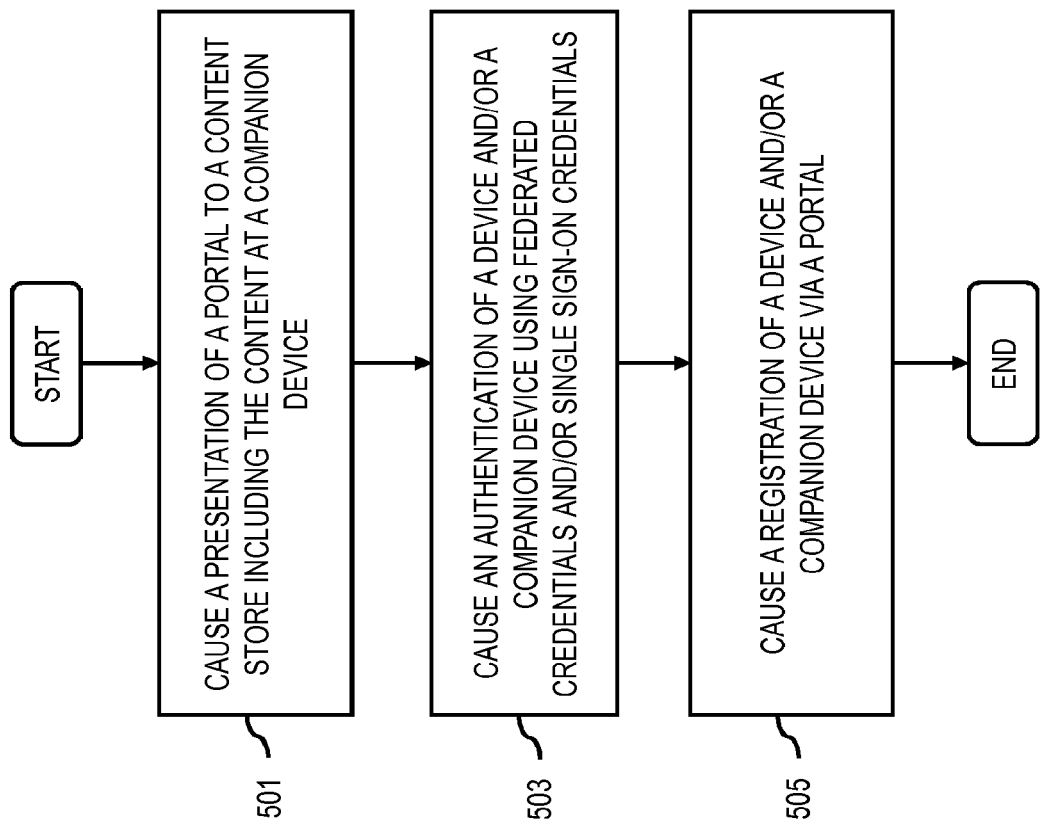
FIG. 5 is a flowchart of a process for registering devices for distribution of DRM packaged content and/or services within a connected service and content environment, according to one embodiment.

FIG. 5 is a flowchart of a process for registering devices for distribution of DRM packaged content and/or services within a connected service and content environment, according to one embodiment. In one embodiment, the transmission platform 109 performs the process 500 and is implemented in, for instance, a chip set including a processor and a memory as shown in FIG. 21.

In step 501, the transmission platform 109 may cause, at least in part, a presentation of at least one portal to at least one content store including the content at the at least one companion device, wherein the at least one portal provides one or more options for acquiring the content for use at the at least one device. In one scenario, the content store may provide the users with information on products descriptions, service details, new products and services, etc. In another scenario, a purchase completion may trigger a content download URL to be sent to at least one UE 101, and the content may be downloaded. In a further scenario, a content download URL may be over-the-air synchronized with a user's registered car head-unit if the car has mobile connectivity during a purchase. Once the content has been downloaded it results in triggering of rights acquisition, wherein the purchased rights for content is activated.

In step 503, the transmission platform 109 may cause, at least in part, an authentication of the at least one device, the at least one companion device, or a combination thereof using federated credentials, single sign-on credentials, or a combination thereof. In one scenario, the authentication mechanism may be based, at least in part, on predefined values, a preset username and password, user identification, device identification, or a combination thereof. In another scenario, the authentication mechanism may involve a federated credential system, wherein a user may use the same identification data to obtain access to a protected resource from another enterprise within a group. In a further scenario, the authentication mechanism may involve a single sign-on credentials system that permits a user to enter one name and password in order to access multiple applications.

In step 505, the transmission platform 109 may cause, at least in part, a registration of the at least one device, the at least one companion device, or a combination thereof via the at least one portal, wherein the packaging of the content, the transmission of the packaged content, the activation of the packaged content, or a combination thereof is based, at least in part, on the registration. In one scenario, the transmission platform 109 may validate the content downloaded into the UE 101 to ensure that it is activated only on registered UE 101 via signature on required device identifiers.

Figure 6:
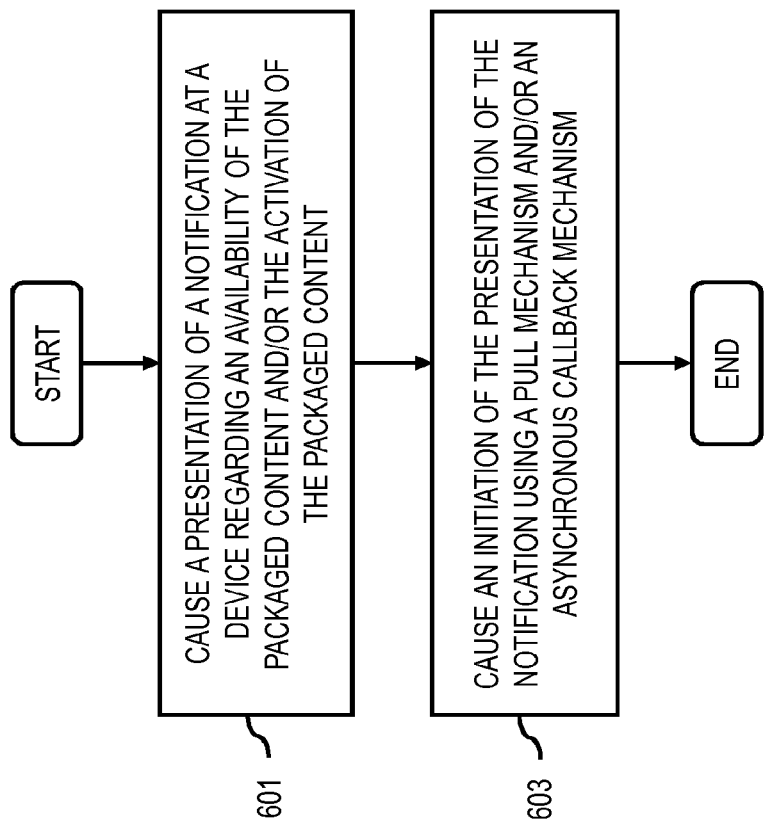
FIG. 6 is a flowchart of a process for presenting notifications regarding DRM packaged content and/or services within a connected service and content environment, according to one embodiment.

FIG. 6 is a flowchart of a process for presenting notifications regarding DRM packaged content and/or services within a connected service and content environment, according to one embodiment. In one embodiment, the transmission platform 109 performs the process 600 and is implemented in, for instance, a chip set including a processor and a memory as shown in FIG. 21.

In step 601, the transmission platform 109 may cause, at least in part, a presentation of at least one notification at the at least one device regarding an availability of the packaged content, the activation of the packaged content, or a combination thereof. In one scenario, the transmission platform 109 checks for availability of new entitlements, for example, new services for at least one user. The transmission platform 109 may notify the user regarding the availability of new services. In another scenario, the transmission platform 109 may cause activation of a service upon determination that a newly purchased service is available.

In step 603, the transmission platform 109 may cause, at least in part, an initiation of the presentation of the at least one notification using at least one pull mechanism, at least one asynchronous callback mechanism, or a combination thereof. In one scenario, a pull mechanism may involve information retrieval from a database 111, and an updating of the information in the database 111.

Figure 7:
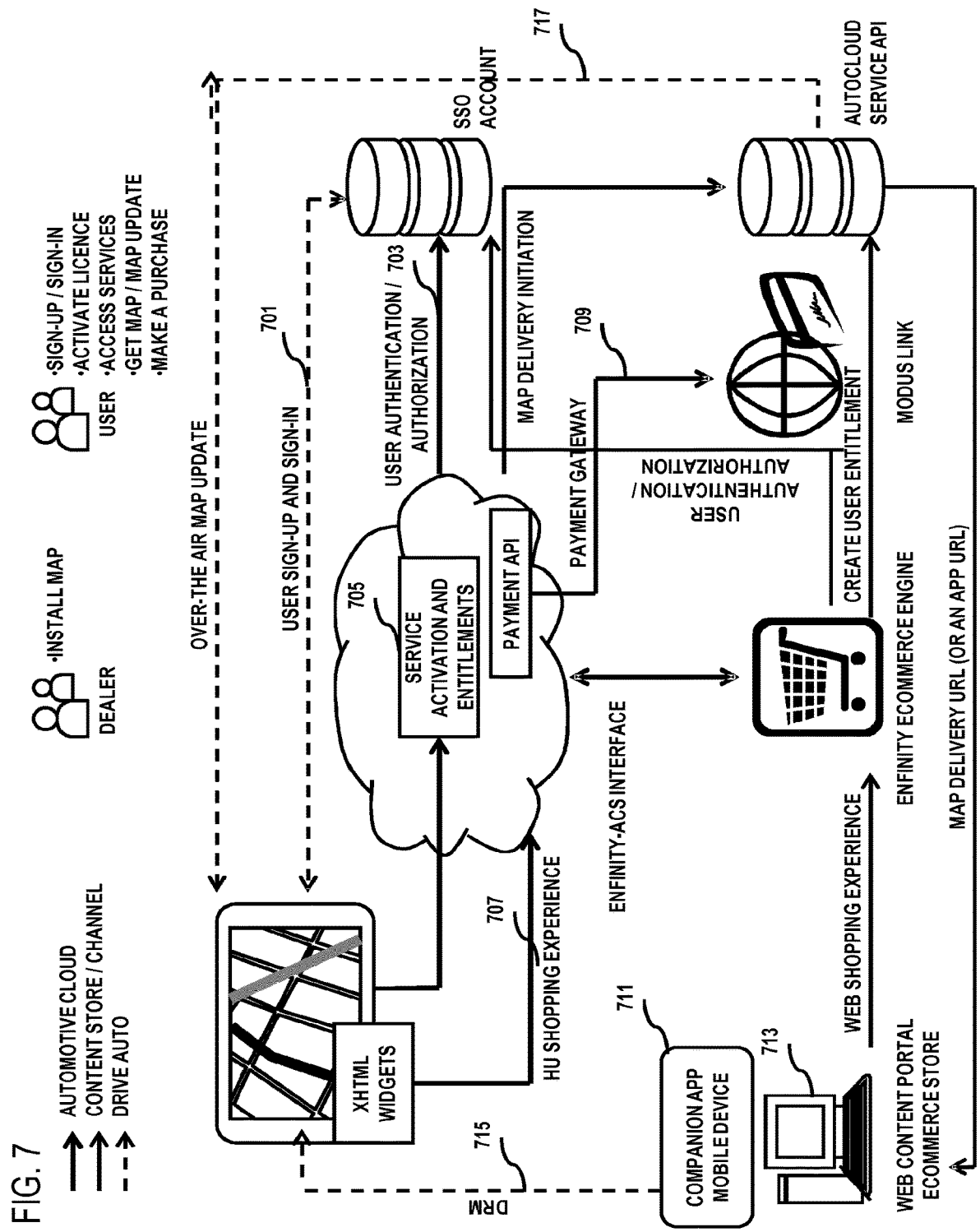
FIG. 7 is a flow diagram that represents a scenario wherein one or more services are delivered and activated in a connected devices environment, according to one example embodiment.

FIG. 7 is a flow diagram that represents a scenario wherein one or more services are delivered and activated in a connected devices environment, according to one example embodiment. The diagram elaborates upon providing a secure activation of one or more services via an ecosystem of interoperating devices, services, and networks. In one scenario, the automotive cloud services may be directed at one or more smart vehicles and in-car navigation systems that offer map and navigation content and/or services, parking services, other content services, including entertainment and media services. In one example embodiment, a user may sign-up/sign-in [701] for one or more services. Then, upon authentication of user credentials [703] one or more services may be activated whereupon a user may be entitled to content and/or services [705]. The one or more services may be delivered via head-unit [707], a device embedded in one or more vehicle. The head-unit may [707] may deliver these services to the vehicle and these services may interoperate with other connected devices for continuity of services. The one or more users are allowed to buy, subscribe and/or try these services and content either free or on a paid-for basis [709]. All of these services may or may not be branded with value added capabilities targeted for ecosystem of users within a specific OEM (car manufacturer) customer segment. In another example embodiment, other connected services linked to one or more devices in a vehicle via web-based mobile companion portal [711] may connect the experience of the vehicle to the experience and context of the user outside the vehicle. For example, various user devices (user's desktop, laptop, other handheld devices) may allow access to the content and services subscribed in the vehicle using web-based connected car companion Portal [713]. In a further example embodiment, user mobile device may allow access to the content and services subscribed in the vehicle car using mobile connected car companion application. Since these auto-cloud services are accessible via any mobile devices as a companion app [715]. This ecosystem is expandable to many different form factors of mobile and connected devices that can access and publish content in any networked environment where there is data connection via Wi-Fi, cellular network, and/or disconnected devices that periodically have access to networks [717].

Figure 8:
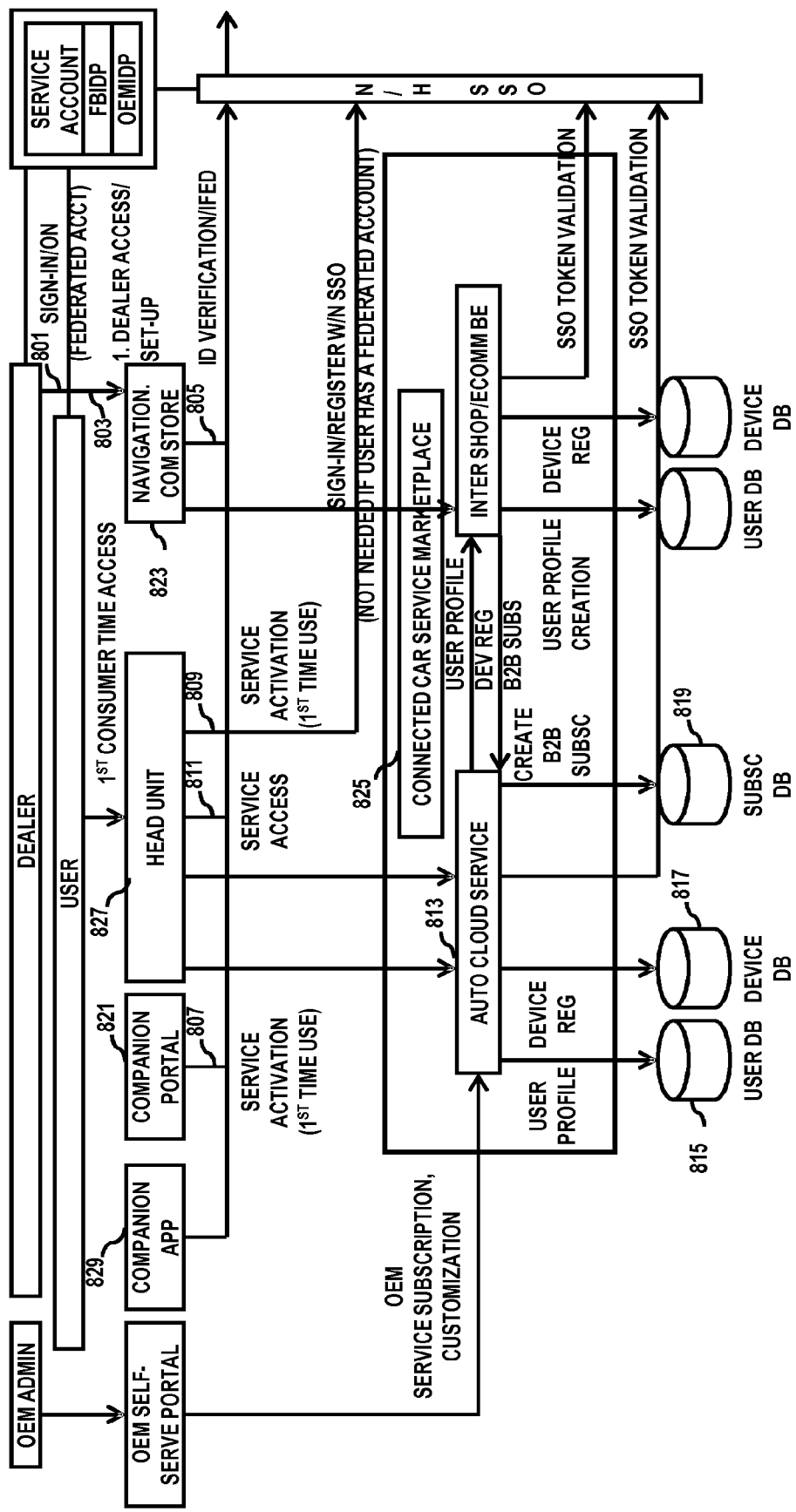
FIG. 8 is a flow diagram that represents a high level interaction model involving specialization and fine-tuning of services for delivery to at least one device, at least one other device associated with a vehicle, or a combination thereof, according to one example embodiment.

FIG. 8 is a flow diagram that represents a high level interaction model involving specialization and fine-tuning of services for delivery to at least one device, at least one other device associated with a vehicle, or a combination thereof, according to one example embodiment. In one scenario, map update is one kind of automotive cloud service that may be delivered to at least one device associated with a vehicle. Such services may be fine-tuned for one or more vehicles because sometimes vehicles may not be connected to a network for various reasons. These auto cloud services may be paid-for services, free services, trial services, subscription services etc.

Further, such services may have a right management capability for providing easy access to one or more authorized users. In one example embodiment, in the context of a connected car service marketplace [825], at least one user may activate a service for at least one registered device by signing-in to an account [801]. The connected car service marketplace may support user registration directly or indirectly via native user identity and account registration service or OEM provided user identity and account registration service. The at least one user may be navigated to a user verification stage, wherein a user should provide user identification information, a device identification information, or a combination thereof [803]. Subsequently, the transmission platform 109 upon verification of user and/or device information [805] may activate the services [807, 809] and may allow one or more users to access the services via their respective devices (e.g. head unit [827], companion device, etc.) [811].

In another example embodiment, the auto cloud service [813] may publish and protect map content and/or services file (or any other content or services) in a DRM protected file format. The auto cloud service [813] may upload map content files to an auto cloud backend [815, 817, 819], wherein the map content is identified to be DRM protected and specifies 'no trial' rights. Other option may include time-trial protection, usage count-trial protection, or a combination thereof. The auto cloud service [813] may use some DRM encryption system to encrypt a content file and repackages, re-signs the content and passes to the auto cloud content repository [815, 817, 819]. Then, the authorized user may select content (e.g. map content file) from the auto cloud repository [815, 817, 819] for purchase via a companion portal [821], such as a smart phone or tablet device or a web content store [823].

Subsequently, a purchase is triggered via interaction with a no-trial download checkout purchase experience exposed in a companion portal or a web content Store. The purchase may also be triggered via time-trial download or usage-based/count-trial download. In addition, the auto cloud service packages the purchased content, such that it can be only be un-locked by the combination of the vehicle identification and/or a set of device identification, user identification, content identification. If the purchase succeeds the corresponding transaction is updated in the purchase/subscription records within the auto cloud service [813]. In one scenario, the at least one user of the vehicle may benefit from such services for numerous years from the day of purchase, for example, an expiry date may be set up by the dealer for one or more services. Further, the vehicle identification number (VIN), the expiry date, the region information may be implemented in a DRM file, for example, the expiration date in DRM file is dependent on VIN. In another scenario, the companion portal, the navigation.com Store, the navigation application running in the head-unit may be customized via representational state transfer (REST) APIs and/or user interface components being customized to give the users of the portal (i.e., dealers and consumers) a white-labeled experience.

Figure 9:
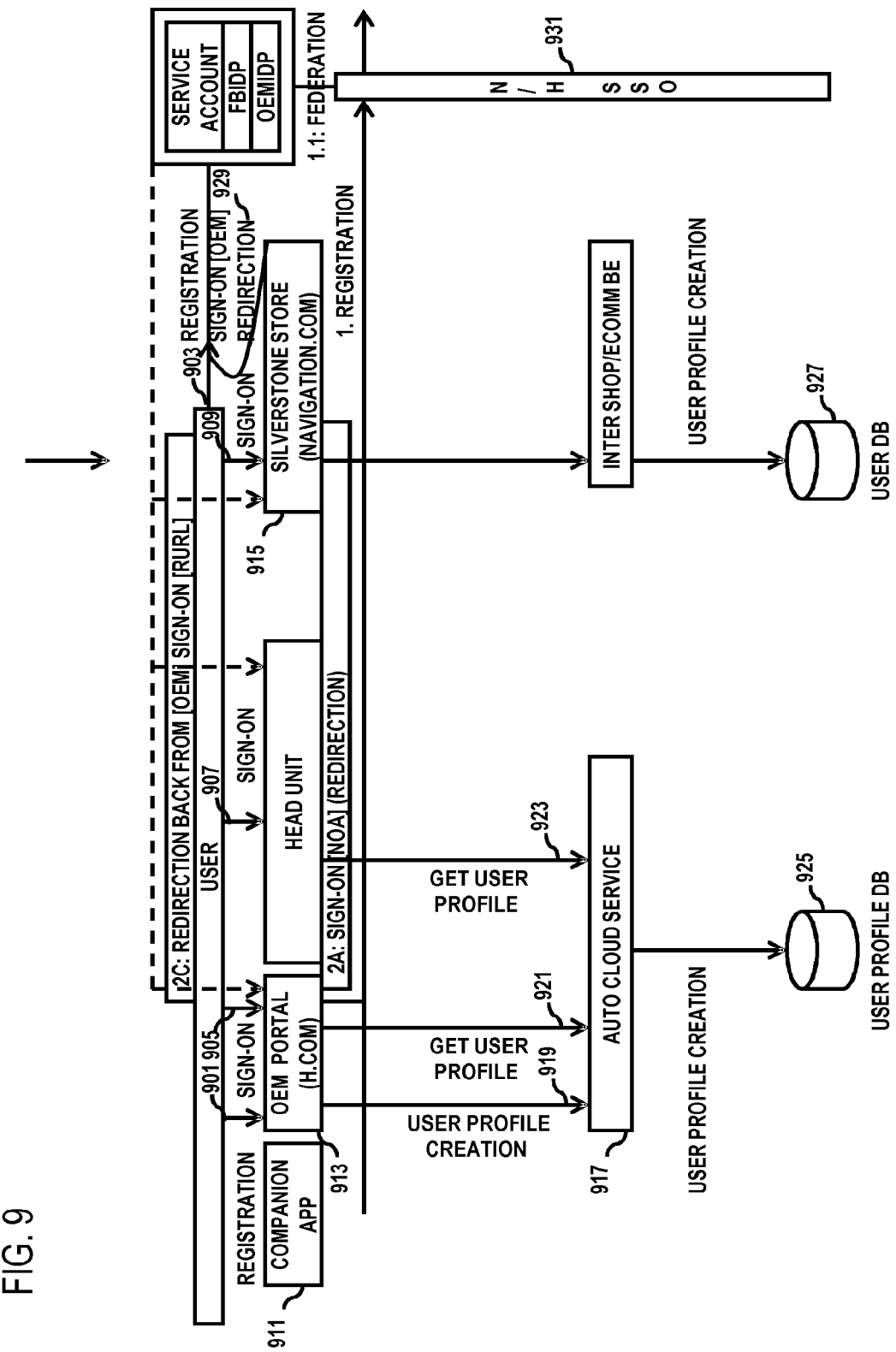
FIG. 9 is a flow diagram that represents a high level ecommerce architecture for user registration and sign-on process for accessing a service, according to one example embodiment.

FIG. 9 is a flow diagram that represents a high level ecommerce architecture for user registration and sign-on process for accessing a service, according to one example embodiment. In one scenario, a user may register [901, 903] and/or sign-on [905, 907, 909] to a service via their respective mobile devices, companion devices, or a combination thereof. The user may select at least one content and may download the content via a companion application [911] and/or a companion portal [913] and/or a web content store [915]. The auto cloud service [917] may collect user information [919, 921, 923] to create a user profile for storage in its database [925, 927]. In another scenario, a user may be redirected [929] to the customized web content store to purchase and download content and/or services based on trusted SSO service [931].

Figure 10:
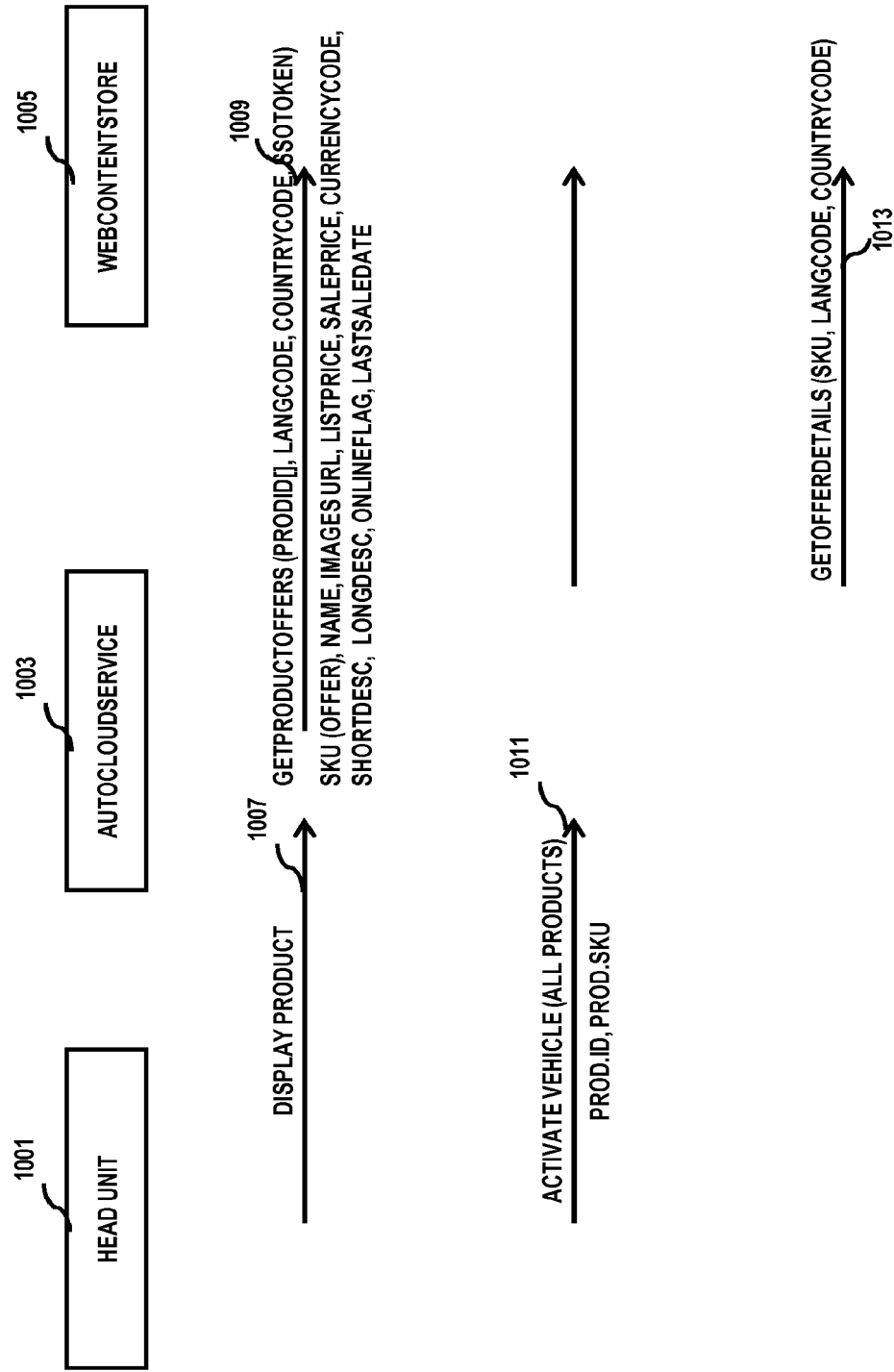
FIG. 10 is a flow diagram that represents the product catalog for a service, according to one example embodiment.

FIG. 10 is a flow diagram that represents the product catalog for a service, according to one example embodiment. In one scenario, a user may be provided with several product details and offers upon purchase of a product. In one example embodiment, a user may access an auto cloud service [1003] and/or a web content store [1005] via a device associated with at least one vehicle (e.g. a head-unit [1001]). A user may purchase a product whereupon a user may be presented with multiple offers [1009] alongside the product display [1007]. A user may choose to activate all the offers presented with the products [1011] whereupon stock keeping unit (SKU), OFFERID, may be stored in the ACS back-end (initialized in the contract/configuration) when the connected service is activated in the head-unit. Such SKU vis-à-vis ProductID links may be maintained on both ACS back-end and web content store side. In one scenario, an SSO token is needed for personalized offers in the future, and the one or more offers may be location specific, language specific etc. [1013].

Figure 11:
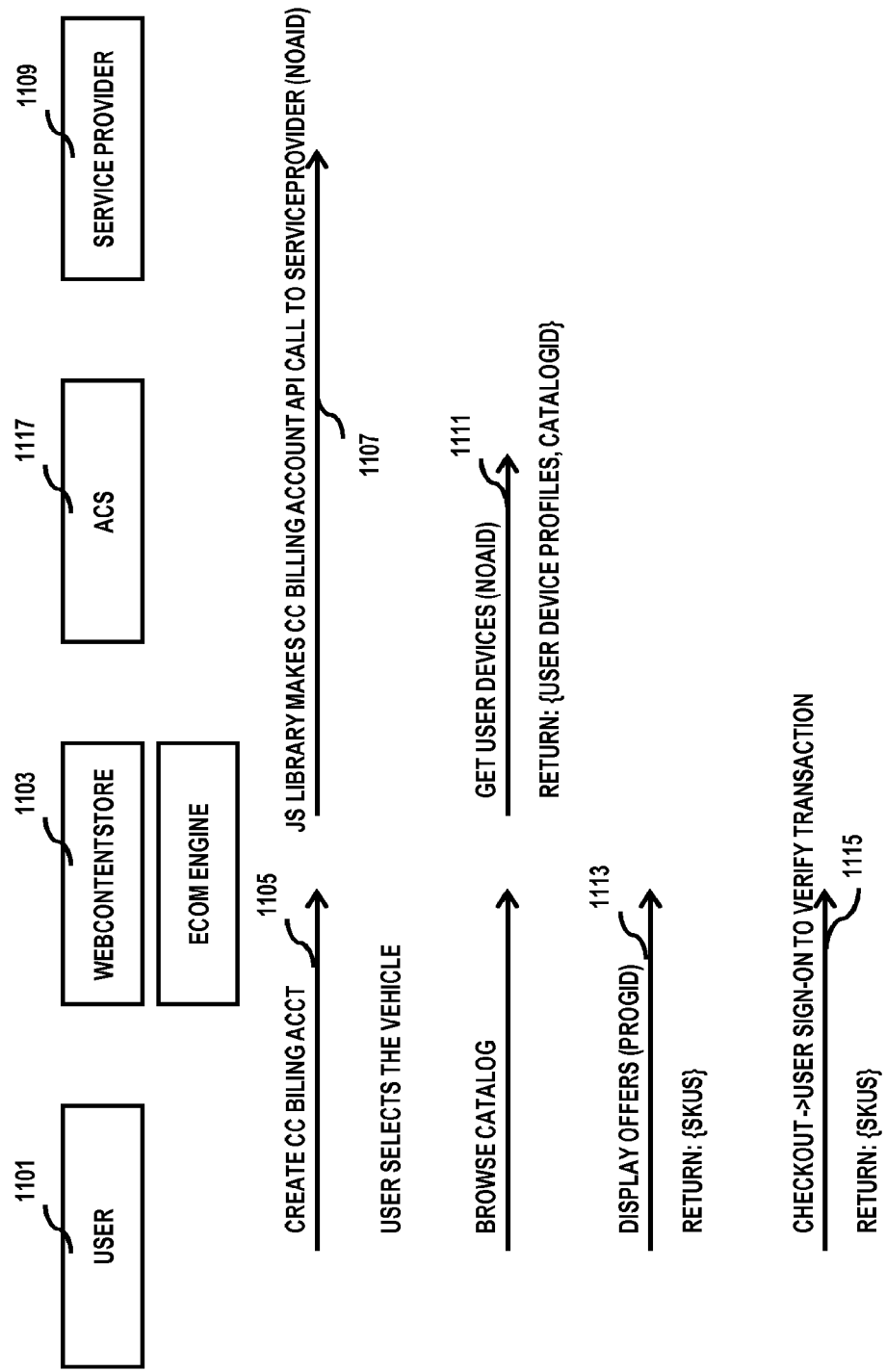
FIG. 11 is a diagram that represents a purchase flow for a service, according to one example embodiment.

FIG. 11 is a diagram that represents a purchase flow for a service, according to one example embodiment. In one scenario, a user [1101] may access a web content store [1103] to purchase a product. Then, the user may create a billing account [1105], whereupon a billing account API call may be made [1107] to a service provider [1109]. The purchase transaction involves obtaining device identification [1111] of at least one user to access the device profiles information to present a user with multiple offers [1113] alongside his purchase. The user may browse the catalogue to activate any other services and may check-out, whereupon the user may need to go through the verification process again by signing-in to verify the transaction [1115]. Then, the SKU may be stored in the ACS back-end [1117].

Figure 12:
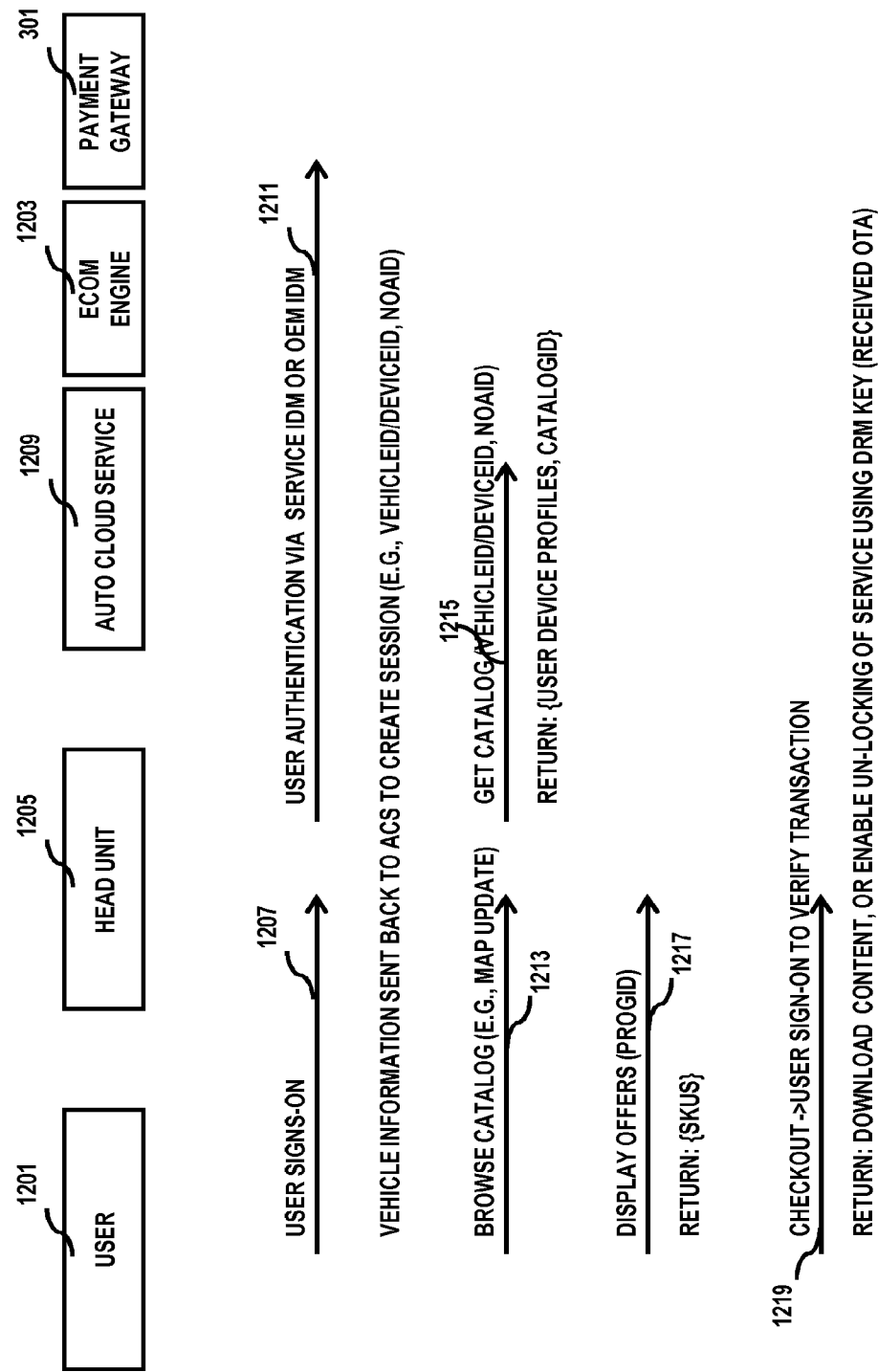
FIG. 12 is a diagram that represents a purchase flow via a car head-unit for a service, according to one example embodiment.

FIG. 12 is a diagram that represents a purchase flow via a car head-unit for a service, according to one example embodiment. In one scenario, a user [1201] is registered with an SSO account, and the user [1201] has set up his billing account via electronic commerce web-portal [1203]. Then, the user is expected to do a one-click-buy initiated from the head-unit [1205] together with the password-based transaction confirmation. The user with valid billing account may be allowed to initiate a purchase via the head-unit [1205]. In one scenario, a user may sign-in [1207] to access the auto cloud service [1209] to purchase a service, at which point a user needs to go through a verification process [1211]. Then, a user may be provided with a summarized view of the offers displayed in the head-unit [1213]. The purchase transaction involves obtaining vehicle identification and/or device identification [1215] of at least one user to access the vehicle information and/or the device information. Then, a user may browse the catalogue to activate any other multiple offers [1217] presented alongside his purchase. Subsequently, a user may check-out [1219], whereupon the user may need to go through the verification process again by signing-in to verify the transaction. Then, the user may download the content.

Figure 13:
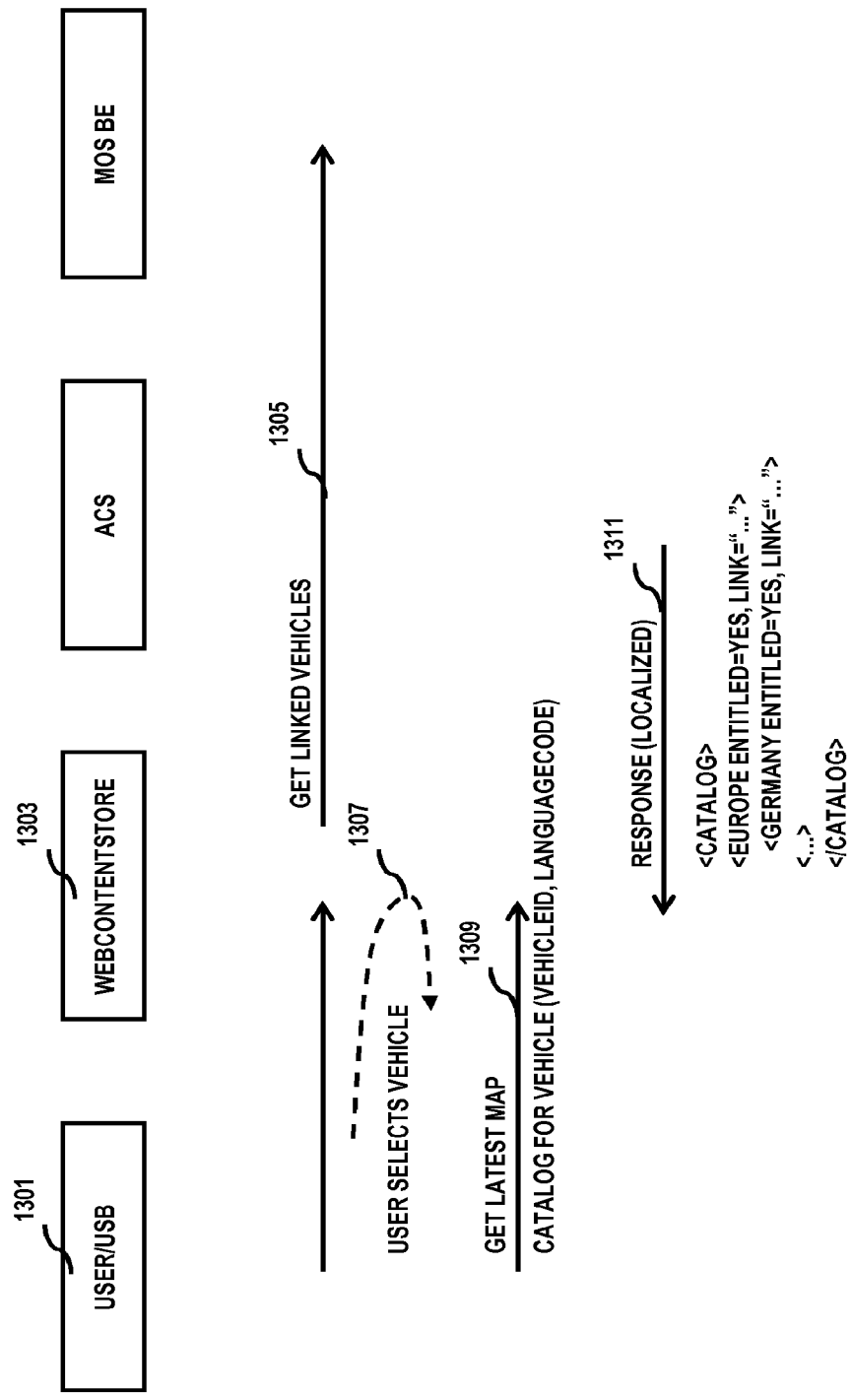
FIG. 13 is a diagram that represents a flow for content updates in at least one device, according to one example embodiment.

FIG. 13 is a diagram that represents a flow for content updates in at least one device, according to one example embodiment. In one scenario, at least one user [1301] may access a web content store [1303] to check availability of any new mapping services. The user may select a connected device associated with the at least one vehicle during this transaction [1305, 1307]. This process may involve determining the existing map coverage on the at least one vehicle, and the map coverage the at least one vehicle is entitled to [1309]. Then, the user is presented with the latest map updates alongside a catalogue for the at least one vehicle [1309]. In one scenario, a response for a service access is location based [1311].

Figure 14:
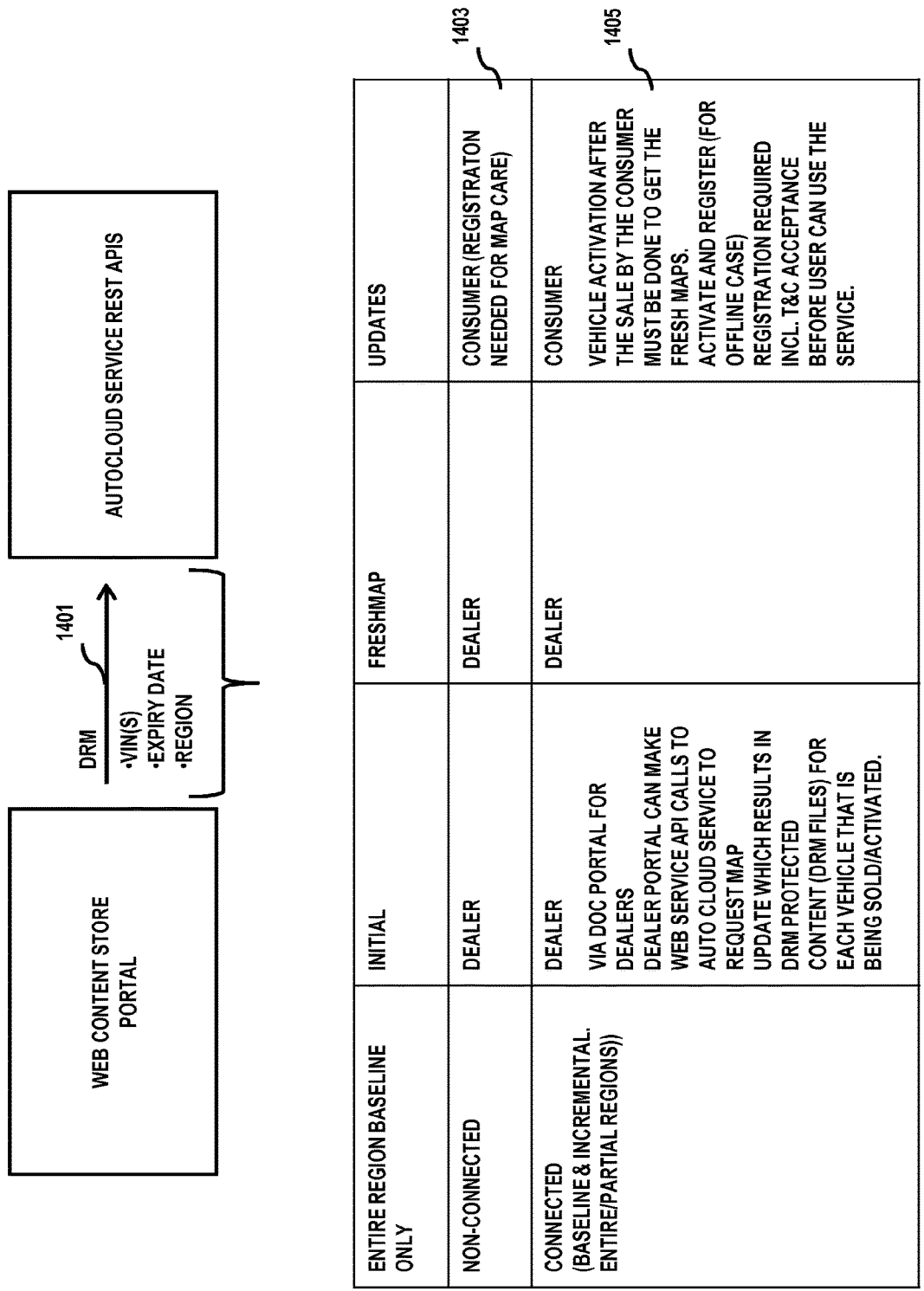
FIG. 14 is a diagram that represents a process of initial content installation by a dealer in at least one device, according to one example embodiment.

FIG. 14 is a diagram that represents a process of initial content installation by a dealer in at least one device, according to one example embodiment. In one scenario, an expiry date (or map version) could be set up already by the dealer as part of initial map installation [1401]. The VIN, expiry date, region information ends up in the DRM file. Further the expiration date in the DRM file is dependent on the VIN. In one example embodiment, consumer registration is essential for map care for one or more non-connected devices associated with a vehicle [1403]. In another example embodiment, a dealer via DOC portal for dealers can make web service API calls to an auto-cloud service to request map updates which results in DRM protected Content (DRM files) for each vehicle that is being sold/activated [1405]. Further, vehicle activation after the sale by the consumer must be done to get updated maps. In offline cases the consumer needs to activate and register the vehicles.

Figure 15:
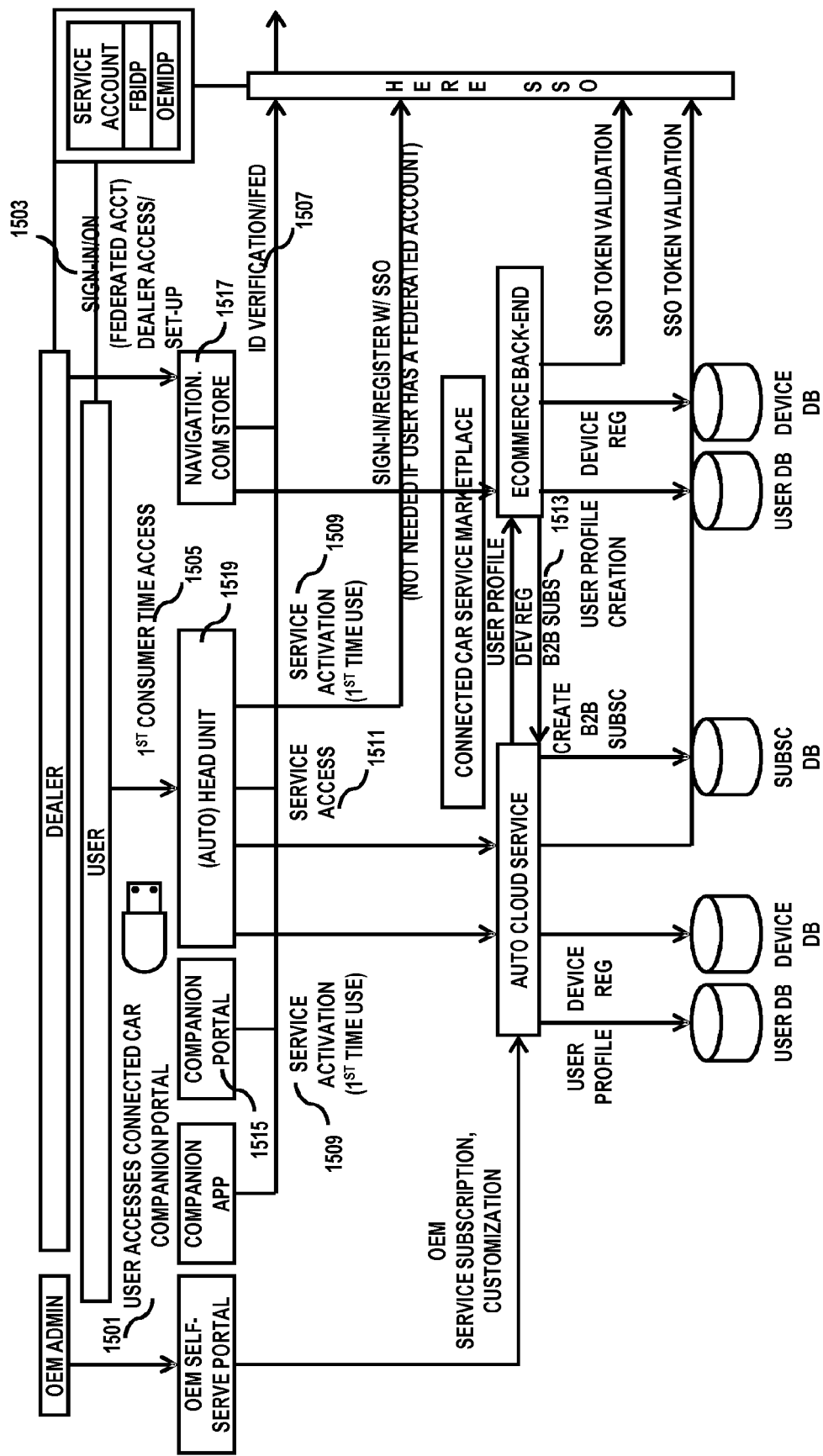
FIG. 15 is a flow diagram that represents a high level interaction model for activation of a DRM protection service, according to one example embodiment.

FIG. 15 is a flow diagram that represents a high level interaction model for activation of a DRM protection service from connected devices, according to one example embodiment. In one scenario, a user may access the connected car companion portal [1501] after signing-in a federated account [1503]. Once a user is signed-in, the user may decide to do a first time access of a service by purchasing that service [1505]. As a part of the first time access of the service, a user may go through an authentication mechanism [1507] as a part of going into the navigation.com store. A user may do a single signing-in between the companion portal and the quantity store (navigation.com), wherein the user may purchase a service and does the payment transaction [1509]. As part of the payment transaction to be completed, the system does a token validation to ensure that a user has a valid payment account [1511].

Then, the dealer activates the B2B service from a registered vehicle. In one scenario, when a customer registers his/her vehicle, the dealer activates the B2B services from the vehicle. As a result, the customer benefits from those services for 'x' number of years from the day of purchase. The expiry date for a service may be set-up by the dealer during the installation phase [1513]. In one scenario, the expiry date (or Map version) could be set up by the dealer as part of the initial map installation. Further, the VIN, the expiry date, the region information is included in the DRM file. The expiration date in DRM file is dependent on VIN. In one scenario, the companion portal [1515], the navigation.com store [1517], the navigation app running in head unit [1519] can all be customized via REST APIs and/or UI components being customized to give the users of the portal (i.e., dealers and consumers) a white-labeled experience where the portal is branded as owned by the OEM although the underlying service will be operated by the service provider.

Figure 16:
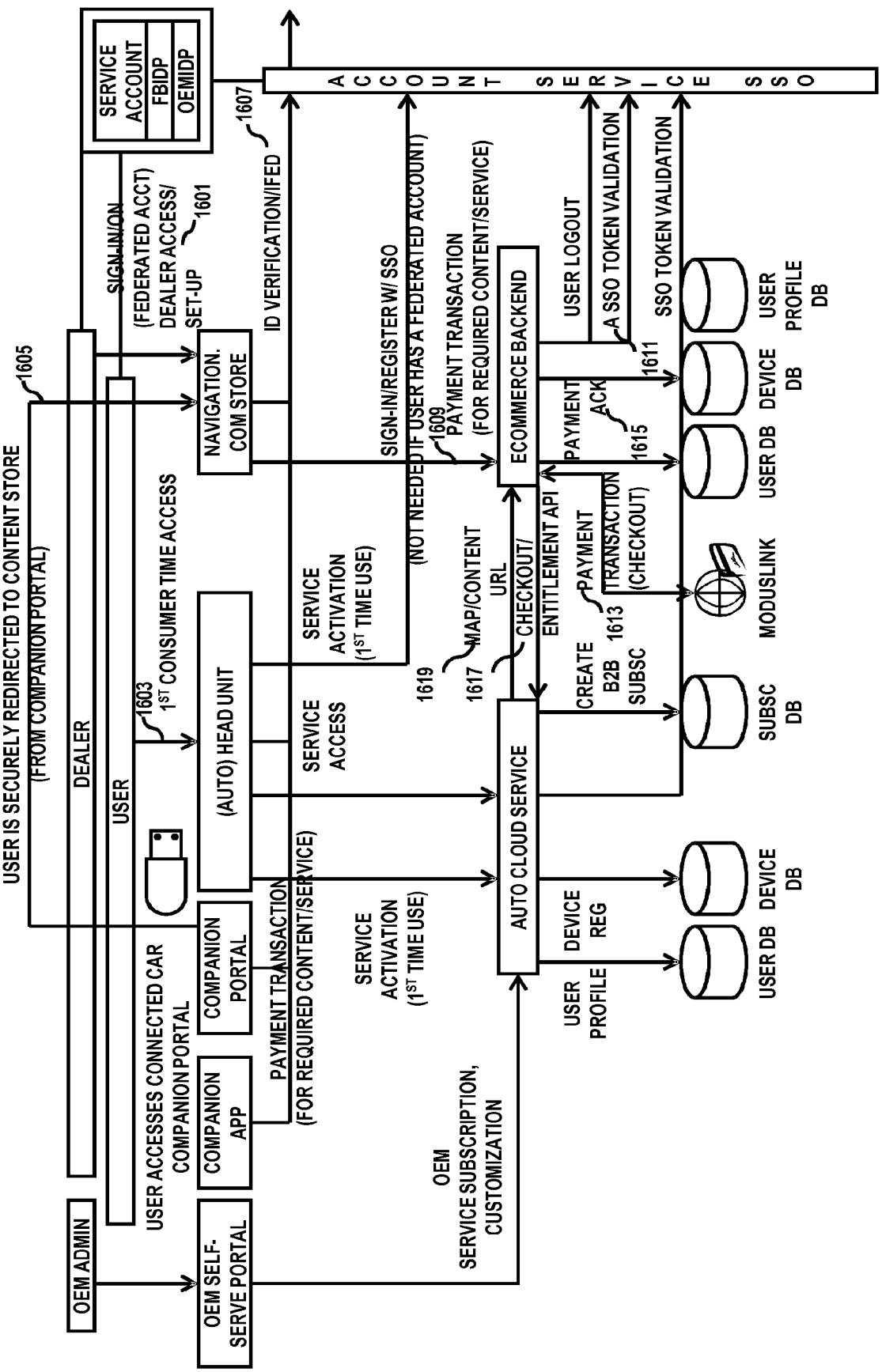
FIG. 16 is a flow diagram that provides a systematic detail for secure and seamless access to the purchased content, according to one example embodiment.

FIG. 16 is a flow diagram that provides a systematic detail for secure and seamless access to the purchased DRM protected content from connected devices, according to one example embodiment. In one scenario, a user access via a connected car companion portal (a companion portal configures one or more services, and accesses the services in a synchronized fashion with the service that is available in the at least one connected vehicle). A user may access the connected car companion portal after logging-in [1601]. Once a user is signed-in, the user may decide to do a first time access of a service by purchasing that service [1603]. As a part of the first time access of the service, the buying of the service can only be done by securely being redirected to the quantity store (navigation.com store) [1605]. A user may go through an authentication mechanism [1607] as a part of going into the navigation.com store. A user may do a single signing-in between the companion portal and the quantity store (navigation.com), wherein the user may purchase a service and does the payment transaction [1609]. As part of the payment transaction to be completed, the system does a token validation to ensure that a user has a valid payment account [1611].

Once the token validation takes place and the payment is processed [1613, 1615], the user may access the content via the auto cloud, via the URL. The auto cloud provides the user with a URL to the navigation.com site, then the URL may be used to access that service. Once the user checkout to purchase the service [1617], the auto cloud services may provide the URL pointing to a DRM protected content [1619]. The DRM protected content may be a map update, a service access authorization through the automotive cloud etc. In one example embodiment, a user may activate and/or access the service via a mobile companion application or via a connected device in the at least one vehicle. A user may sign-in through a recognized social network account that can be federated with the account of the service provider. Then, the user may use the account in the context of whether a new application can be activated, or whether a user is entitled to a new application that has not yet been activated, or whether a user is entitled to a new content that has not yet been downloaded. For instance, a user may initiate a download for accessing content and/or services by clicking a link to download or activate a service. Once the activation URL is clicked, it triggers a secure activation of a service that a user is entitled to.

Subsequently, the content is downloaded in a mobile device and is validated to show that it is activated only on the registered mobile devices via signatures on required device identifiers. For instance, in the event a car head unit does not have cellular data connection, as soon as the driver has some kind of mobile device connection, the mobile device proactively communicates to the car head unit regarding the availability of a new content wrap. Further, the car head unit via Bluetooth allows the mobile device to synchronize the new content download URL. Subsequently, the car head unit may make a Wi-Fi connection to a cloud centric location data network to access the required content using the download URL. In context of the connected vehicle head unit service activation, a user may start the vehicle and may sign-in with his credentials on the vehicle head-unit. The token in the head-unit has right expiration time on it. The vehicle head-unit is modified when new purchase content is available or an application has been purchased by the user, so the user device is entitled to configure and activate that application. The notification to the vehicle may be either through a pull mechanism to the auto cloud service to check availability of new entitlements or via asynchronous callback from auto cloud service to the vehicle head-unit.

Figure 17:
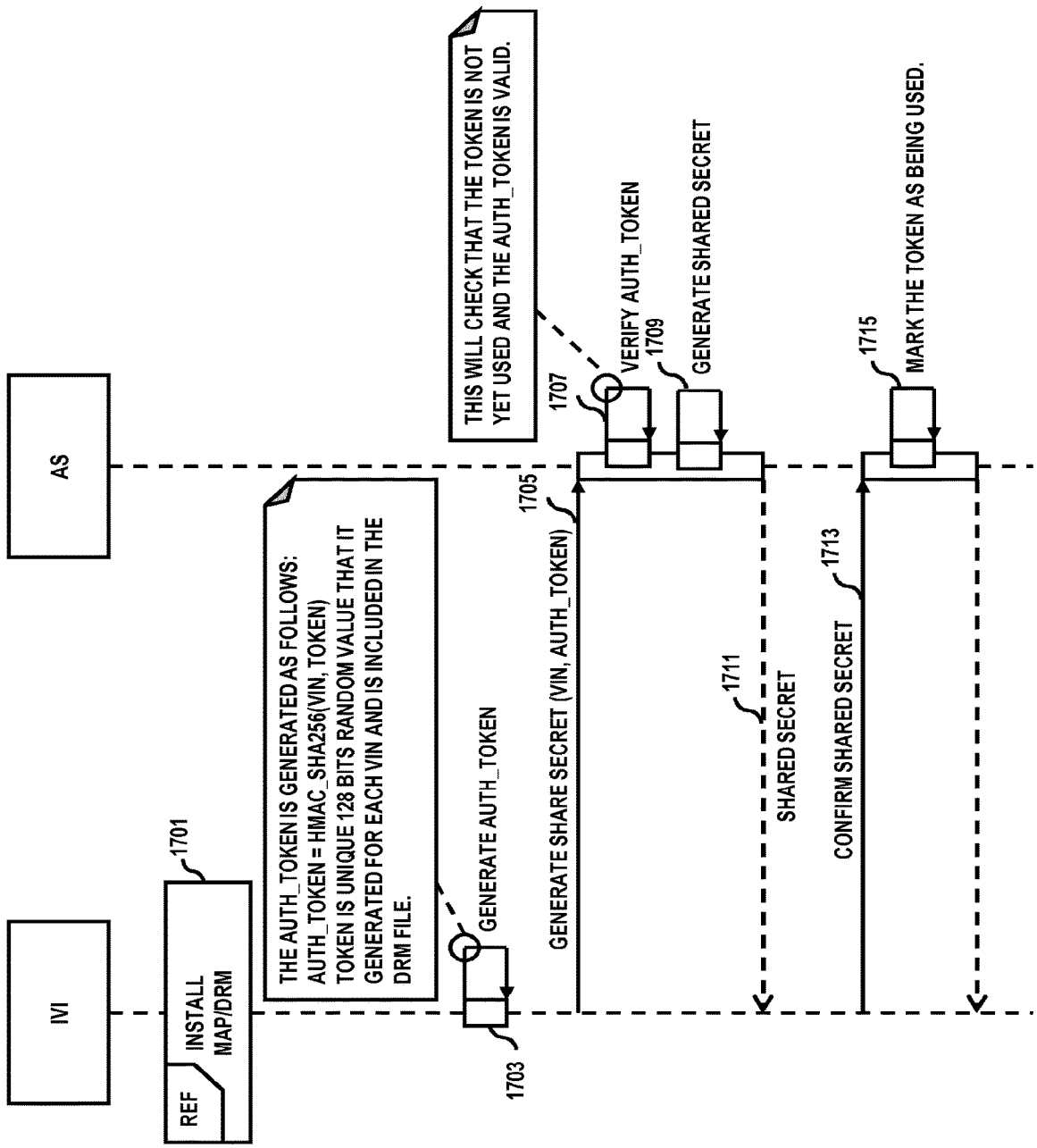
FIG. 17 is a flow diagram that represents a process for vehicle ID or connected device validation, according to one example embodiment.

FIG. 17 is a flow diagram that represents a process for vehicle ID or connected device validation, according to one example embodiment. In one scenario, one or more devices have secrets embedded in them, and when content and/or services are downloaded via the URL link [1701], such content and/or services may have some DRM protection files. Then, the auto cloud service backend may generate a unique 128 bit (secure) random token per VIN [1703]. This token may be included in the DRM file and transported via an USB key to a smart car related device or client such as an Interchangeable Virtual Instruments (IVI) panel or device. In one scenario, any subsequent download of the DRM files may include the same token if it has not yet been used, otherwise new token may be generated [1705]. In one scenario, the authToken may be generated from the vehicle token using the following formula:

$$authToken=hmac\_sha256(VIN,token).$$

If the token is not yet used and the authToken is valid then a 256 bit random value (aka shared secret) is generated and associated to the vehicle [1707]. In one scenario, an IVI must go through a process of generating a shared secret before using any of the APIs provided by the AS backend [1709]. The IVI is generated via the same shared secret that was first installed in the device. Therefore, a downloaded DRM protected file can only be de-coded using the shared secret in the device. The DRM protection files are generated using the IVI, and the IVI is a one-time code that can only be de-coded using the shared secret that was initially installed in the device [1711]. In one embodiment, the API is used to generate the shared secret via the IVI. Then, the API is used by the IVI to generate a shared secret that will be used in subsequent calls to AS backend. Further, the shared secret must be confirmed by the vehicle before it can be used to authenticate to other APIs [1713]. Following is the formula for generating shared secret for each vehicle and/or connected devices:

```
Request
POST /vehicles/handshake
Payload
{
"vehicle": {
"vin": "VF458663GY15",
"platform": {
"id": "",
"version": ""
},
"embeddedClient": {
"id": "",
"version": ""
},
},
"authToken": "123"
}
Response
200 OK with the following body:
{
"result":"123"
}
```

In one scenario, the system may confirm shared secret for at least one vehicle (i.e., authenticate the connected device) [1713]. The system may use the secret from previous step to authenticate via the Authentication header [1715]. If the authentication is successful then the HTTP response code will be 204. Following is the example for authenticating a connected device:

Request
POST/vehicles/handshake/confirmation
Authentication: HEREAuto 1234adfadfadfasdfadsf
Payload: None
Response
204 No Content if the authentication is successful.

Figure 18:
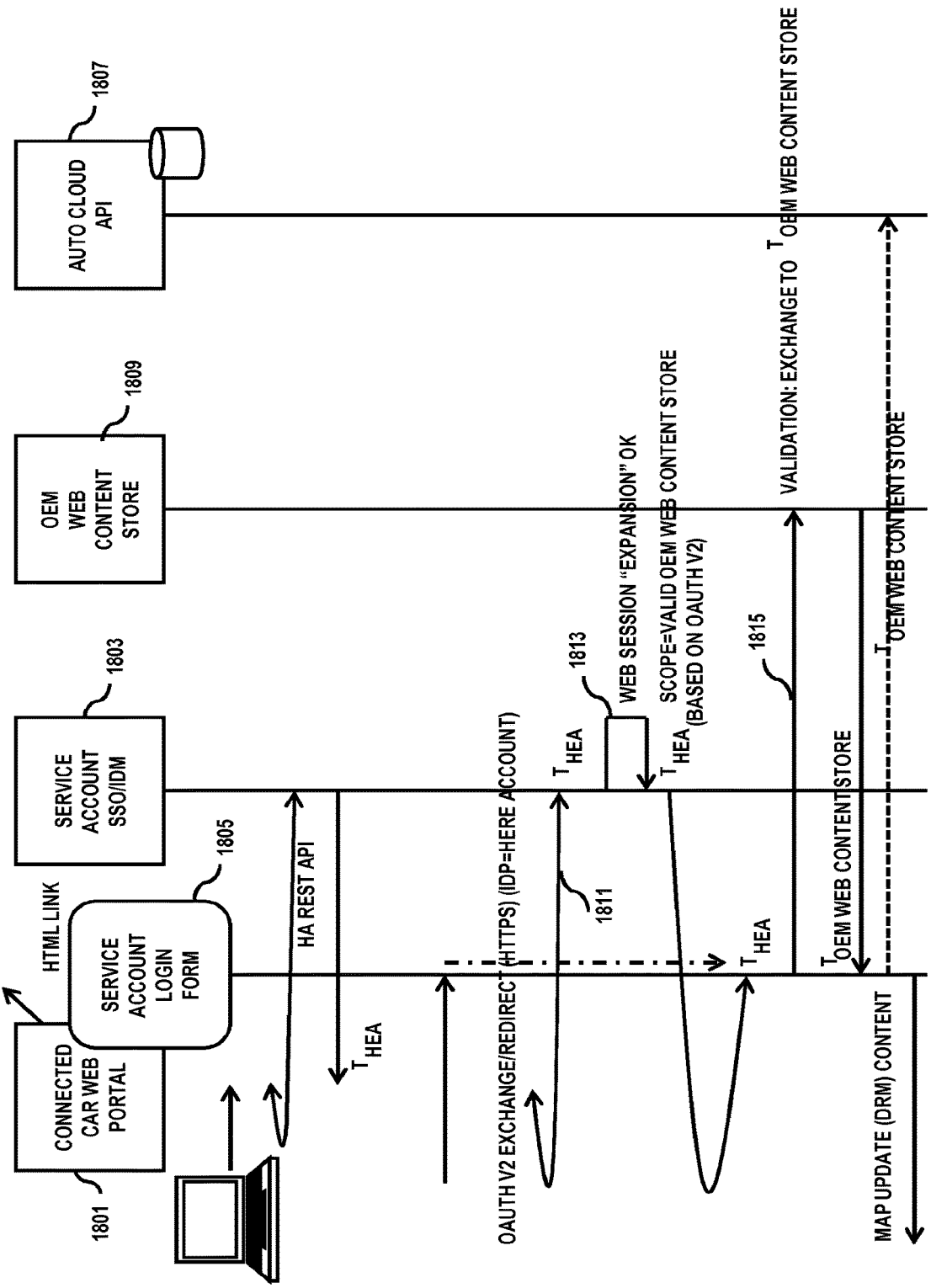
FIG. 18 is a diagram that represents a web companion portal/web content store for SSO enablement, according to one example embodiment.

FIG. 18 is a diagram that represents a web companion portal/web content store for SSO enablement, according to one example embodiment. In one scenario, a branded connected vehicle web companion portal [1801] may be served by a web server operated by a service provider [1803]. The branded connected vehicle web companion portal may serve user a custom Login/Logout user interface [1805]. The connected vehicle web companion portal may authenticate users via back-end REST API [1807] call to the account service of the service provider to validate the user credential. Then, the user may be the redirected [1811] to the branded web content store [1809] to purchase and download map content/updates. Further, the user can access the branded web content store portal such that the 'OAuth' token is validated by the web content store back-end [1813], including whether the user is allowed federated access from the web companion portal to the web content store [1815]. In one scenario, a commerce relationship is established between a user and the marketplace directly via native billing account capabilities which are exposed via the web-based content store portal (e.g., for map subscriptions or map update purchases) as well as directly in the car via head-unit application that interfaces with the marketplace to access paid and free auto-cloud services.

Figure 19:
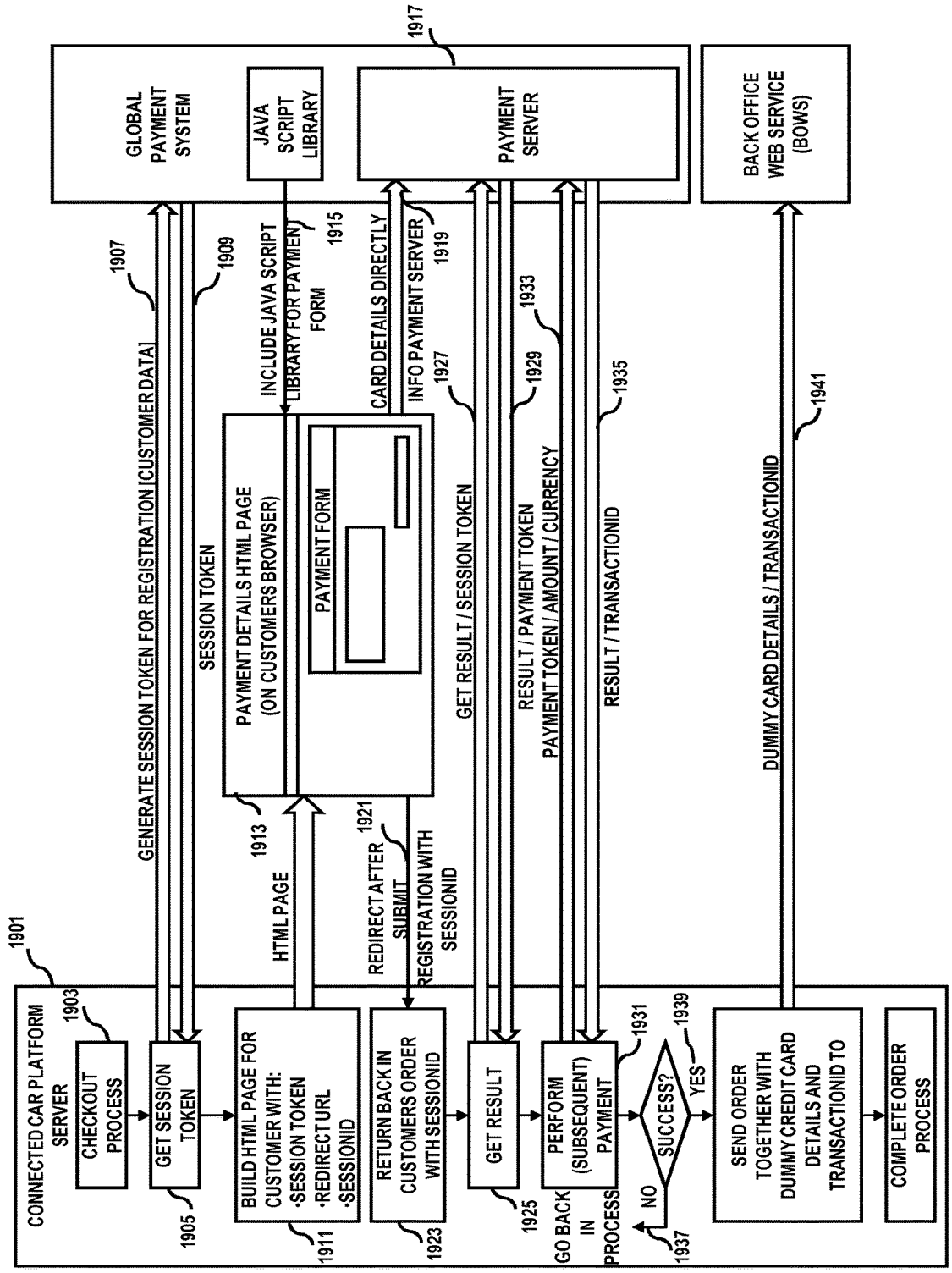
FIG. 19 is a diagram that represents the web content store payment processing system, according to one example embodiment.

FIG. 19 is a diagram that represents the web content store payment processing system, according to one example embodiment. In one scenario, the connected car platform server [1901] may initiate a check-out process [1903]. The connected car platform server may obtain session token [1905] by sending a request to the global payment system [1907], upon which the global payment system generates session token for registration [1909]. Then, the connected car platform server may build HTML page for the user with the session token, re-direct URL, and session ID [1911]. The HTML page may be presented on the browser of at least one device associated with a user with the payment details [1913]. The global payment system may provide java script from its library in the payment form [1915]. Subsequently, a user enters the credit card information for making the payment, at which point the payment server [1917] is queried for the card details and authentication [1919].

Then, the HTML page is redirected to the connected car platform service alter submission of the registration with session ID [1921], wherein it is returned back in the customer's order with session ID [1923]. Next, the connected car platform server obtains the result [1925] from the payment server [1917] by sending a request for the result alongside a session token [1923], and in return receives the result with the payment token [1929]. Subsequently, the connected car platform server performs payment transaction [1931] with the payment server [1917] by providing the payment and the payment token [1933]. In response, the payment server [1917] provides the result and the transaction ID to the connected car platform server [1935]. If the payment process is unsuccessful, the steps are repeated [1937]. On the other hand, the connected car platform server may send order together with dummy credit card details and transaction ID to the bank office web service based on a determination that the payment transaction was successful [1939, 1941].

Figure 20A:
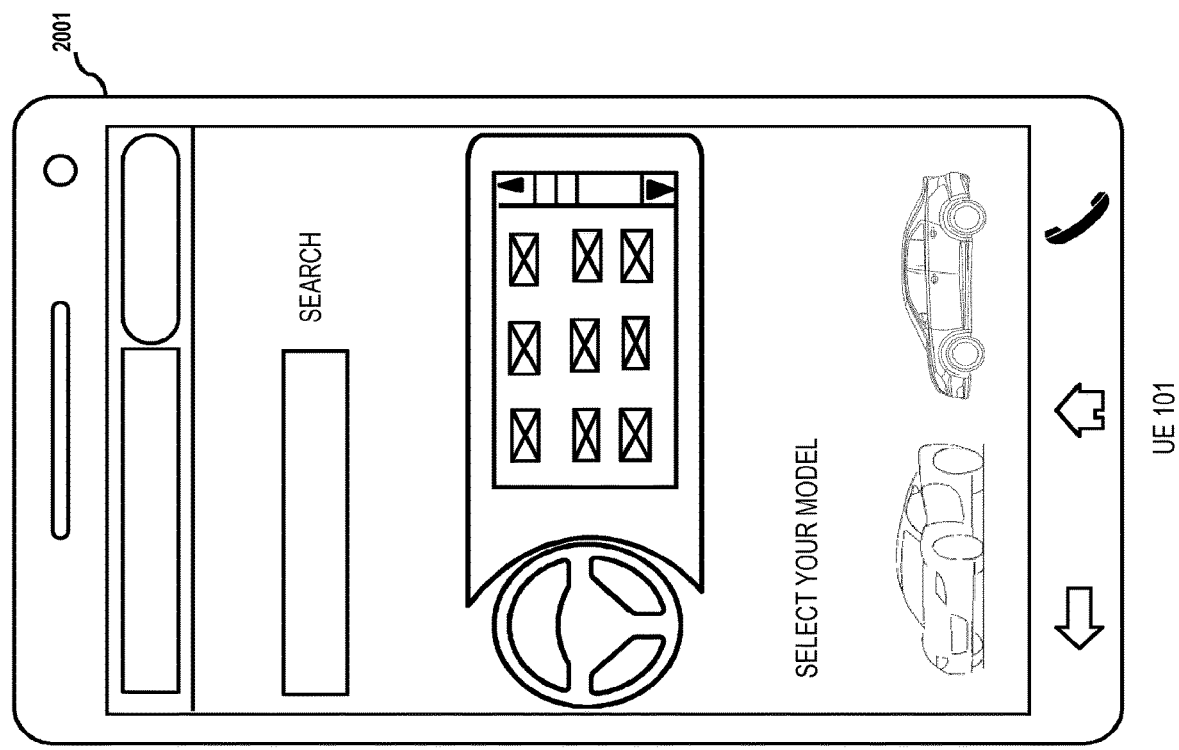
FIGS. 20 A-B are user interface diagrams that represents a scenario wherein one or more users have access to numerous updates, content, and/or services pursuant to selection of a particular vehicle, according to one example embodiment.
Figure 20B:
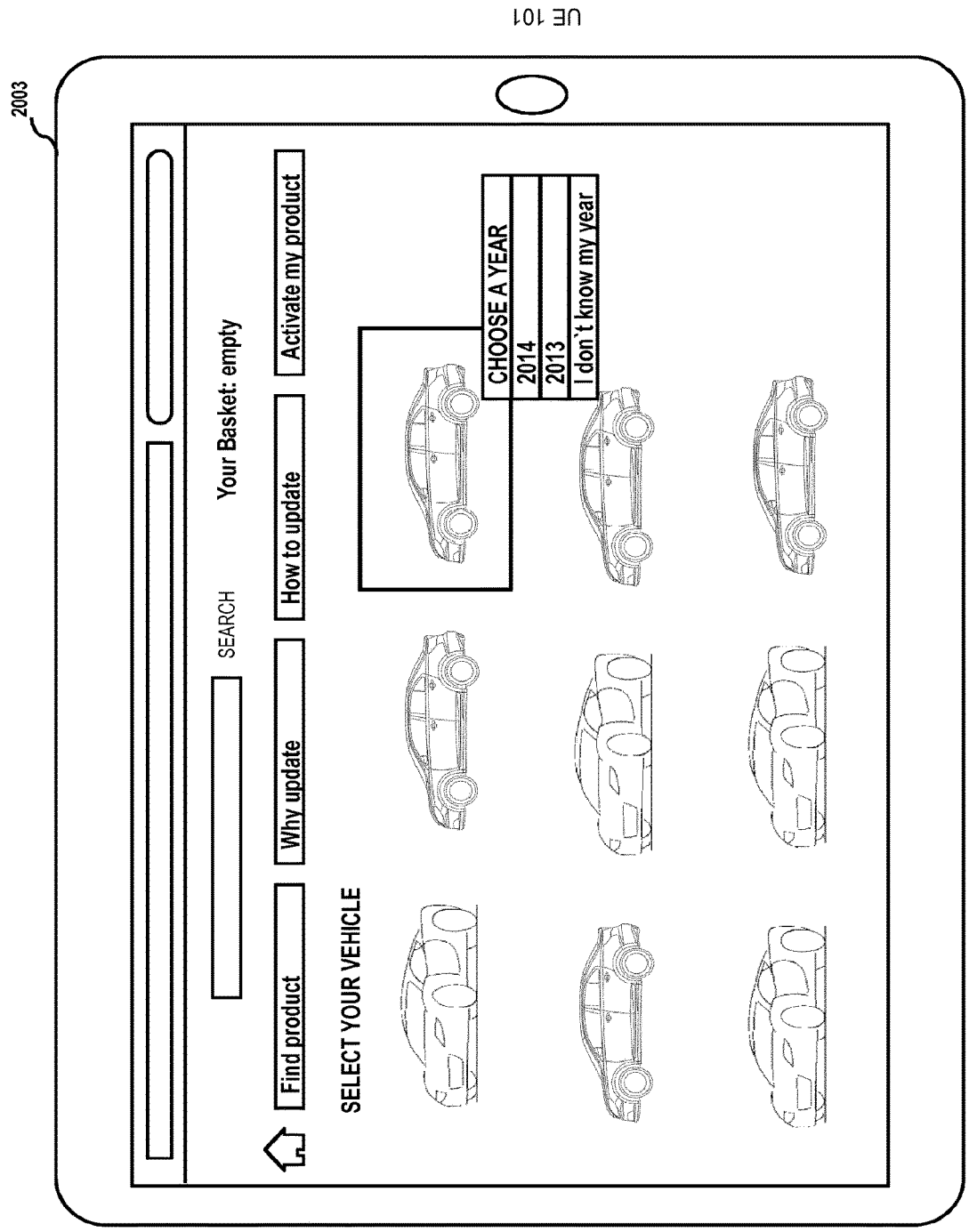

FIGS. 20 A-B are user interface diagrams that represents a scenario wherein one or more users have access to numerous updates for content and/or services pursuant to selection of a particular vehicle, according to one example embodiment. In one scenario, a user may select at least one vehicle via his UE 101 [2001, 2003]. Then, the user may be presented with various products, product updates, content, and/or services associated with the selected vehicle. In one scenario, the model of the vehicle, the year it was manufactured, etc. are taken into consideration while determining the products, the updates and the content and/or services. Further, the one or more users may be presented with best sellers or related content and/or services while logged-in. In addition, one or more user may log-in to search for products, updates, change information (e.g. change country), content and/or services.

FIG. 21 is a user interface diagram that lists all the products and services available for the at least one selected vehicle, according to one example embodiment. In one scenario, a user may select a vehicle. Then, the user may be presented with the list of product information associated with the selected vehicles [2101], update information on the products associated with the selected vehicle [2103], cost information [2105], or a combination thereof.

Figure 22A:
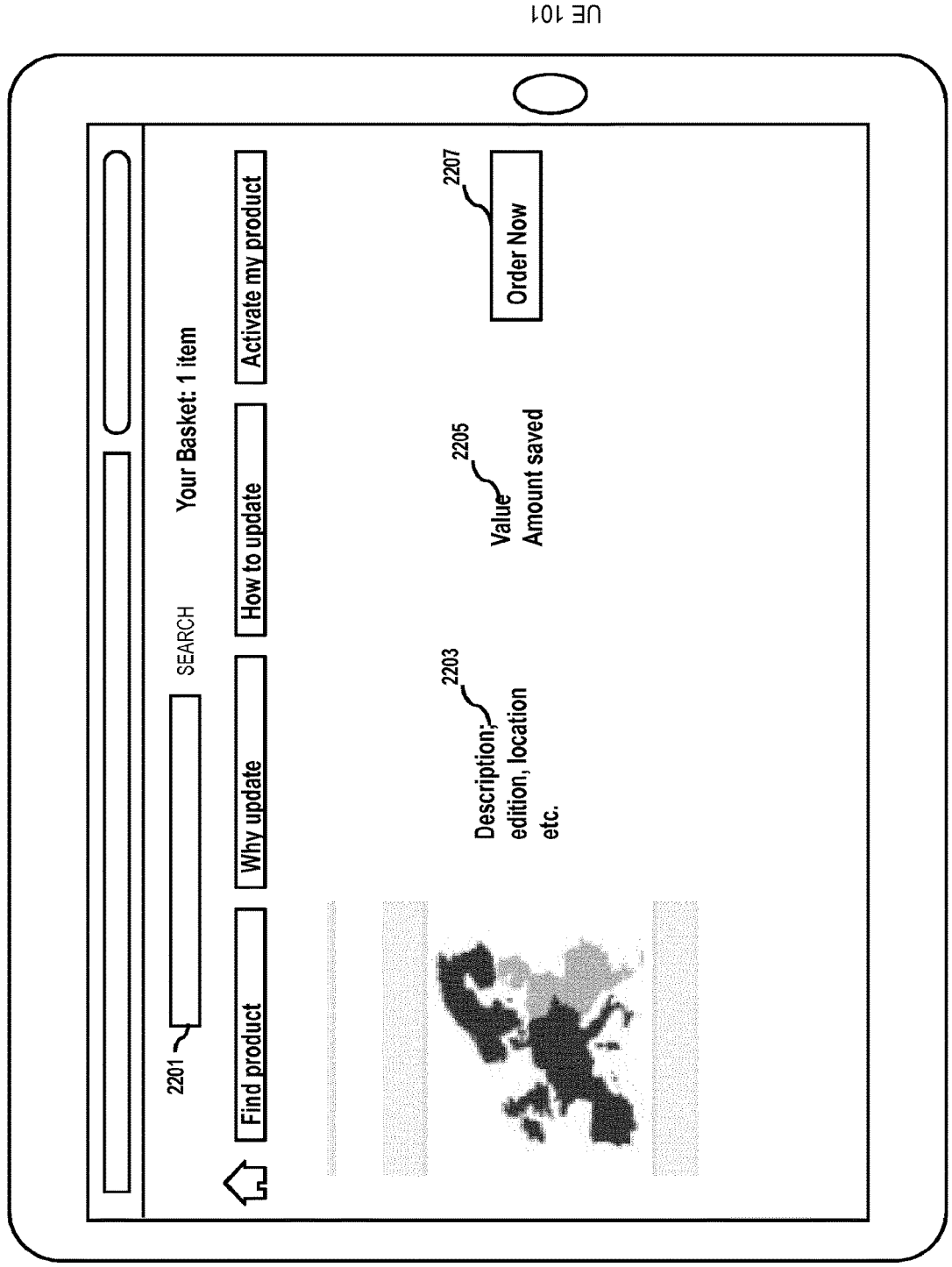
FIGS. 22 A-B are user interface diagrams that represents a product page, according to one example embodiment.
Figure 22B:
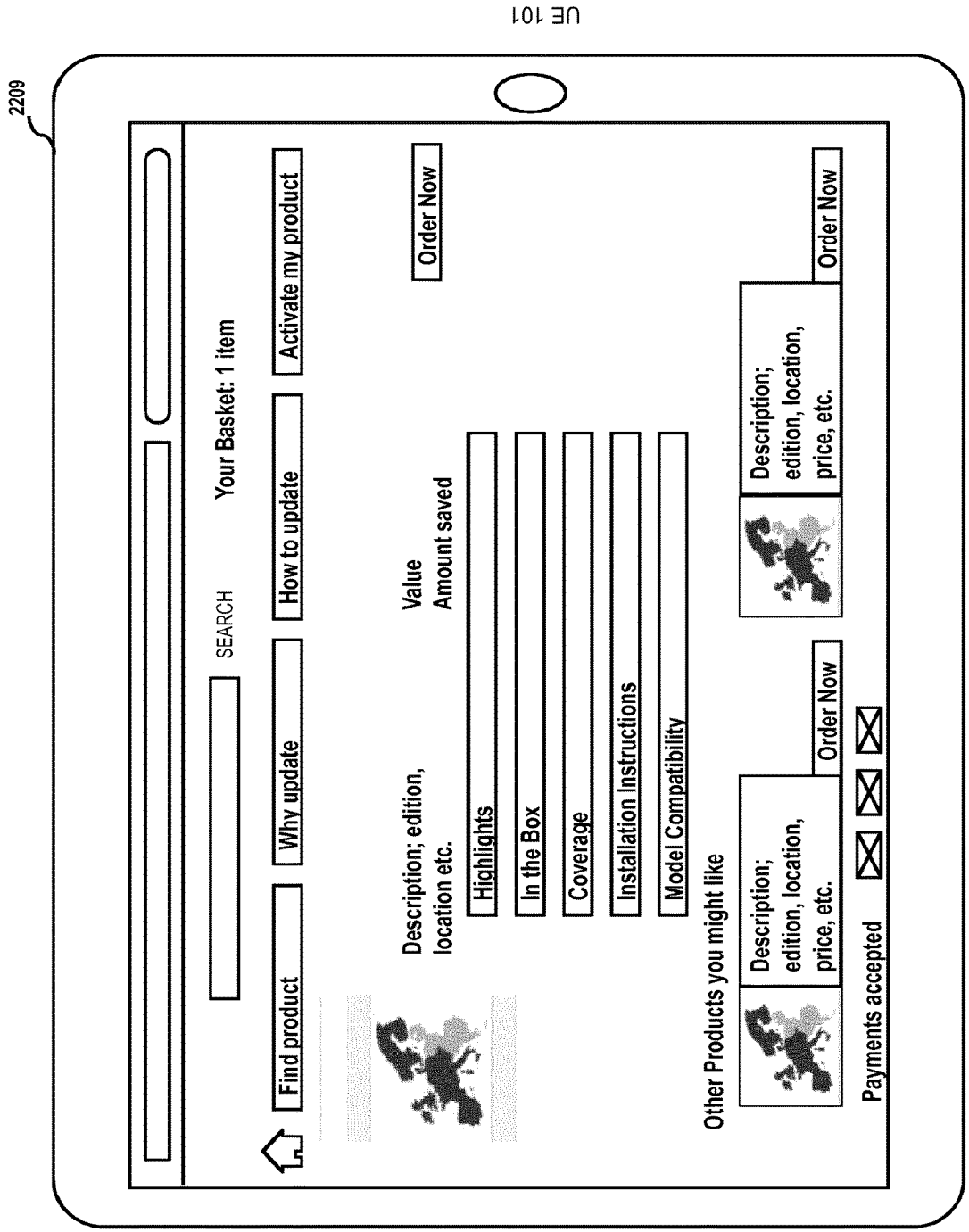

FIGS. 22 A-B are user interface diagrams that represents a product page, according to one example embodiment. In one scenario, a user may search for products by entering the product name or any related information in the search tab [2201]. Then, the user may be presented with the product description [2203] together with cost information [2205]. The user may purchase the product by clicking on the 'order now' tab [2207]. In another scenario, the product page needs to be enhanced with connected service specifics once defined by product management [2209]. The connected services have different attributes to standard updates. The specificities must be specified by the product management, for example, service validity data, different call to action etc.

Figure 23:
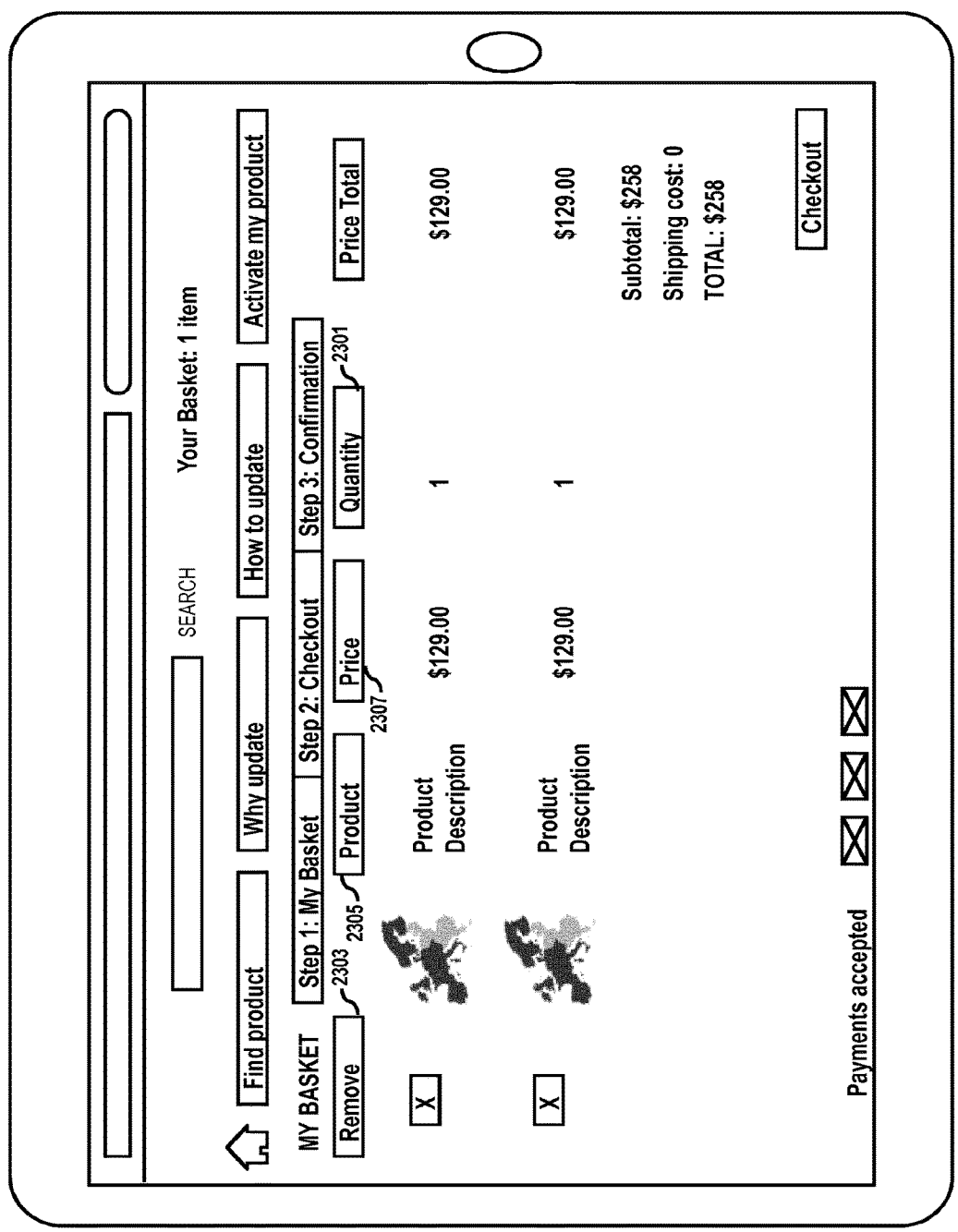
FIG. 23 is a user interface diagram that represents a standard basket page with a coupon code capability, according to one example embodiment.

FIG. 23 is a user interface diagram that represents a standard basket page with a coupon code capability, according to one example embodiment. In one scenario, the basket page lists the number of products selected by a user for purchase [2301]. Further, the page provides a user with an option to remove the selected products [2303]. Additionally, the page provides products description [2305], and costs information [2307] for the selected products.

Figure 24:
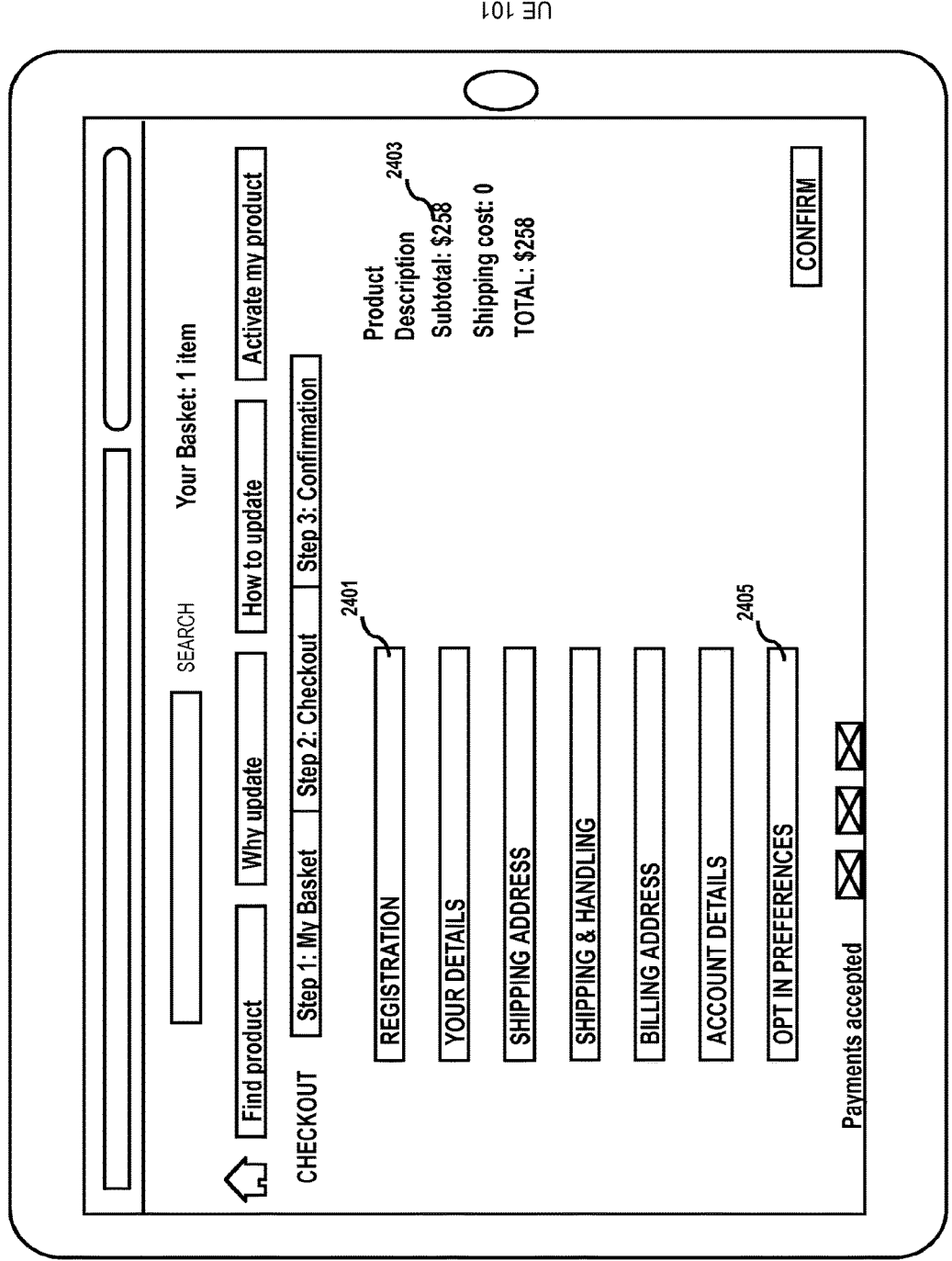
FIG. 24 is a user interface diagram that represents a checkout page for the purchased products, according to one example embodiment.

FIG. 24 is a user interface diagram that represents a checkout page for the purchased products, according to one example embodiment. In one scenario, the checkout page comprises of a registration tab, wherein users may enter their address for shipping and billing purposes [2401]. In addition, the page provides one or more users with the total cost for the products (inclusive of the cost of delivery) [2403]. In another scenario, consumers with a log-in identification, but are not yet logged-in may expedite their checkout process by just entering their credentials, only the payment details are required [2405].

Figure 25:
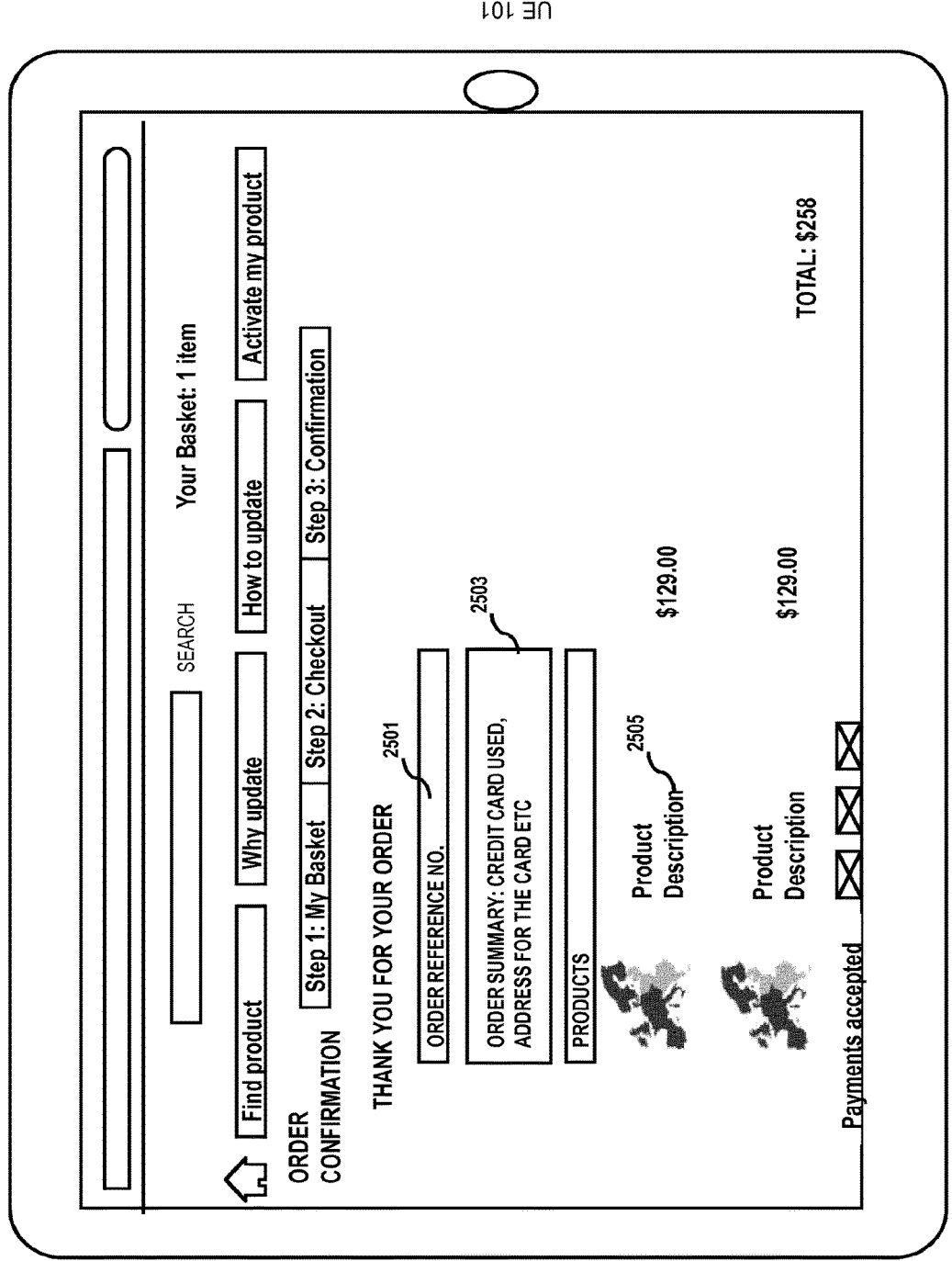
FIG. 25 is a user interface diagram that represents a confirmation page for the purchased products, according to one example embodiment.

FIG. 25 is a user interface diagram that represents a confirmation page for the purchased products, according to one example embodiment. In one scenario, a user may be provided with a reference number for the transaction [2501]. The reference number may be used to track the order or may be used as a proof of purchase. In another scenario, a user may be provided with an order summary [2503] and products description [2505].

Figure 26:
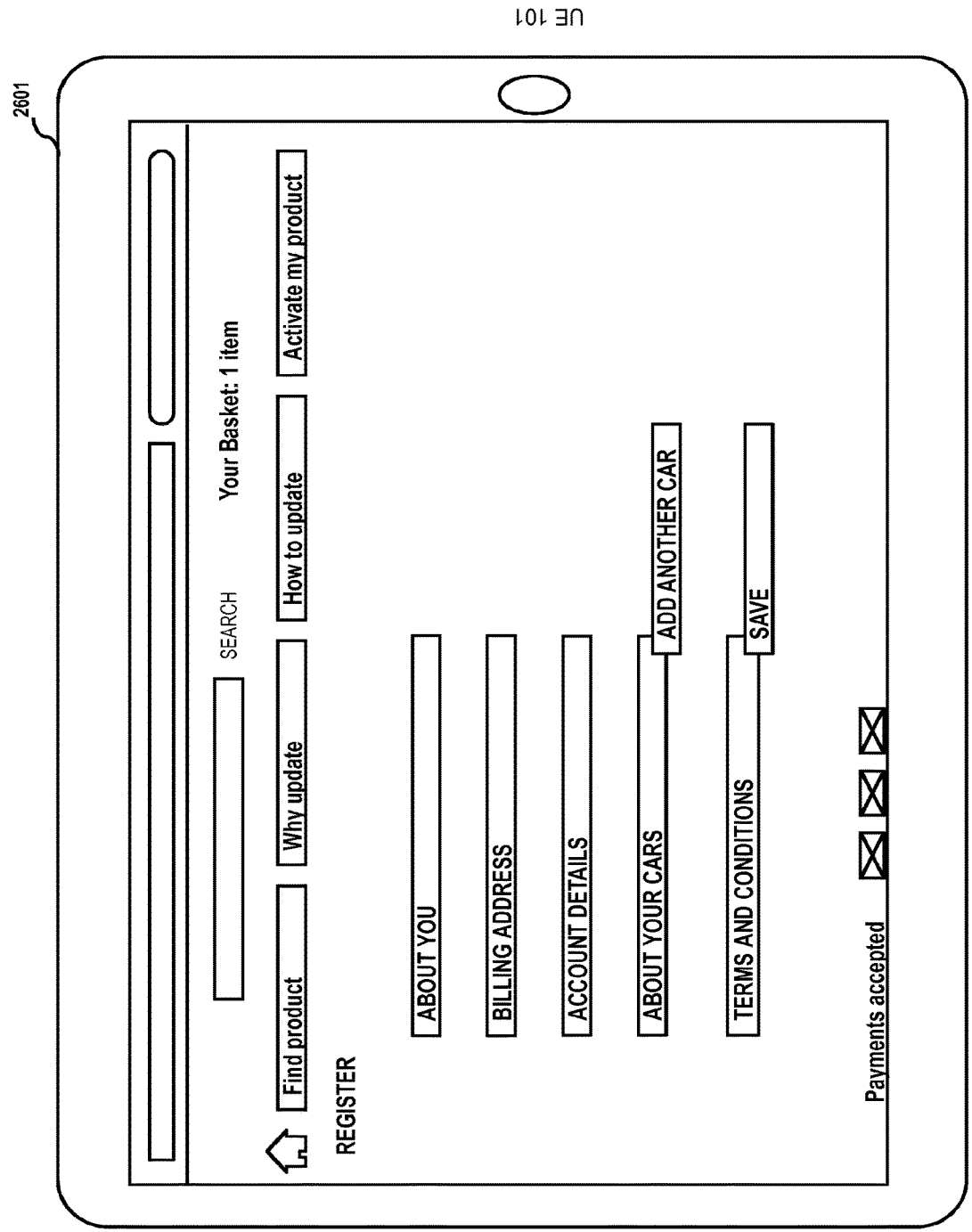
FIG. 26 is a user interface diagram that represents a registration page for one or more users, according to one example embodiment.

FIG. 26 is a user interface diagram that represents a registration page for one or more users, according to one example embodiment. In one scenario, as a part of the connected cars specifics, the favorite payment method of one or more users and their details should be captured during the registration process [2601]. This process is optional for one or more users. In one scenario, if the payment details are filled in, and there is a PIN code for purchase of the products from the head unit, a user may successfully make a purchase without registration.

FIG. 27 is a user interface diagram that represents account information page for at least one user, according to one example embodiment. In one scenario, the account information page [2701] includes personal details [2703] such as billing and delivery address, email and password for account log-in, phone numbers etc. In another scenario, the account information page provides one or more users with the option to add or delete the payment options, and assign a default payment option for the head unit purchase. The default payment option may involve entering a four digit pin code for the head unit purchase.

FIG. 28 is a user interface diagram that represents an opt-in preference page for a user to manage his account, according to one example embodiment. In one scenario, a user has the ability to manage opt-in preferences in order to be legally compliant [2801]. In one scenario, a user may manage future notification on products and promotions through the opt-in preference page [2803]. In another scenario, a user may agree to receive information from a trusted third parties [2805].

Figure 29:
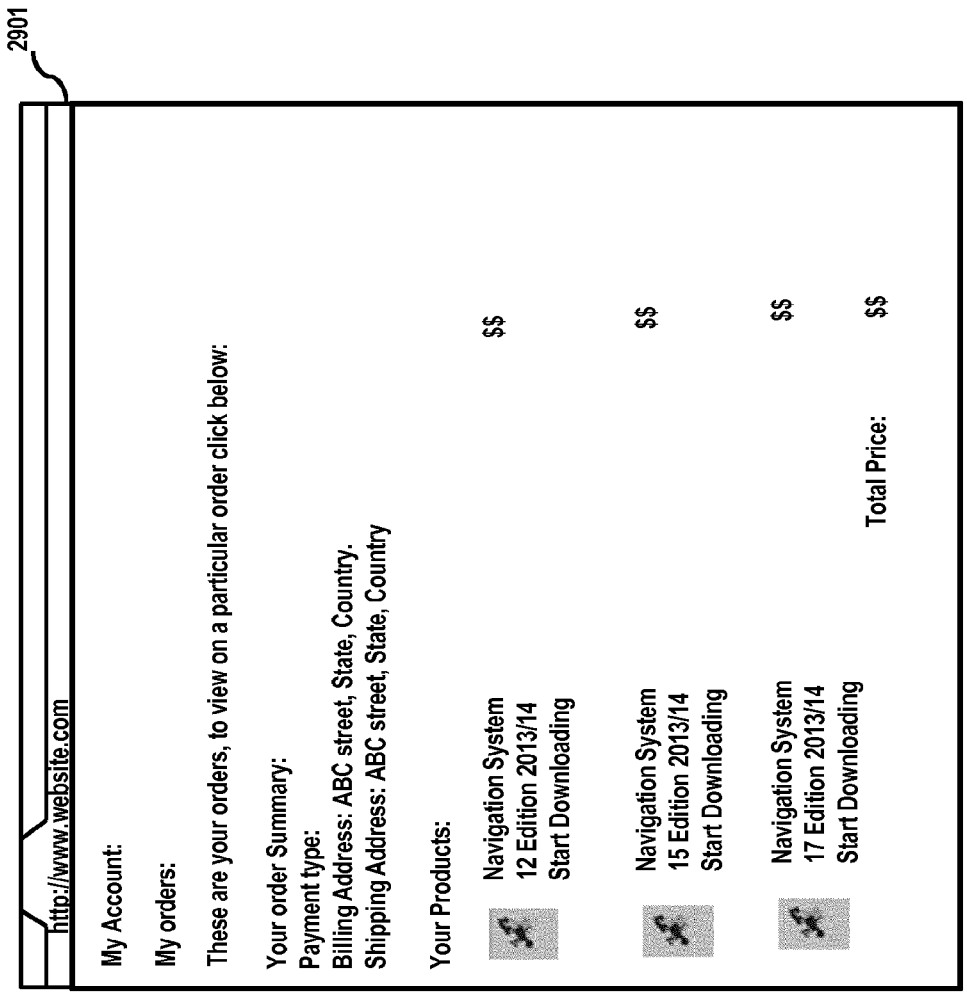
FIG. 29 is a user interface diagram that represents an order page wherein a user may access his order history and manage the purchased products, according to one example embodiment.

FIG. 29 is a user interface diagram that represents an order page wherein a user may access his order history and manage the purchased products, according to one example embodiment. In one scenario, to support the connected services, consumers are allowed to activate or deactivate services, renew their services, and may be allowed to specify validity date [2901]. Such specifics should be supplied by the connected service product management team.

Figure 30:
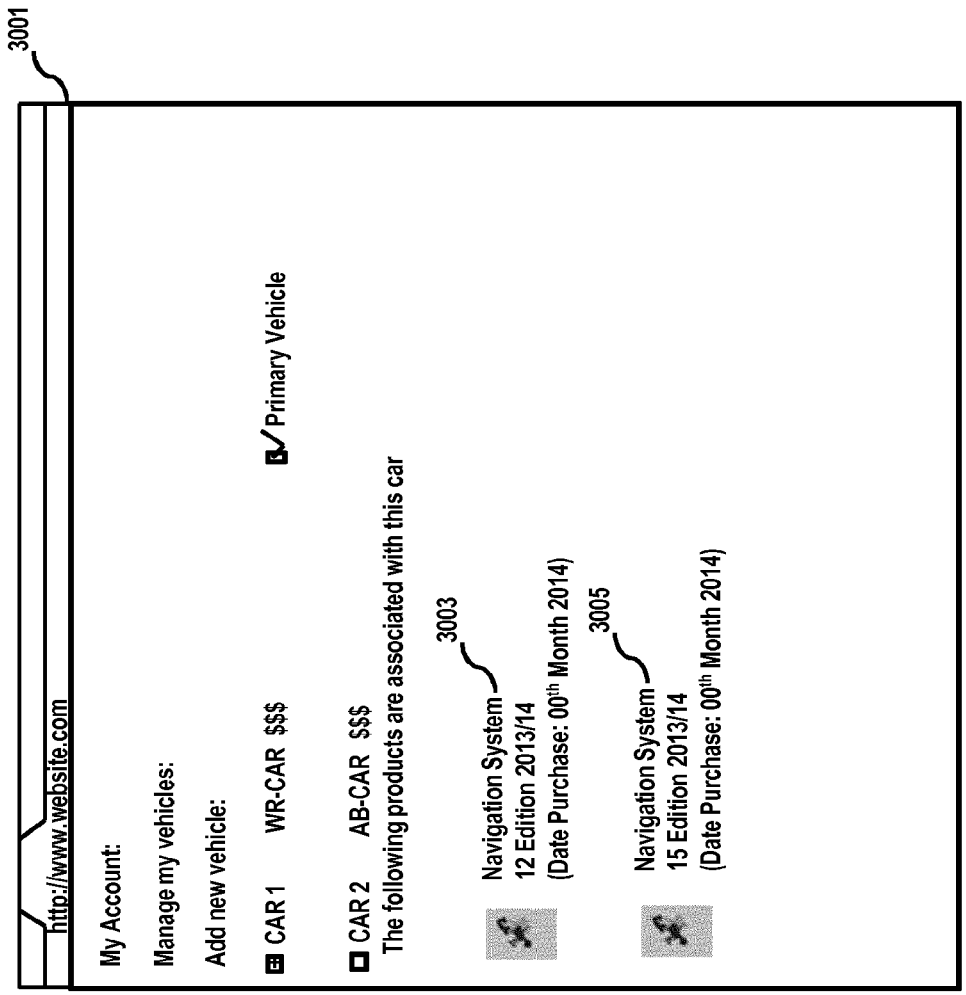
FIG. 30 is a user interface diagram that represents a page via which a user may manage their vehicles, according to one example embodiment.

FIG. 30 is a user interface diagram that represents a page via which a user may manage their vehicles, according to one example embodiment. In one scenario, a user may be able to add or delete one or more vehicles [3001]. In another scenario, the one or more users may be able to visualize the one or more products and services purchased with the vehicle [3003, 3005].

FIG. 31 is a user interface diagram that represents a page for subscription download for managing one or more purchased products, according to one example embodiment. In one scenario, a subscription is attached to a vehicle during purchase, therefore, post purchase the consumer needs to attach a vehicle to the subscription before being able to download products or services [3101]. In one scenario, the one or more users may be able to associate the products with the vehicles [3103]. In another scenario, if the user has not selected a vehicle then the user may be able to add at least one vehicle [3105].

Figure 32:
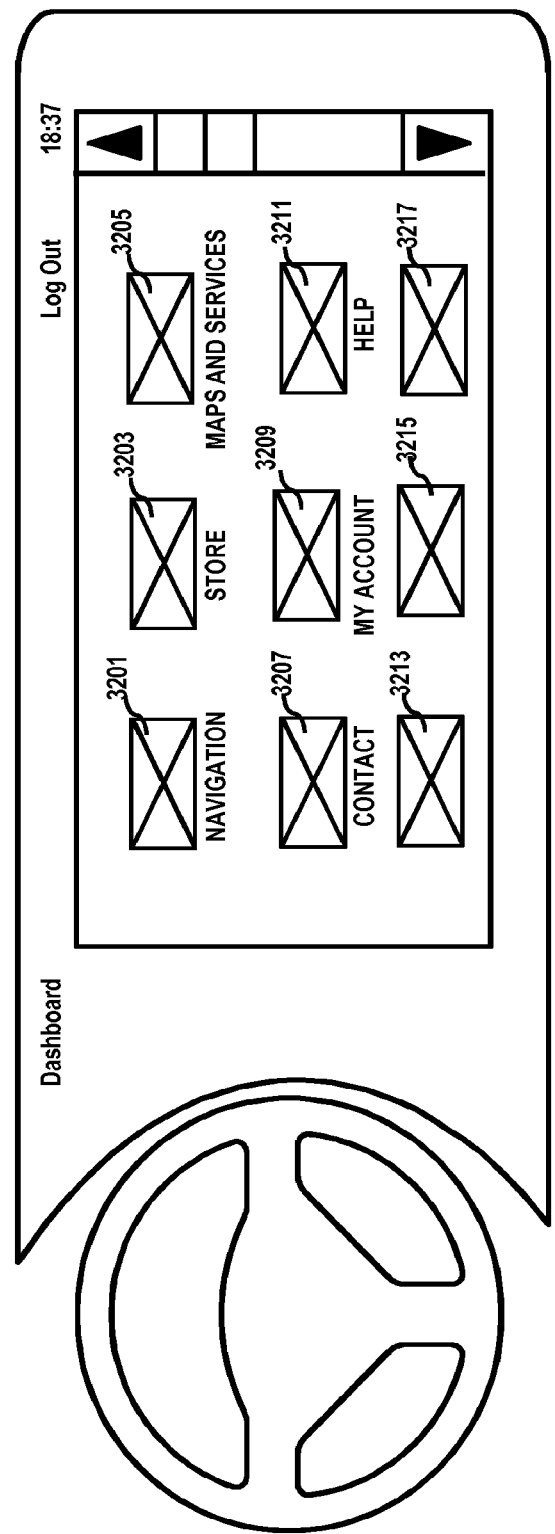
FIG. 32 is a diagram that represents the dashboard of a head unit of the at least one vehicle, according to one example embodiment.

FIG. 32 is a diagram that represents the dashboard of a head unit of the at least one vehicle, according to one example embodiment. In one scenario, the dashboard comprises of a navigation icon, a user may initiate a navigation service by clicking on the navigation icon [3201]. In another scenario, the dashboard comprises of a store icon, a user may purchase as well as manage product updates, content, and/or services by clicking on the store icon [3203]. In a further scenario, a user may manage the installed maps and services by clicking on the maps and services icon on the dashboard [3205]. Similarly, a user may go to contact details page by clicking on the contact icon [3207]. The user may also access his account settings by clicking on the account icon [3209]. Further, the user may click the help icon to access the frequently asked questions [3211]. In one embodiment, the number of icons may evolve with time and new shortcuts may be created based on user requirements [3213, 3215, 3217].

Figure 33:
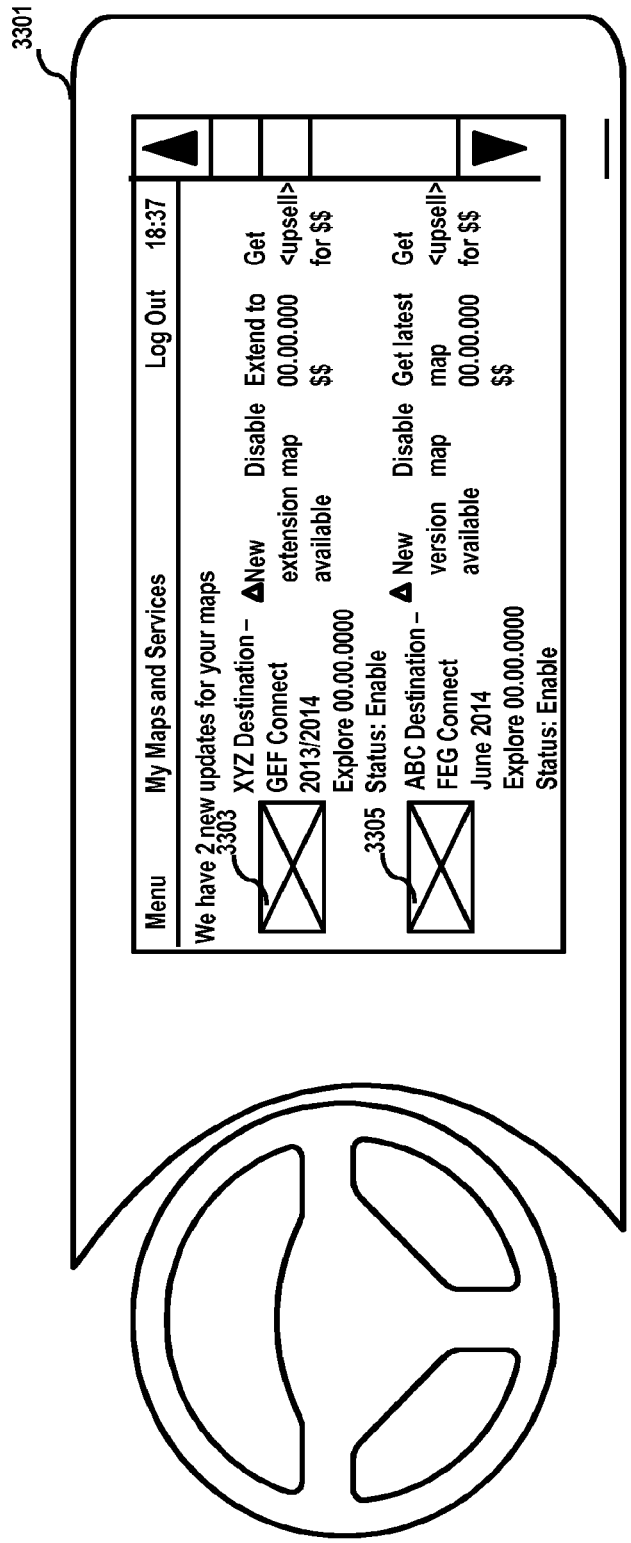
FIG. 33 is a diagram that represents the maps and services presented in the head unit of the at least one vehicle, according to one example embodiment.

FIG. 33 is a diagram that represents the maps and services presented in the head unit of the at least one vehicle, according to one example embodiment. In one scenario, a user may be notified that updates are available for the purchased maps [3301]. The map updates may be presented in a list, whereupon the user may select at least one map update per his preference. In one example embodiment, at least one map update may be the new version of the map, wherein the user may enable, disable or download the updates as long as his license is active [3303]. In another example embodiment, at least one map update may add revised routing information to the map [3305]. This may involve buying the latest version of the existing service to extend, or renew the maps.

Figure 34:
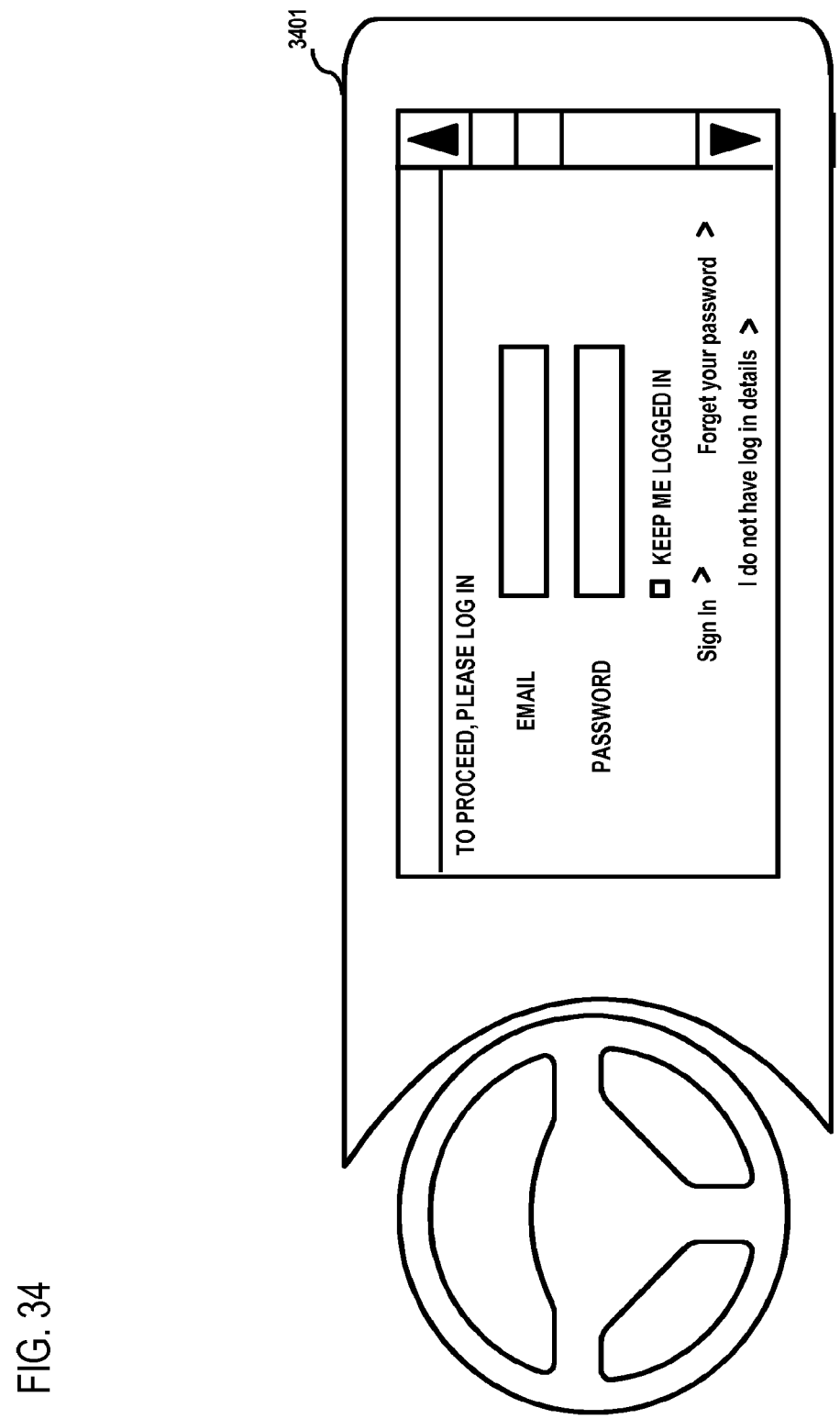
FIG. 34 is a diagram that represents the log-in page for accessing one or more services, according to one example embodiment.

FIG. 34 is a diagram that represents the log-in page for accessing one or more services, according to one example embodiment. In one scenario, a user may be asked to provide a combination of an email address and a password to access the services [3401]. However, if a user does not have a username and a password, then the user may register with the service.

Figure 35:
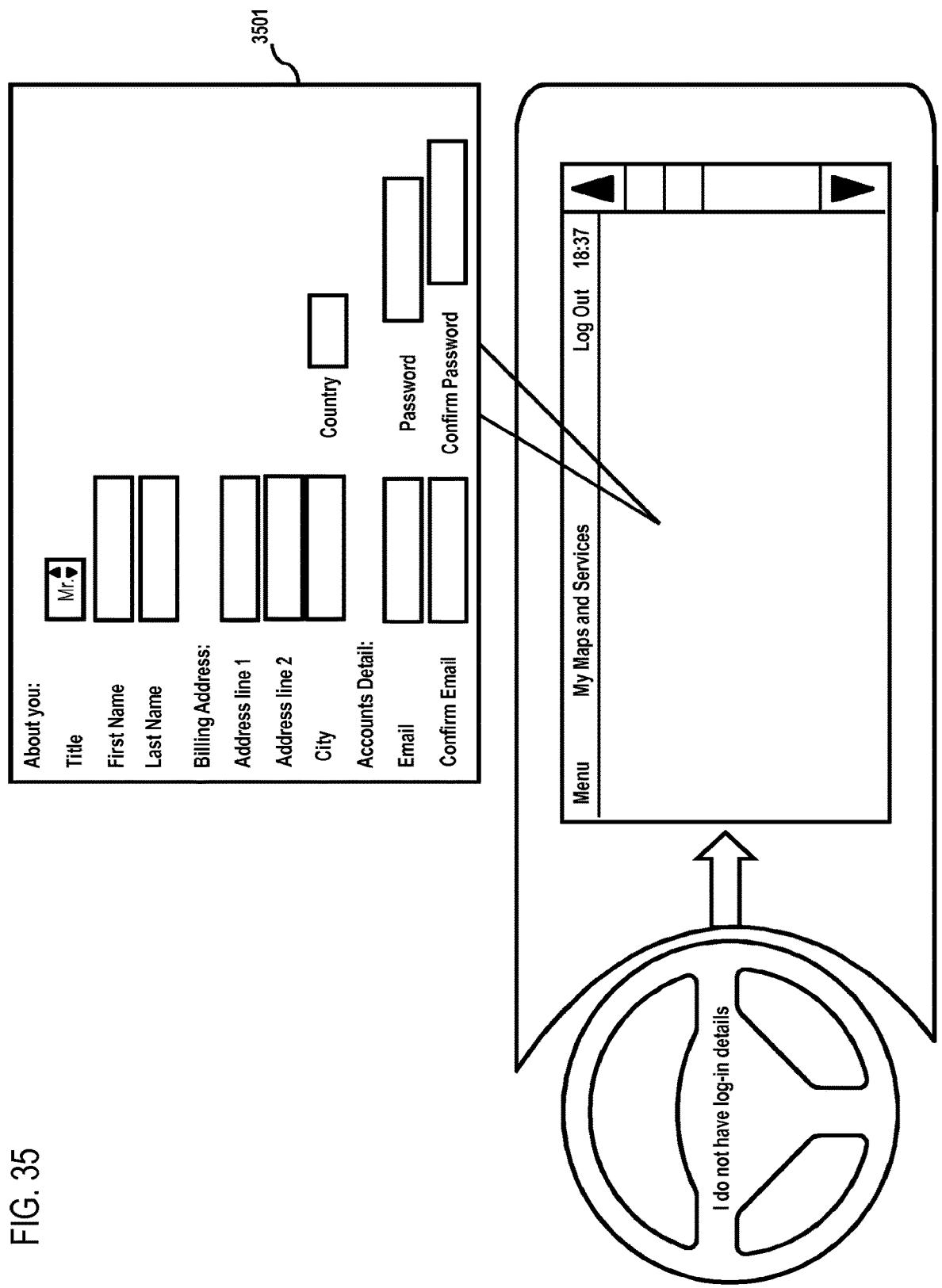
FIG. 35 is a diagram that represents the registration page for consumers without log-in details, according to one example embodiment.

FIG. 35 is a diagram that represents the registration page for consumers without log-in details, according to one example embodiment. In one scenario, the one or more consumers may enter their personal details to create an account [3501]. Then, the user may select the username and password for the service. In another scenario, a consumer may purchase a service without registering oneself by providing valid payment information with a four digit pin code. In one scenario, the desktop version should pull the same filed as the registration page with the exception of vehicle information. No vehicle information may be needed as this may be passed on from the head unit to the content store.

Figure 36:
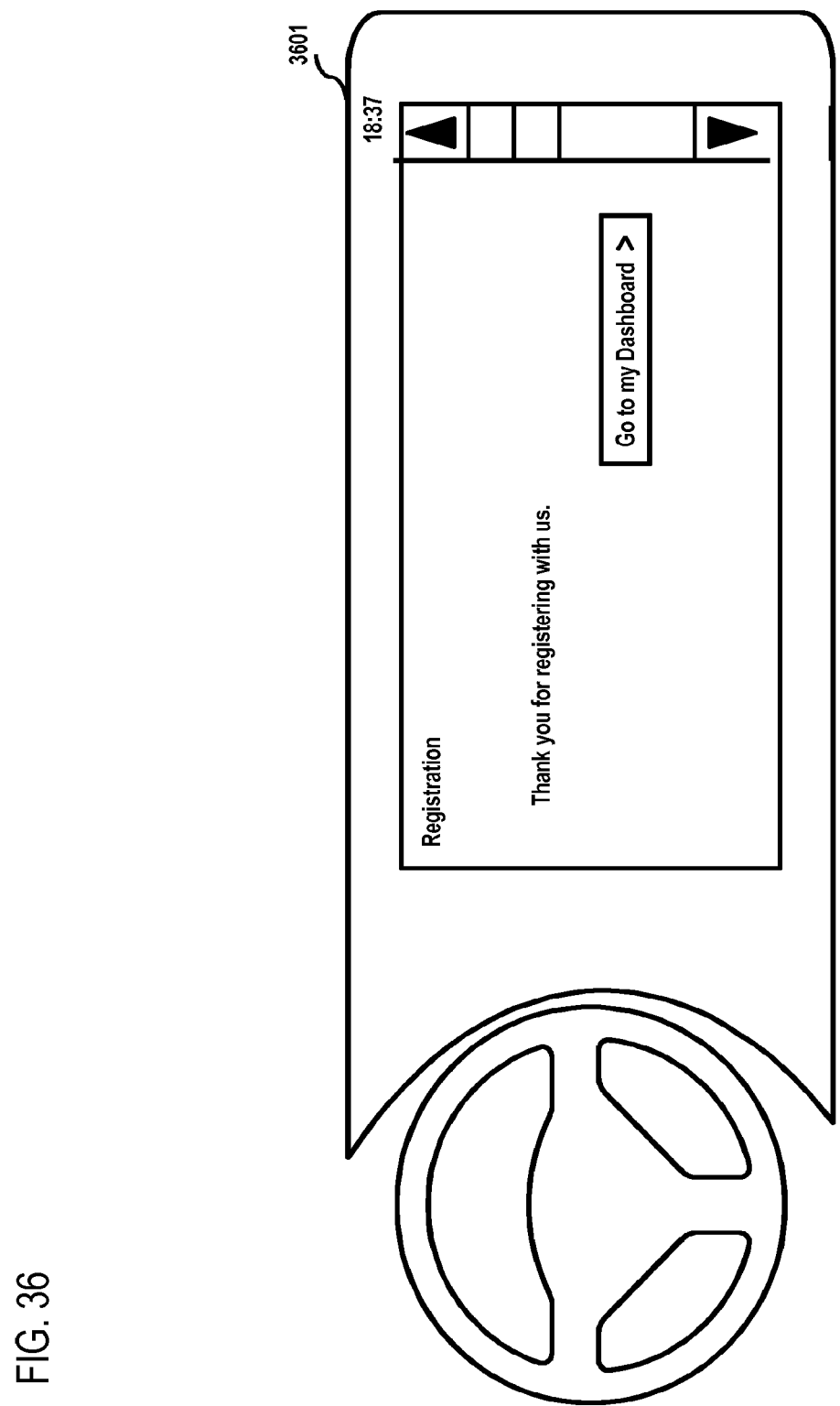
FIG. 36 is a diagram that represents the confirmation page for a registration request, according to one example embodiment.

FIG. 36 is a diagram that represents the confirmation page for a registration request, according to one example embodiment. In one scenario, a user may register with the service, whereupon the service may verify the user information and the availability of the username. A user may be presented with the confirmation page upon determination that the user information was accurate and the requested username is available [3601].

Figure 37:
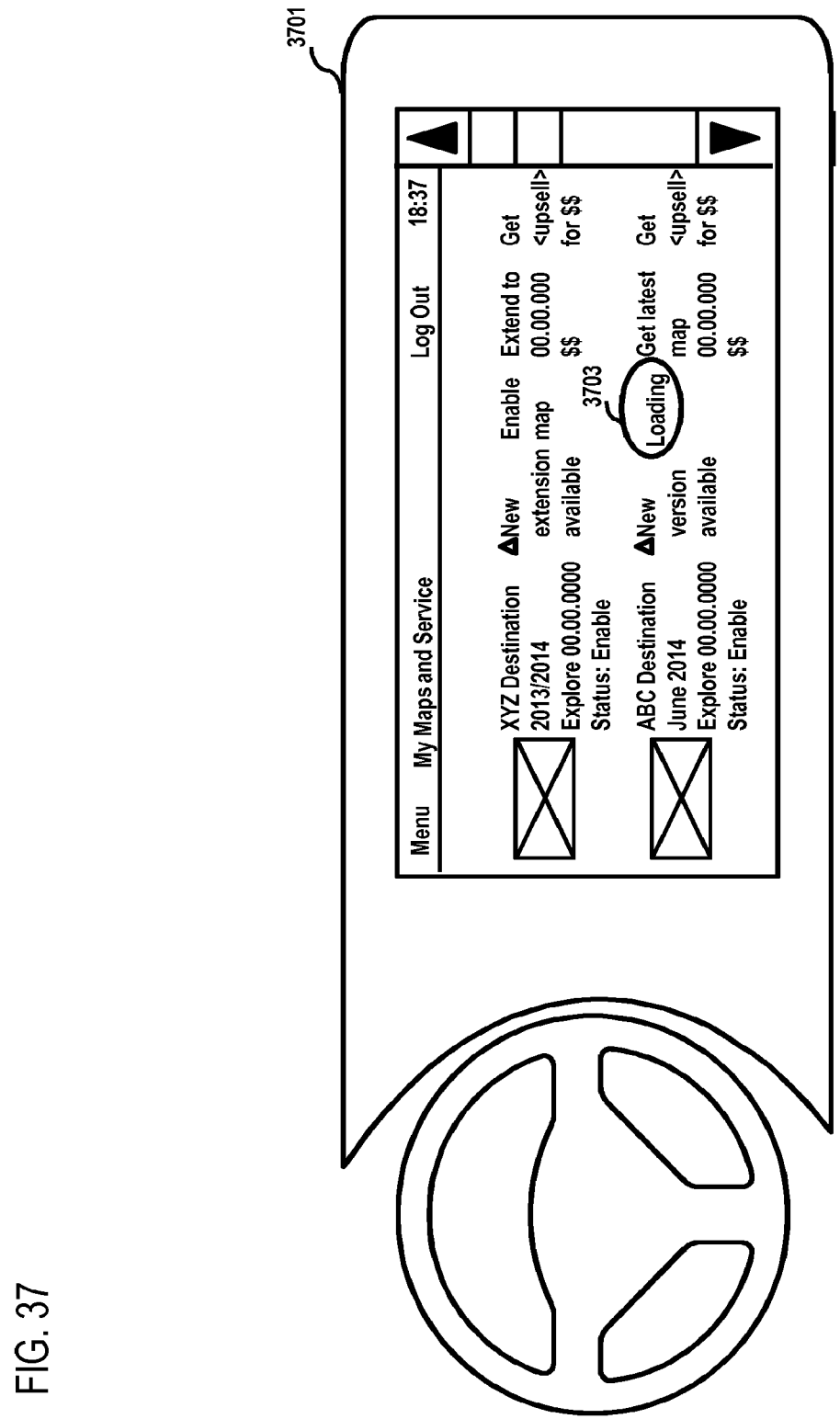
FIG. 37 is a diagram that represents a scenario wherein an action is followed by the processing icon with a change in the status, according to one example embodiment.

FIG. 37 is a diagram that represents a scenario wherein an action is followed by the processing icon with a change in the status [3701], according to one example embodiment. In one scenario, a user may want to download a new version of the map. The user may initiate download by clicking on the download icon, whereupon the new version of the map is downloaded resulting in a change in the status of the icon [3703]. The icon may show that the map content is being downloaded.

Figure 38:
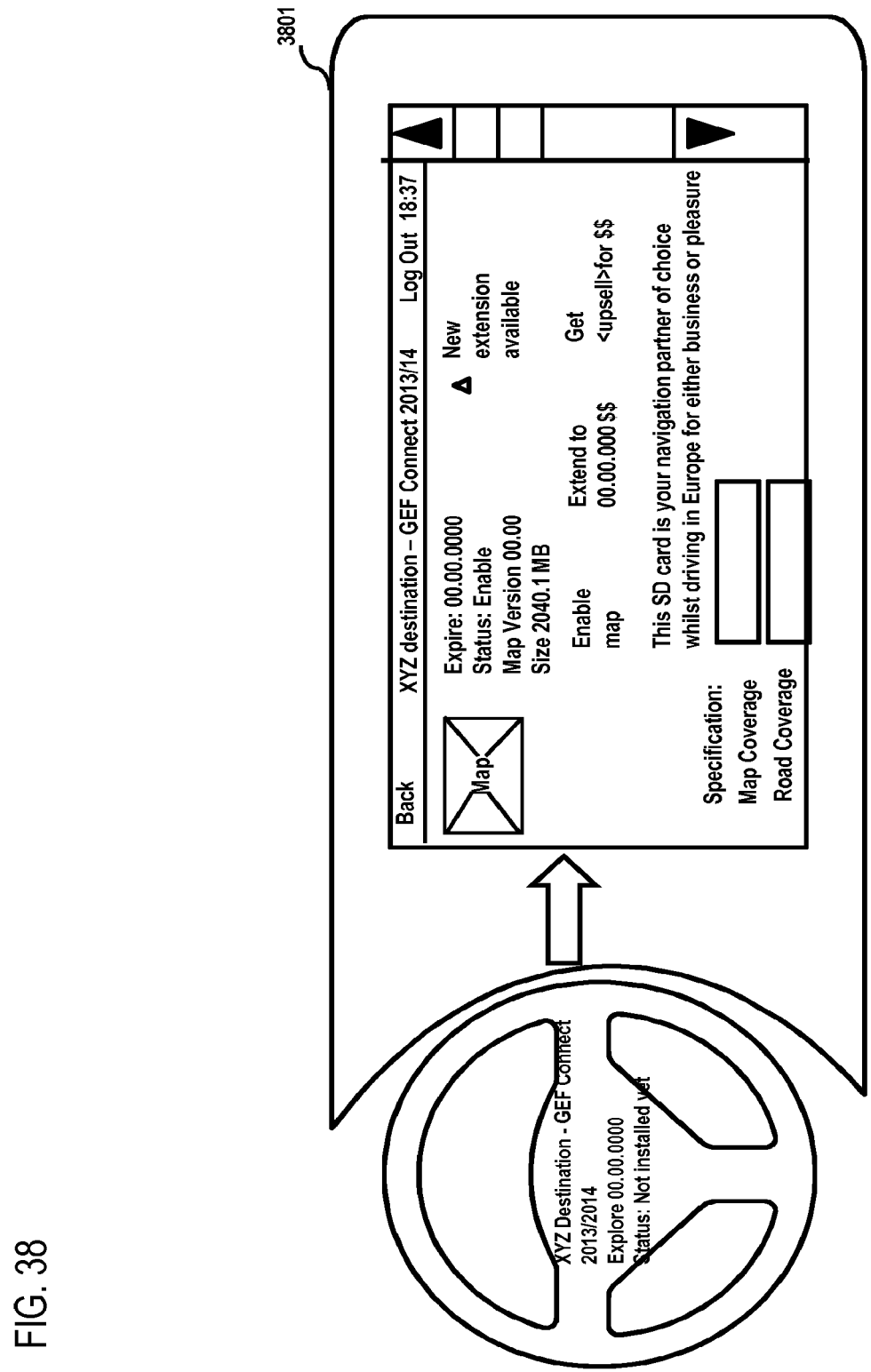
FIG. 38 is a diagram that represents a page that provides information on the products selected by the user, according to one example embodiment.

FIG. 38 is a diagram that represents a page that provides information on the products selected by the user, according to one example embodiment. In one scenario, a user may obtain products information by clicking on the products name [3801]. In addition, the user may enable, disable or download services associated with the product. Further, the user may purchase the latest version of the existing product to renew or extend the product.

Figure 39:
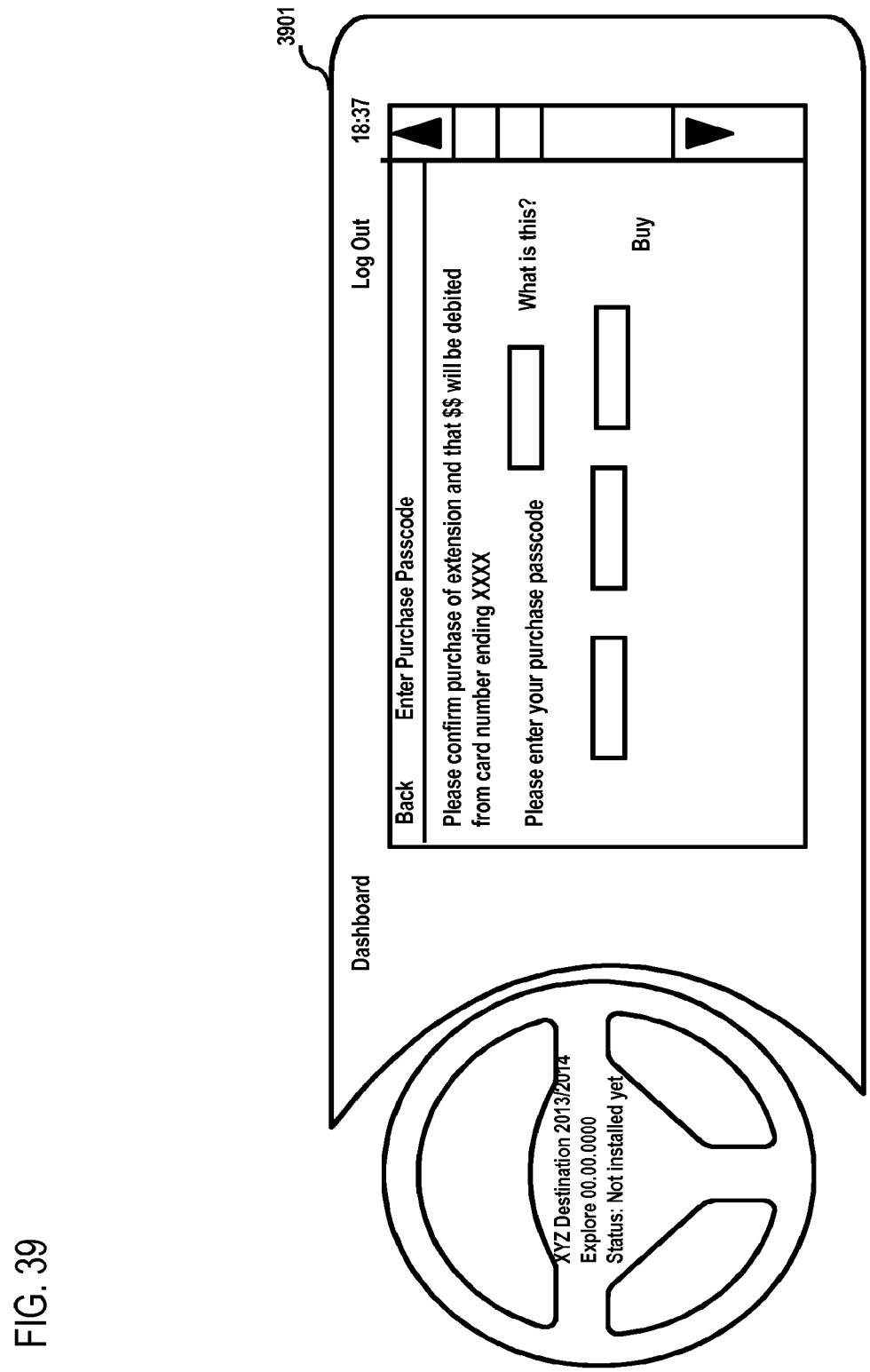
FIG. 39 is represents a page that requests a user for PIN code to complete the purchase transaction, according to one example embodiment.

FIG. 39 is represents a page that requests a user for PIN code to complete the purchase transaction, according to one example embodiment. In one scenario, a user may be queried on PIN code based on a determination that password from the log-in is secure enough [3901].

Figure 40:
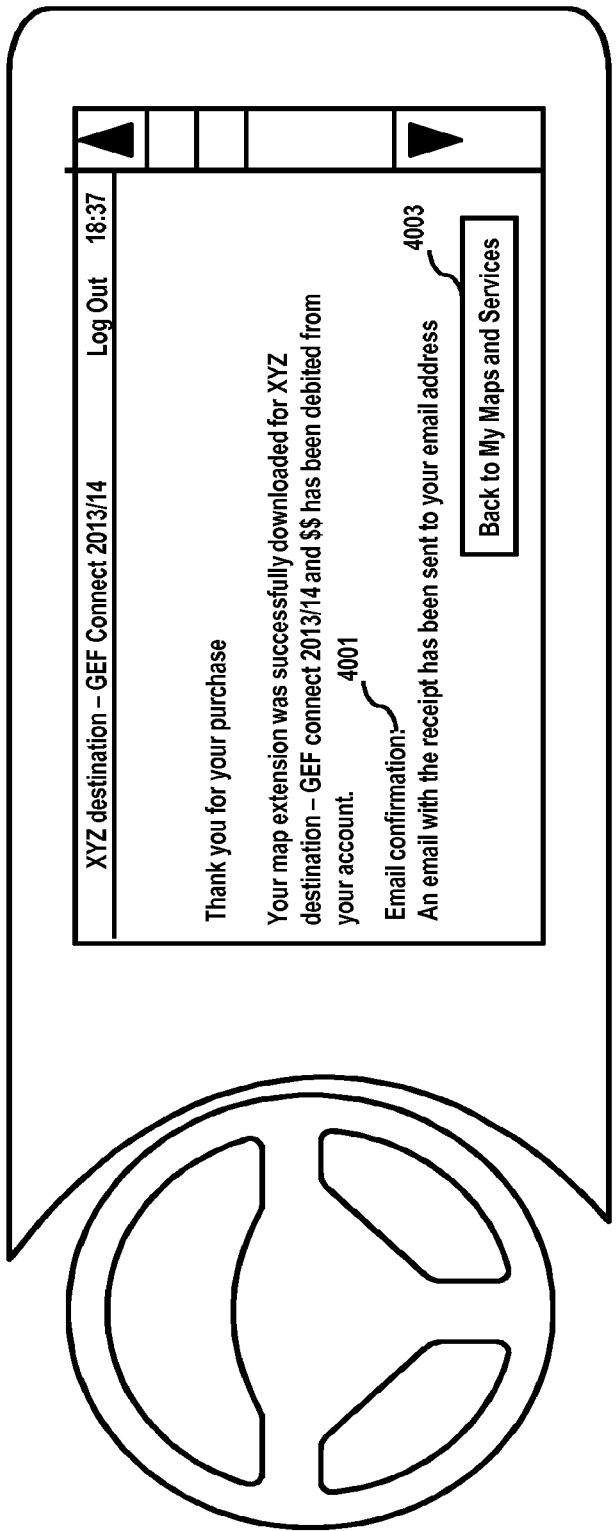
FIG. 40 represents a purchase confirmation page for the products and services purchased by the user, according to one example embodiment.

FIG. 40 represents a purchase confirmation page for the products and services purchased by the user, according to one example embodiment. In one scenario, a user may be informed that an email receipt has been sent to his email address [4001]. In another scenario, the purchase confirmation may trigger new products page list with updated purchased product status [4003].

The processes described herein for packaging content and/or services into DRM format for transmission to at least one device, at least one companion device, or a combination thereof may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 41:
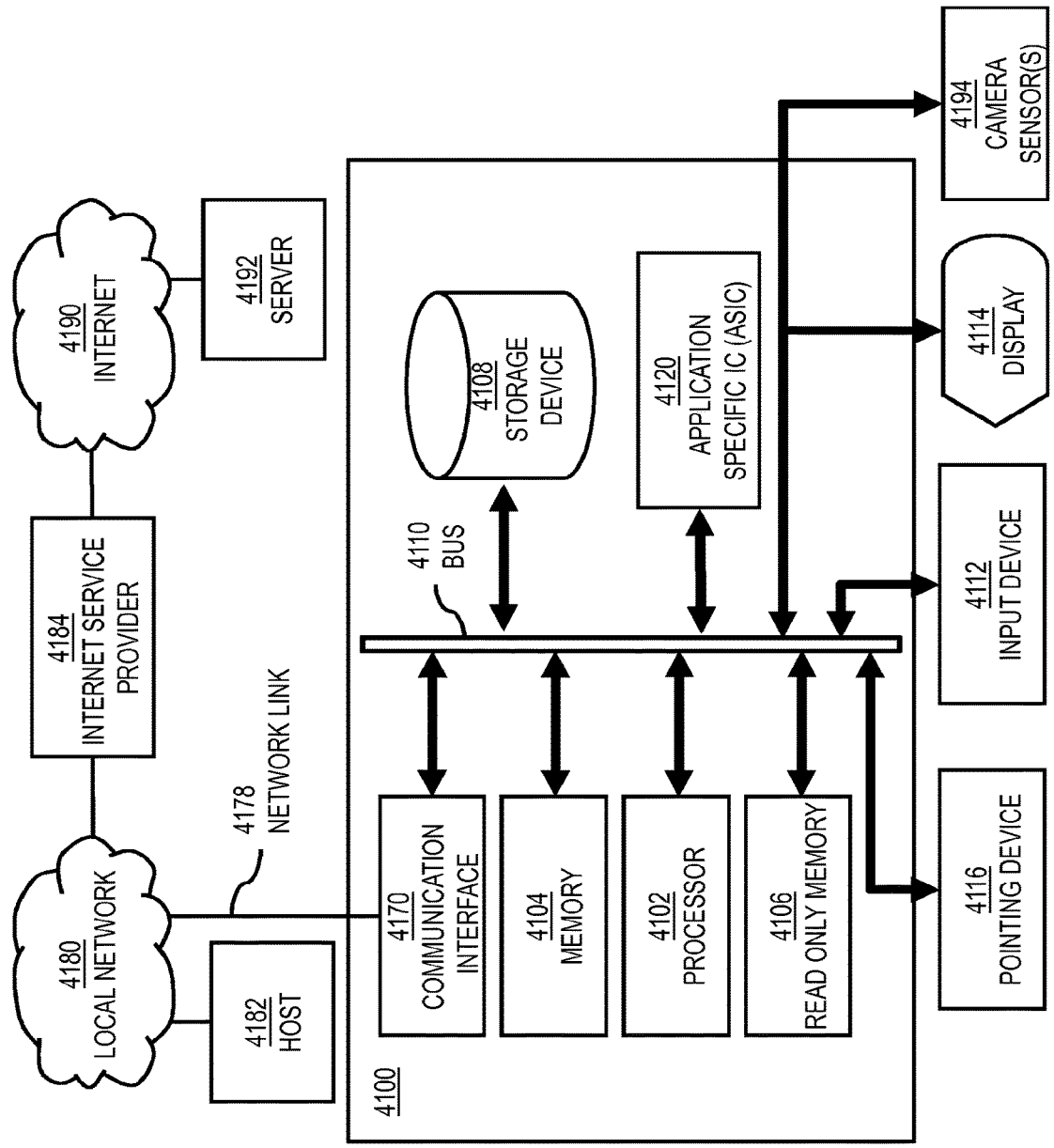
FIG. 41 is a diagram of hardware that can be used to implement an embodiment of the invention.

FIG. 41 illustrates a computer system 4100 upon which an embodiment of the invention may be implemented. Although computer system 4100 is depicted with respect to a particular device or equipment, it is contemplated that other devices or equipment (e.g., network elements, servers, etc.) within FIG. 41 can deploy the illustrated hardware and components of system 4100. Computer system 4100 is programmed (e.g., via computer program code or instructions) to package content and/or services into DRM format for transmission to at least one device, at least one companion device, or a combination thereof as described herein and includes a communication mechanism such as a bus 4110 for passing information between other internal and external components of the computer system 4100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 4100, or a portion thereof, constitutes a means for performing one or more steps of packaging content and/or services into DRM format for transmission to at least one device, at least one companion device, or a combination thereof.

A bus 4110 includes one or more parallel conductors of information so that information is transferred quickly among devices coupled to the bus 4110. One or more processors 4102 for processing information are coupled with the bus 4110.

A processor (or multiple processors) 4102 performs a set of operations on information as specified by computer program code related to packaging content and/or services into DRM format for transmission to at least one device, at least one companion device, or a combination thereof. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 4110 and placing information on the bus 4110. The set of operations also typically include comparing two or more units of information, shifting positions of units of information, and combining two or more units of information, such as by addition or multiplication or logical operations like OR, exclusive OR (XOR), and. Each operation of the set of operations that can be performed by the processor is represented to the processor by information called instructions, such as an operation code of one or more digits. A sequence of operations to be executed by the processor 4102, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 4100 also includes a memory 4104 coupled to bus 4110. The memory 4104, such as a random access memory (RAM) or any other dynamic storage device, stores information including processor instructions for packaging content and/or services into DRM format for transmission to at least one device, at least one companion device, or a combination thereof. Dynamic memory allows information stored therein to be changed by the computer system 4100. RAM allows a unit of information stored at a location called a memory address to be stored and retrieved independently of information at neighboring addresses. The memory 4104 is also used by the processor 4102 to store temporary values during execution of processor instructions. The computer system 4100 also includes a read only memory (ROM) 4106 or any other static storage device coupled to the bus 4110 for storing static information, including instructions, that is not changed by the computer system 4100. Some memory is composed of volatile storage that loses the information stored thereon when power is lost. Also coupled to bus 4110 is a non-volatile (persistent) storage device 4108, such as a magnetic disk, optical disk or flash card, for storing information, including instructions, that persists even when the computer system 4100 is turned off or otherwise loses power.

Information, including instructions for packaging content and/or services into DRM format for transmission to at least one device, at least one companion device, or a combination thereof, is provided to the bus 4110 for use by the processor from an external input device 4112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 4100. Other external devices coupled to bus 4110, used primarily for interacting with humans, include a display device 4114, such as a cathode ray tube (CRT), a liquid crystal display (LCD), a light emitting diode (LED) display, an organic LED (OLED) display, a plasma screen, or a printer for presenting text or images, and a pointing device 4116, such as a mouse, a trackball, cursor direction keys, or a motion sensor, for controlling a position of a small cursor image presented on the display 4114 and issuing commands associated with graphical elements presented on the display

4114, and one or more camera sensors 4194 for capturing, recording and causing to store one or more still and/or moving images (e.g., videos, movies, etc.) which also may comprise audio recordings. In some embodiments, for example, in embodiments in which the computer system 4100 performs all functions automatically without human input, one or more of external input device 4112, display device 4114 and pointing device 4116 may be omitted.

In the illustrated embodiment, special purpose hardware, such as an application specific integrated circuit (ASIC) 4120, is coupled to bus 4110. The special purpose hardware is configured to perform operations not performed by processor 4102 quickly enough for special purposes. Examples of ASICs include graphics accelerator cards for generating images for display 4114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 4100 also includes one or more instances of a communications interface 4170 coupled to bus 4110. Communication interface 4170 provides a one-way or two-way communication coupling to a variety of external devices that operate with their own processors, such as printers, scanners and external disks. In general the coupling is with a network link 4178 that is connected to a local network 4180 to which a variety of external devices with their own processors are connected. For example, communication interface 4170 may be a parallel port or a serial port or a universal serial bus (USB) port on a personal computer. In some embodiments, communications interface 4170 is an integrated services digital network (ISDN) card or a digital subscriber line (DSL) card or a telephone modem that provides an information communication connection to a corresponding type of telephone line. In some embodiments, a communication interface 4170 is a cable modem that converts signals on bus 4110 into signals for a communication connection over a coaxial cable or into optical signals for a communication connection over a fiber optic cable. As another example, communications interface 4170 may be a local area network (LAN) card to provide a data communication connection to a compatible LAN, such as Ethernet. Wireless links may also be implemented. For wireless links, the communications interface 4170 sends or receives or both sends and receives electrical, acoustic or electromagnetic signals, including infrared and optical signals, that carry information streams, such as digital data. For example, in wireless handheld devices, such as mobile telephones like cell phones, the communications interface 4170 includes a radio band electromagnetic transmitter and receiver called a radio transceiver. In certain embodiments, the communications interface 4170 enables connection to the communication network 107 for packaging content and/or services into DRM format for transmission to at least one device, at least one companion device, or a combination thereof to the UE 101.

The term "computer-readable medium" as used herein refers to any medium that participates in providing information to processor 4102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 4108. Volatile media include, for example, dynamic memory 4104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 4120.

Network link 4178 typically provides information communication using transmission media through one or more networks to other devices that use or process the information. For example, network link 4178 may provide a connection through local network 4180 to a host computer 4182 or to equipment 4184 operated by an Internet Service Provider (ISP). ISP equipment 4184 in turn provides data communication services through the public, world-wide packet-switching communication network of networks now commonly referred to as the Internet 4190.

A computer called a server host 4192 connected to the Internet hosts a process that provides a service in response to information received over the Internet. For example, server host 4192 hosts a process that provides information representing video data for presentation at display 4114. It is contemplated that the components of system 4100 can be deployed in various configurations within other computer systems, e.g., host 4182 and server 4192.

At least some embodiments of the invention are related to the use of computer system 4100 for implementing some or all of the techniques described herein. According to one embodiment of the invention, those techniques are performed by computer system 4100 in response to processor 4102 executing one or more sequences of one or more processor instructions contained in memory 4104. Such instructions, also called computer instructions, software and program code, may be read into memory 4104 from another computer-readable medium such as storage device 4108 or network link 4178. Execution of the sequences of instructions contained in memory 4104 causes processor 4102 to perform one or more of the method steps described herein. In alternative embodiments, hardware, such as ASIC 4120, may be used in place of or in combination with software to implement the invention. Thus, embodiments of the invention are not limited to any specific combination of hardware and software, unless otherwise explicitly stated herein.

The signals transmitted over network link 4178 and other networks through communications interface 4170, carry information to and from computer system 4100. Computer system 4100 can send and receive information, including program code, through the networks 4180, 4190 among others, through network link 4178 and communications interface 4170. In an example using the Internet 4190, a server host 4192 transmits program code for a particular application, requested by a message sent from computer 4100, through Internet 4190, ISP equipment 4184, local network 4180 and communications interface 4170. The received code may be executed by processor 4102 as it is received, or may be stored in memory 4104 or in storage device 4108 or any other non-volatile storage for later execution, or both. In this manner, computer system 4100 may obtain application program code in the form of signals on a carrier wave.

Various forms of computer readable media may be involved in carrying one or more sequence of instructions or data or both to processor 4102 for execution. For example, instructions and data may initially be carried on a magnetic disk of a remote computer such as host 4182. The remote computer loads the instructions and data into its dynamic memory and sends the instructions and data over a telephone line using a modem. A modem local to the computer system 4100 receives the instructions and data on a telephone line and uses an infra-red transmitter to convert the instructions and data to a signal on an infra-red carrier wave serving as the network link 4178. An infrared detector serving as communications interface 4170 receives the instructions and data carried in the infrared signal and places information representing the instructions and data onto bus 4110. Bus 4110 carries the information to memory 4104 from which processor 4102 retrieves and executes the instructions using some of the data sent with the instructions. The instructions and data received in memory 4104 may optionally be stored on storage device 4108, either before or after execution by the processor 4102.

Figure 42:
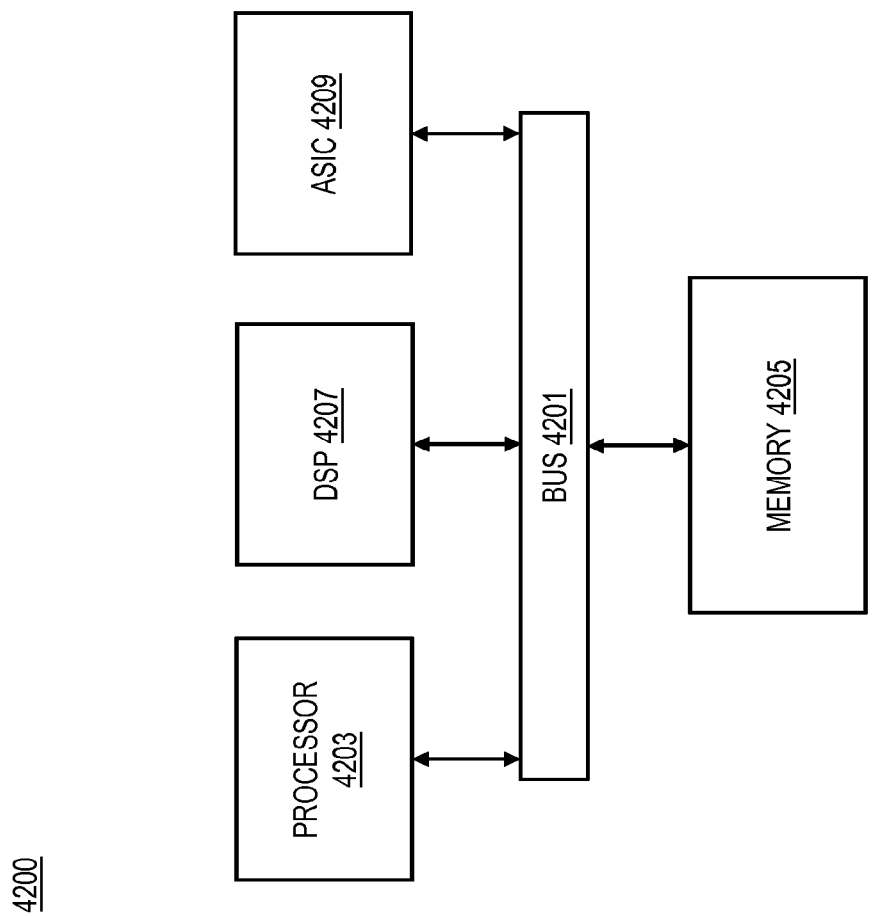
FIG. 42 is a diagram of a chip set that can be used to implement an embodiment of the invention.

FIG. 42 illustrates a chip set or chip 4200 upon which an embodiment of the invention may be implemented. Chip set 4200 is programmed to package content and/or services into DRM format for transmission to at least one device, at least one companion device, or a combination thereof as described herein and includes, for instance, the processor and memory components described with respect to FIG. 41 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 4200 can be implemented in a single chip. It is further contemplated that in certain embodiments the chip set or chip 4200 can be implemented as a single "system on a chip." It is further contemplated that in certain embodiments a separate ASIC would not be used, for example, and that all relevant functions as disclosed herein would be performed by a processor or processors. Chip set or chip 4200, or a portion thereof, constitutes a means for performing one or more steps of providing user interface navigation information associated with the availability of functions. Chip set or chip 4200, or a portion thereof, constitutes a means for performing one or more steps of packaging content and/or services into DRM format for transmission to at least one device, at least one companion device, or a combination thereof.

In one embodiment, the chip set or chip 4200 includes a communication mechanism such as a bus 4201 for passing information among the components of the chip set 4200. A processor 4203 has connectivity to the bus 4201 to execute instructions and process information stored in, for example, a memory 4205. The processor 4203 may include one or more processing cores with each core configured to perform independently. A multi-core processor enables multiprocessing within a single physical package. Examples of a multi-core processor include two, four, eight, or greater numbers of processing cores. Alternatively or in addition, the processor 4203 may include one or more microprocessors configured in tandem via the bus 4201 to enable independent execution of instructions, pipelining, and multithreading. The processor 4203 may also be accompanied with one or more specialized components to perform certain processing functions and tasks such as one or more digital signal processors (DSP) 4207, or one or more application-specific integrated circuits (ASIC) 4209. A DSP 4207 typically is configured to process real-world signals (e.g., sound) in real time independently of the processor 4203. Similarly, an ASIC 4209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 4200 includes merely one or more processors and some software and/or firmware supporting and/or relating to and/or for the one or more processors.

The processor 4203 and accompanying components have connectivity to the memory 4205 via the bus 4201. The memory 4205 includes both dynamic memory (e.g., RAM, magnetic disk, writable optical disk, etc.) and static memory (e.g., ROM, CD-ROM, etc.) for storing executable instructions that when executed perform the inventive steps described herein to package content and/or services into DRM format for transmission to at least one device, at least one companion device, or a combination thereof. The memory 4205 also stores the data associated with or generated by the execution of the inventive steps.

Figure 43:
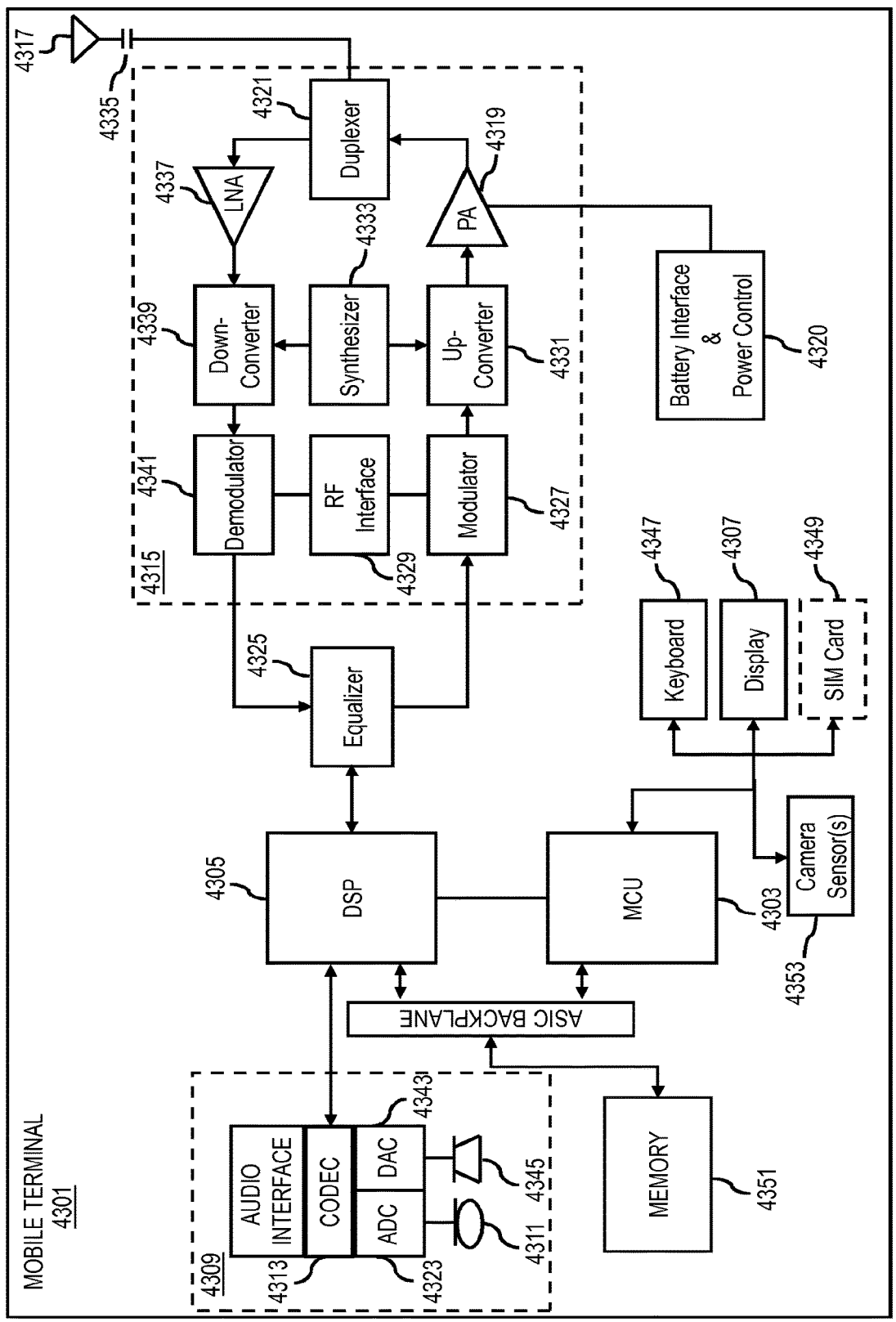
FIG. 43 is a diagram of a mobile terminal (e.g., handset) that can be used to implement an embodiment of the invention.

FIG. 43 is a diagram of exemplary components of a mobile terminal (e.g., handset) for communications, which is capable of operating in the system of FIG. 1, according to one embodiment. In some embodiments, mobile terminal 4301, or a portion thereof, constitutes a means for performing one or more steps of packaging content and/or services into DRM format for transmission to at least one device, at least one companion device, or a combination thereof. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 4303, a Digital Signal Processor (DSP) 4305, and a receiver/transmitter unit including a microphone gain control unit and a speaker gain control unit. A main display unit 4307 provides a display to the user in support of various applications and mobile terminal functions that perform or support the steps of packaging content and/or services into DRM format for transmission to at least one device, at least one companion device, or a combination thereof. The display 4307 includes display circuitry configured to display at least a portion of a user interface of the mobile terminal (e.g., mobile telephone). Additionally, the display 4307 and display circuitry are configured to facilitate user control of at least some functions of the mobile terminal. An audio function circuitry 4309 includes a microphone 4311 and microphone amplifier that amplifies the speech signal output from the microphone 4311. The amplified speech signal output from the microphone 4311 is fed to a coder/decoder (CODEC) 4313.

A radio section 4315 amplifies power and converts frequency in order to communicate with a base station, which is included in a mobile communication system, via antenna 4317. The power amplifier (PA) 4319 and the transmitter/modulation circuitry are operationally responsive to the MCU 4303, with an output from the PA 4319 coupled to the duplexer 4321 or circulator or antenna switch, as known in the art. The PA 4319 also couples to a battery interface and power control unit 4320.

In use, a user of mobile terminal 4301 speaks into the microphone 4311 and his or her voice along with any detected background noise is converted into an analog voltage. The analog voltage is then converted into a digital signal through the Analog to Digital Converter (ADC) 4323. The control unit 4303 routes the digital signal into the DSP 4305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof. The encoded signals are then routed to an equalizer 4325 for compensation of any frequency-dependent impairments that occur during transmission though the air such as phase and amplitude distortion. After equalizing the bit stream, the modulator 4327 combines the signal with a RF signal generated in the RF interface 4329. The modulator 4327 generates a sine wave by way of frequency or phase modulation. In order to prepare the signal for transmission, an up-converter 4331 combines the sine wave output from the modulator 4327 with another sine wave generated by a synthesizer 4333 to achieve the desired frequency of transmission. The signal is then sent through a PA 4319 to increase the signal to an appropriate power level. In practical systems, the PA 4319 acts as a variable gain amplifier whose gain is controlled by the DSP 4305 from information received from a network base station. The signal is then filtered within the duplexer 4321 and optionally sent to an antenna coupler 4335 to match impedances to provide maximum power transfer. Finally, the signal is transmitted via antenna 4317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 4301 are received via antenna 4317 and immediately amplified by a low noise amplifier (LNA) 4337. A down-converter 4339 lowers the carrier frequency while the demodulator 4341 strips away the RF leaving only a digital bit stream. The signal then goes through the equalizer 4325 and is processed by the DSP 4305. A Digital to Analog Converter (DAC) 4343 converts the signal and the resulting output is transmitted to the user through the speaker 4345, all under control of a Main Control Unit (MCU) 4303 which can be implemented as a Central Processing Unit (CPU).

The MCU 4303 receives various signals including input signals from the keyboard 4347. The keyboard 4347 and/or the MCU 4303 in combination with other user input components (e.g., the microphone 4311) comprise a user interface circuitry for managing user input. The MCU 4303 runs a user interface software to facilitate user control of at least some functions of the mobile terminal 4301 to package content and/or services into DRM format for transmission to at least one device, at least one companion device, or a combination thereof. The MCU 4303 also delivers a display command and a switch command to the display 4307 and to the speech output switching controller, respectively. Further, the MCU 4303 exchanges information with the DSP 4305 and can access an optionally incorporated SIM card 4349 and a memory 4351. In addition, the MCU 4303 executes various control functions required of the terminal. The DSP 4305 may, depending upon the implementation, perform any of a variety of conventional digital processing functions on the voice signals. Additionally, DSP 4305 determines the background noise level of the local environment from the signals detected by microphone 4311 and sets the gain of microphone 4311 to a level selected to compensate for the natural tendency of the user of the mobile terminal 4301.

The CODEC 4313 includes the ADC 4323 and DAC 4343. The memory 4351 stores various data including call incoming tone data and is capable of storing other data including music data received via, e.g., the global Internet. The software module could reside in RAM memory, flash memory, registers, or any other form of writable storage medium known in the art. The memory device 4351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 4349 carries, for instance, important information, such as the cellular phone number, the carrier supplying service, subscription details, and security information. The SIM card 4349 serves primarily to identify the mobile terminal 4301 on a radio network. The card 4349 also contains a memory for storing a personal telephone number registry, text messages, and user specific mobile terminal settings.

Further, one or more camera sensors 4353 may be incorporated onto the mobile station 4301 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The invention claimed is:

1. A method comprising facilitating a processing of and/or processing (1) data and/or (2) information and/or (3) at least one signal, the (1) data and/or (2) information and/or (3) at least one signal based, at least in part, on the following:
   receiving a request for content from at least one device installed as part of an interior of a vehicle or is temporarily operating within the vehicle, wherein the request originates from at least one companion mobile device;
   packaging the content according to at least one digital rights management format based, at least in part, on identification information associated with at least one of:
      the at least one device;
      the at least one companion mobile device;
      at least one user associated with the at least one device, the at least one companion mobile device, or a combination thereof; and
      the content;
   transmitting the packaged content, at least one link to the packaged content, or a combination thereof to the at least one companion mobile device from the at least one device via a short-range communication connection.

2. The method of claim 1, wherein the content is published as at least one digital rights management protected file prior to the packaging of the content, and wherein the packaging comprises:
   encrypting the content from the at least one digital rights management protected file according to the at least one digital rights management format; and
   repackaging, re-signing, or a combination thereof of the encrypted content for transmission.

3. The method of claim 2, wherein the at least one digital rights management protected file includes a time trial protection, a usage count-trial protection, or a combination thereof.

4. The method of claim 1, wherein the (1) data and/or (2) information and/or (3) at least one signal are further based, at least in part, on the following:
   at least one determination of connectivity status information associated with the at least one device, the at least one companion mobile device, or a combination thereof; and
   a routing of the transmission of the packaged content, the at least one link, or a combination thereof to the at least one device, the at least one companion mobile device, or a combination thereof based on the connectivity status information.

5. The method of claim 4, wherein the (1) data and/or (2) information and/or (3) at least one signal are further based, at least in part, on the following:
   a synchronization of the packaged content, the at least one link, or a combination thereof between the at least one device and the at least one companion mobile device based, at least in part, on the connectivity status information,
   wherein the synchronization activates a download process of the content, and triggers an acquisition right for the content upon completion of the download.

6. The method of claim 1, wherein the (1) data and/or (2) information and/or (3) at least one signal are further based, at least in part, on the following:
   a presentation of at least one portal to at least one content store including the content at the at least one companion mobile device,
   wherein the at least one portal provides one or more options for acquiring the content for use at the at least one device.

7. The method of claim 6, wherein the (1) data and/or (2) information and/or (3) at least one signal are further based, at least in part, on the following:
   an activation of the packaged content for use at the at least one device; and
   an authentication of the at least one device, the at least one companion mobile device, or a combination thereof using federated credentials,
   wherein the federated credentials permit the at least one user to use same identification data to access one or more protected resources within a group.

8. The method of claim 6, wherein the (1) data and/or (2) information and/or (3) at least one signal are further based, at least in part, on the following:
   a registration of the at least one device, the at least one companion mobile device, or a combination thereof via the at least one portal,
   wherein the packaging of the content, the transmission of the packaged content, the activation of the packaged content, or a combination thereof is based, at least in part, on the registration.

9. The method of claim 1, wherein the (1) data and/or (2) information and/or (3) at least one signal are further based, at least in part, on the following:
   a presentation of at least one notification at the at least one device regarding an availability of the packaged content, the activation of the packaged content, or a combination thereof.

10. The method of claim 1, wherein the (1) data and/or (2) information and/or (3) at least one signal are further based, at least in part, on the following:
    an initiation of the presentation of the at least one notification using at least one pull mechanism, at least one asynchronous callback mechanism, or a combination thereof.

11. An apparatus comprising:
    at least one processor; and
    at least one memory including computer program code for one or more programs,
    the at least one memory and the computer program code configured to, with the at least one processor, cause the apparatus to perform at least the following,
      receive a request for content from at least one device installed as part of an interior of a vehicle or is temporarily operating within the vehicle, wherein the request originates from at least one companion mobile device;
      package the content according to at least one digital rights management format based, at least in part, on identification information associated with at least one of:
         the at least one device;
         the at least one companion mobile device;
         at least one user associated with the at least one device, the at least one companion mobile device, or a combination thereof; and the content;

transmit the packaged content, at least one link to the packaged content, or a combination thereof to the at least one companion mobile device from the at least one device via a short-range communication connection.

12. The apparatus of claim 11, wherein the apparatus is further caused to:
cause, at least in part, a presentation of at least one portal to at least one content store including the content at the at least one companion mobile device,
wherein the at least one portal provides one or more options for acquiring the content for use at the at least one device.

13. The apparatus of claim 11, wherein the apparatus is further caused to:
cause, at least in part, an activation of the packaged content for use at the at least one device; and
cause, at least in part, an authentication of the at least one device, the at least one companion mobile device, or a combination thereof using federated credentials,
wherein the federated credentials permit the at least one user to use same identification data to access one or more protected resources within a group.

14. The apparatus of claim 12, wherein the apparatus is further caused to:
cause, at least in part, a registration of the at least one device, the at least one companion mobile device, or a combination thereof via the at least one portal,
wherein the packaging of the content, the transmission of the packaged content, the activation of the packaged content, or a combination thereof is based, at least in part, on the registration.

15. The apparatus of claim 11, wherein the apparatus is further caused to:
cause, at least in part, a presentation of at least one notification at the at least one device regarding an availability of the packaged content, the activation of the packaged content, or a combination thereof.

16. The apparatus of claim 11, wherein the apparatus is further caused to:
cause, at least in part, an initiation of the presentation of the at least one notification using at least one pull mechanism, at least one asynchronous callback mechanism, or a combination thereof.

17. The apparatus of claim 11, wherein the apparatus is a mobile phone further comprising:
user interface circuitry and user interface software configured to facilitate user control of at least some functions of the mobile phone through use of a display and configured to respond to user input; and
a display and display circuitry configured to display at least a portion of a user interface of the mobile phone, the display and display circuitry configured to facilitate user control of at least some functions of the mobile phone.

18. A non-transitory computer program product including one or more sequences of one or more instructions which, when executed by one or more processors, cause an apparatus to at least perform:
receiving a request for content from at least one device installed as part of an interior of a vehicle or is temporarily operating within the vehicle, wherein the request originates from at least one companion mobile device;
packaging the content according to at least one digital rights management format based, at least in part, on identification information associated with at least one of:
the at least one device;
the at least one companion mobile device;
at least one user associated with the at least one device, the at least one companion mobile device, or a combination thereof; and
the content;
transmitting the packaged content, at least one link to the packaged content, or a combination thereof to the at least one companion mobile device from the at least one device via a short-range communication connection.

19. The non-transitory computer program product of claim 18, wherein the apparatus is further caused to perform:
causing, at least in part, a presentation of at least one portal to at least one content store including the content at the at least one companion mobile device,
wherein the at least one portal provides one or more options for acquiring the content for use at the at least one device.

20. The non-transitory computer program product of claim 19, wherein the apparatus is further caused to perform:
causing, at least in part, an activation of the packaged content for use at the at least one device; and
causing, at least in part, an authentication of the at least one device, the at least one companion mobile device, or a combination thereof using federated credentials,
wherein the federated credentials permit the at least one user to use same identification data to access one or more protected resources within a group.

* * * * *